US008935181B2

(12) United States Patent
Rosenberg

(10) Patent No.: US 8,935,181 B2
(45) Date of Patent: Jan. 13, 2015

(54) MUNICIPAL BOND TRACKING AND EVALUATION SYSTEM

(71) Applicant: Bjorn Johan Rosenberg, Edina, MN (US)

(72) Inventor: Bjorn Johan Rosenberg, Edina, MN (US)

( * ) Notice: Subject to any disclaimer, the term of this patent is extended or adjusted under 35 U.S.C. 154(b) by 44 days.

(21) Appl. No.: 13/714,894

(22) Filed: Dec. 14, 2012

(65) Prior Publication Data

US 2013/0212042 A1 Aug. 15, 2013

Related U.S. Application Data

(63) Continuation-in-part of application No. 13/573,990, filed on Oct. 17, 2012, now abandoned.

(60) Provisional application No. 61/547,922, filed on Oct. 17, 2011.

(51) Int. Cl.
*G06Q 40/06* (2012.01)

(52) U.S. Cl.
CPC .................................... *G06Q 40/06* (2013.01)
USPC ................ 705/36 R; 705/30; 705/35; 705/37

(58) Field of Classification Search
USPC ..................................................... 705/35–45
See application file for complete search history.

(56) References Cited

U.S. PATENT DOCUMENTS

| | | | | |
|---|---|---|---|---|
| 7,024,384 | B2 | 4/2006 | Daughtery, III | |
| 7,373,328 | B1 | 5/2008 | Butcher, III | |
| 7,376,604 | B1 | 5/2008 | Butcher | |
| 7,580,880 | B2 | 8/2009 | Meyerhoff, II | |
| 8,005,740 | B2 | 8/2011 | Arnott et al. | |
| 2003/0233307 | A1* | 12/2003 | Salvadori et al. | 705/37 |
| 2004/0044611 | A1* | 3/2004 | Heppenstall, Jr. | 705/37 |
| 2004/0220866 | A1 | 11/2004 | Marlowe-Noren | |
| 2005/0149421 | A1 | 7/2005 | Marlowe-Noren et al. | |
| 2005/0187858 | A1* | 8/2005 | Graham et al. | 705/37 |
| 2006/0053073 | A1 | 3/2006 | Marlowe-Noren | |
| 2007/0027787 | A1 | 2/2007 | Tripp | |
| 2009/0076942 | A1 | 3/2009 | Poulsen | |
| 2009/0125428 | A1* | 5/2009 | Conklin et al. | 705/35 |
| 2009/0240535 | A1 | 9/2009 | Daughtery, III | |
| 2009/0307124 | A1 | 12/2009 | Meyerhoff, II | |
| 2010/0121778 | A1 | 5/2010 | Castineiras et al. | |
| 2010/0121779 | A1 | 5/2010 | Castineiras et al. | |
| 2010/0145875 | A1 | 6/2010 | Schmid et al. | |
| 2010/0191671 | A1 | 7/2010 | Coleman et al. | |
| 2010/0198716 | A1 | 8/2010 | Chatzky et al. | |
| 2010/0228650 | A1 | 9/2010 | Shacham et al. | |
| 2010/0287116 | A1 | 11/2010 | Arnott et al. | |
| 2010/0318445 | A1* | 12/2010 | Hardison, III | 705/30 |
| 2011/0112949 | A1 | 5/2011 | Rosenberg | |
| 2011/0131065 | A1 | 6/2011 | Butcher, III et al. | |
| 2011/0131066 | A1 | 6/2011 | Butcher, III et al. | |
| 2011/0131067 | A1 | 6/2011 | Butcher, III et al. | |
| 2011/0196769 | A1 | 8/2011 | Orr | |
| 2011/0196770 | A1 | 8/2011 | Orr | |

* cited by examiner

*Primary Examiner* — Robert R Niquette

(74) *Attorney, Agent, or Firm* — Moss & Barnett

(57) ABSTRACT

The present invention relates to a web-application that gathers raw data and meta data, matches debt related data with corresponding meta data, marks the debt data so that the resulting data stream can be used to create various analytical reports on variable rate securities for Users.

20 Claims, 85 Drawing Sheets

| Debt Rating (Long/Short) | | | CEP Rating (Long/Short) | | | Underlying Rating (Long/Short) | | |
|---|---|---|---|---|---|---|---|---|
| Moody's | Fitch | S&P | Moody's | Fitch | S&P | Moody's | Fitch | S&P |
| Aa2/VMIG1 | AA-/F1+ | AA-/A-1+ | Aa2/VMIG1 | AA-/F1+ | A+/F1 | N/A/VMIG1 | AA-/N/A | N/A |

FIG. 30

MuniPriceTrackerVR
Debt Monitoring and Analytic Services

Client Portfolio

Page 4 of 52
Report Date 02/22/2012

Client Name: Michigan State University Report Period: 01/01/2010 to 12/31/2010

RBC DAIN RAUSC

Bucket Matching Percentage: 60%

| CUSIP | Series | Par (000) | Issuance Type | Reset Type | Credit Provider | Final Maturity | Data Feed | Min Rate | Max Rate | Avg Rate | Vs. SIFMA | Vs. Client |
|---|---|---|---|---|---|---|---|---|---|---|---|---|
| 594712NG2 | VAR-GEN | $52,080 | VRDO | Weekly | Bank of Ne... | 02/15/2034 | Client | 0.110% | 0.320% | 0.188% | 0.023% | 0.010% |
| 594712NF4 | VAR-TAXABLE... | $9,620 | VRDO | Weekly | Landesbank. | 02/15/2034 | Client | 0.160% | 0.290% | 0.223% | 0.058% | 0.046% |
| 594712ND9 | VAR-GEN-SER... | $48,205 | VRDO | Weekly | NORTHER... | 02/15/2034 | Client | 0.110% | 0.320% | 0.188% | 0.023% | 0.010% |
| 594712NA5 | VAR-GEN-SER... | $28,035 | VRDO | Weekly | NORTHER... | 08/15/2030 | Client | 0.040% | 0.240% | 0.157% | -0.007% | -0.020% |
| 594712MZ1 | VAR-GEN-SER... | $49,105 | VRDO | Weekly | JPMorgan... | 08/15/2030 | Client | 0.040% | 0.250% | 0.158% | -0.007% | -0.020% |

FIG. 38

MuniPriceTrackerVR

▷ Debt Monitoring and Analytic Services

Client Portfolio Detail

Page 5 of 52
Report Date 02/26/2012

Client Name: Michigan State University Report Period: 01/01/2010 to 12/31/2010

| CUSIP | Reset Type | Issue type | Taxable | AMT | State | Sector | Remarketing Agent | Credit support | Credit Provider | Debt Rating: Fitch | Debt Rating: S&P | Debt Rating: Moody's | Underlying Debt Rating: Fitch | Underlying Debt Rating: S&P | Underlying Debt Rating: Moody's |
|---|---|---|---|---|---|---|---|---|---|---|---|---|---|---|---|
| 594712MZ1 | Weekly | VRDO | N | N | MI | Higher Education | JP MORGAN SECUR | SBPA | JP Morgan Chase | NA/ NA | NA/ NA | NA/ NA | NA/ NA | NA/ NA | NA/ NA |
| 594712NA5 | Weekly | VRDO | N | N | MI | Higher Education | JP MORGAN SECUR | SBPA | NORTHERN TRUST | NA/ NA | NA/ NA | NA/ NA | NA/ NA | NA/ NA | NA/ NA |
| 594712ND9 | Weekly | VRDO | N | N | MI | Higher Education | JP MORGAN SECUR | SBPA | NORTHERN TRUST | NA/ NA | NA/ NA | NA/ NA | NA/ NA | NA/ NA | NA/ NA |
| 594712NF4 | Weekly | VRDO | Y | N | MI | Higher Education | JP MORGAN SECUR | SBPA | Landesbank Hess | NA/ NA | NA/ NA | NA/ NA | NA/ NA | NA/ NA | NA/ NA |
| 594712NG2 | Weekly | VRDO | N | N | MI | Higher Education | JP MORGAN SECUR | SBPA | Bank of New York | NA/ NA | NA/ NA | NA/ NA | NA/ NA | NA/ NA | NA/ NA |

FIG. 38A

MuniPriceTrackerVR Client Portfolio Page 6 of 52

Debt Monitoring and Analytic Services Report Date 02/22/2012

Client Name: Michigan State University Report Period: 01/01/2010 to 12/31/2010

Spread Difference – Client Vs SIFMA

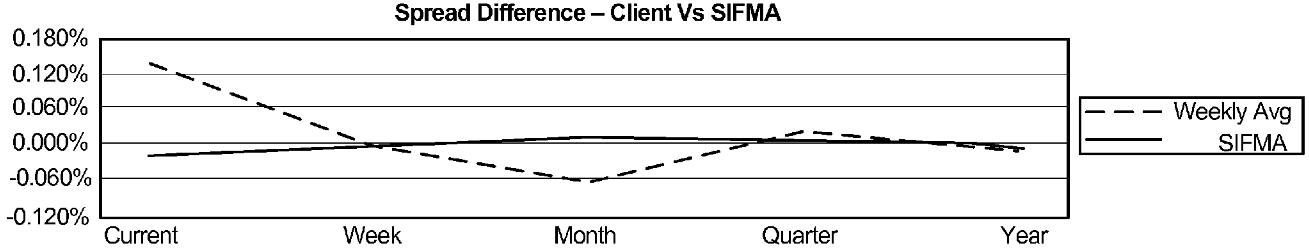

| Client vs SIFMA Average | | | | | | | | | | | | | | | |
|---|---|---|---|---|---|---|---|---|---|---|---|---|---|---|---|
| | | | Current | | Week | | | Month | | | Quarter | | | Year | |
| CUSIP | Series | Rate | Vs SIFMA | Current | Prior | Spread | Current | Prior | Spread | Current | Prior | Spread | Current | Prior | Spread |
| WEEKLY | | | | | | | | | | | | | | | |
| 594712NG2 | VAR-GEN | 0.110% | | 0.014% | 0.020% | | 0.011% | 0.000% | | 0.005% | -0.006% | | 0.023% | 0.050% | |
| 594712NF4 | VAR-TAX... | | | | | | | | | | | | 0.058% | 0.098% | |
| 594712ND9 | VAR-GE... | 0.110% | | 0.014% | 0.020% | | 0.011% | 0.000% | | 0.005% | -0.006% | | 0.023% | 0.050% | |
| 594712NG2 | VAR-TAX... | | | | | | | | | | | | | 0.144% | |
| 594712NA5 | VAR-GE... | 0.110% | | 0.014% | 0.020% | | 0.011% | 0.000% | | 0.005% | -0.003% | | -0.008% | -0.036% | |
| 594712MZ1 | VAR-GE... | 0.110% | | 0.014% | 0.020% | | 0.011% | 0.000% | | 0.005% | -0.004% | | 0.018% | 0.044% | |
| Weekly Avg | | 0.110% | | 0.014% | 0.020% | | 0.011% | 0.000% | | 0.005% | -0.004% | | 0.018% | 0.044% | |

FIG. 38B

MuniPriceTrackerVR
▷ Debt Monitoring and Analytic Services

Cost of Capital – Summary

Page 7 of 52
Report Date 02/22/2012

Client Name: Michigan State University Report Period: 01/01/2010 to 12/31/2010

Cost of Capital-Monthly Average

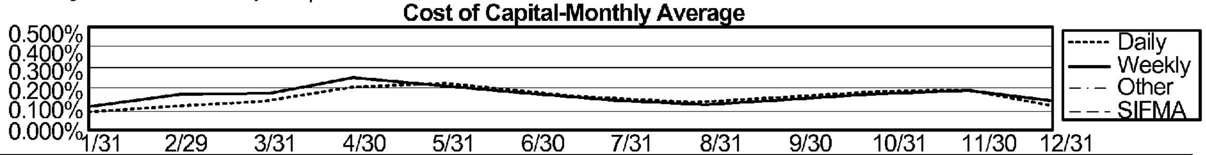

| Monthly Average | 1/31 | 2/29 | 3/31 | 4/30 | 5/31 | 6/30 | 7/31 | 8/31 | 9/30 | 10/31 | 11/30 | 12/31 |
|---|---|---|---|---|---|---|---|---|---|---|---|---|
| Daily Weekly Other | 0.123% | 0.176% | 0.181% | 0.253% | 0.219% | 0.180% | 0.152% | 0.137% | 0.156% | 0.188% | 0.201% | 0.151% |
| **Quarterly Average** | | | **3/31** | | | **6/30** | | | **9/30** | | | **12/31** |
| Daily Weekly Other | | | 0.160% | | | 0.219% | | | 0.148% | | | 0.180% |
| **YTD Average** | **1/31** | **2/29** | **3/31** | **4/30** | **5/31** | **6/30** | **7/31** | **8/31** | **9/30** | **10/31** | **11/30** | **12/31** |
| Daily Weekly Other | 0.123% | 0.149% | 0.160% | 0.183% | 0.190% | 0.189% | 0.184% | 0.179% | 0.177% | 0.178% | 0.180% | 0.177% |

Cost of Capital – Weekly Average

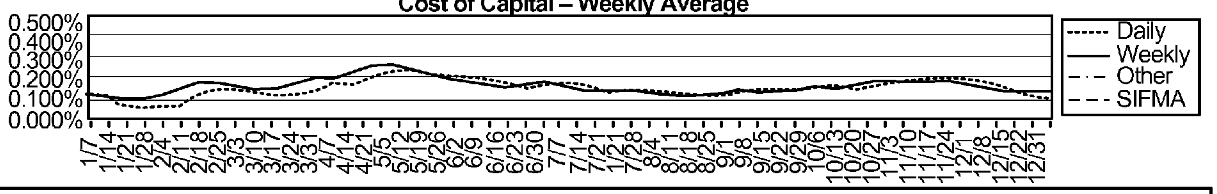

| Week Avg | 1/7 | 1/14 | 1/21 | 1/28 | 2/4 | 2/11 | 2/18 | 2/25 | 3/3 | 3/10 | 3/17 | 3/24 | 3/31 | 4/7 |
|---|---|---|---|---|---|---|---|---|---|---|---|---|---|---|
| Weekly | 0.140% | 0.122% | 0.116% | 0.116% | 0.129% | 0.167% | 0.196% | 0.189% | 0.173% | 0.161% | 0.164% | 0.187% | 0.216% | 0.213% |
| **Week Avg** | **4/14** | **4/21** | **5/5** | **5/12** | **5/19** | **5/26** | **6/2** | **6/9** | **6/16** | **6/23** | **6/30** | **7/7** | **7/14** | **7/21** |
| Weekly | 0.241% | 0.273% | 0.280% | 0.259% | 0.230% | 0.215% | 0.206% | 0.175% | 0.177% | 0.194% | 0.171% | 0.153% | 0.150% | 0.157% |
| **Week Avg** | **7/28** | **8/4** | **8/11** | **8/18** | **8/25** | **9/1** | **9/8** | **9/15** | **9/22** | **9/29** | **10/6** | **10/13** | **10/20** | **10/27** |
| Weekly | 0.153% | 0.136% | 0.130% | 0.130% | 0.137% | 0.158% | 0.144% | 0.149% | 0.155% | 0.173% | 0.166% | 0.181% | 0.197% | 0.200% |
| **Week Avg** | **11/3** | **11/17** | **11/24** | **12/1** | **12/8** | **12/15** | **12/22** | **12/31** | | | | | | |
| Weekly | 0.200% | 0.214% | 0.213% | 0.196% | 0.176% | 0.156% | 0.150% | 0.150% | | | | | | |

FIG. 38C

MuniPriceTrackerVR Cost of Capital - Daily Page 8 of 52

Debt Monitoring and Analytic Services Report Date 02/22/2012

Client Name: Michigan State University Report Period: 01/01/2010 to 12/31/2010

No Results Found

FIG. 38D

MuniPriceTrackerVR
Debt Monitoring and Analytic Services

Cost of Capital - Weekly

Page 9 of 52
Report Date 02/22/2012

Client Name: Michigan State University Report Period: 01/01/2010 to 12/31/2010

| Monthly Average | 1/31 | 2/29 | 3/31 | 4/30 | 5/31 | 6/30 | 7/31 | 8/31 | 9/30 | 10/31 | 11/30 | 12/31 |
|---|---|---|---|---|---|---|---|---|---|---|---|---|
| 594712NF4 | 0.223% | 0.173% | 0.186% | 0.255% | 0.265% | 0.254% | | | | | | |
| 594712NG2 | 0.147% | 0.221% | 0.224% | 0.296% | 0.215% | 0.173% | 0.152% | 0.136% | 0.152% | 0.188% | 0.201% | 0.151% |
| **Overall Weekly** | **0.185%** | **0.197%** | **0.205%** | **0.276%** | **0.240%** | **0.214%** | **0.152%** | **0.136%** | **0.152%** | **0.188%** | **0.201%** | **0.151%** |
| **Quarterly Average** | | | **3/31** | | | **6/30** | | | **9/30** | | | **12/31** |
| 594712NF4 | | | 0.195% | | | 0.259% | | | | | | |
| 594712NG2 | | | 0.195% | | | 0.228% | | | 0.147% | | | 0.180% |
| **Overall Weekly** | | | **0.195%** | | | **0.244%** | | | **0.147%** | | | **0.180%** |
| **YTD Average** | **1/31** | **2/29** | **3/31** | **4/30** | **5/31** | **6/30** | **7/31** | **8/31** | **9/30** | **10/31** | **11/30** | **12/31** |
| 594712NF4 | 0.223% | 0.199% | 0.195% | 0.210% | 0.221% | 0.223% | 0.223% | 0.223% | 0.223% | 0.223% | 0.223% | 0.223% |
| 594712NG2 | 0.147% | 0.183% | 0.197% | 0.221% | 0.220% | 0.212% | 0.204% | 0.195% | 0.190% | 0.190% | 0.191% | 0.188% |
| **Overall Weekly** | **0.185%** | **0.191%** | **0.196%** | **0.216%** | **0.221%** | **0.218%** | **0.214%** | **0.209%** | **0.207%** | **0.207%** | **0.207%** | **0.206%** |
| **Weekly Average** | **1/7** | **1/14** | **1/21** | **1/28** | **2/4** | **2/11** | **2/18** | **2/25** | **3/3** | **3/10** | **3/17** | **3/24** |
| 594712NF4 | 0.283% | 0.237% | 0.220% | 0.177% | 0.160% | 0.160% | 0.181% | 0.183% | 0.180% | 0.173% | 0.170% | 0.191% |
| 594712NG2 | 0.156% | 0.143% | 0.140% | 0.147% | 0.164% | 0.213% | 0.244% | 0.236% | 0.216% | 0.203% | 0.207% | 0.231% |
| **Overall Weekly** | **avg** | **avg** | **avg** | **avg** | **avg** | **avg** | **avg** | **avg** | **avg** | **avg** | **avg** | **avg** |
| **Weekly Average** | **3/31** | **4/7** | **4/14** | **4/21** | **4/28** | **5/5** | **5/12** | **5/19** | **5/26** | **6/2** | **6/9** | **6/16** |
| 594712NF4 | 0.214% | 0.220% | 0.241% | 0.271% | 0.280% | 0.273% | 0.270% | 0.263% | 0.260% | 0.260% | 0.253% | 0.250% |
| 594712NG2 | 0.261% | 0.256% | 0.286% | 0.314% | 0.320% | 0.291% | 0.230% | 0.203% | 0.193% | 0.176% | 0.156% | 0.171% |
| **Overall Weekly** | **0.238%** | **0.238%** | **0.264%** | **0.293%** | **0.300%** | **0.282%** | **0.250%** | **0.233%** | **0.227%** | **0.218%** | **0.200%** | **0.211%** |
| **Weekly Average** | **6/23** | **7/7** | **7/14** | **7/21** | **7/28** | **8/4** | **8/11** | **8/18** | **8/25** | **9/1** | **9/8** | **9/15** |
| 594712NF4 | | | | | | | | | | | | |
| 594712NG2 | 0.194% | 0.171% | 0.153% | 0.157% | 0.153% | 0.136% | 0.130% | 0.130% | 0.137% | 0.154% | 0.139% | 0.144% |
| **Overall Weekly** | **0.194%** | **0.171%** | **0.153%** | **0.157%** | **0.153%** | **0.136%** | **0.130%** | **0.130%** | **0.137%** | **0.154%** | **0.139%** | **0.144%** |
| **Weekly Average** | **9/22** | **9/29** | **10/6** | **10/13** | **10/20** | **10/27** | **11/3** | **11/10** | **11/17** | **11/24** | **12/1** | **12/8** |
| 594712NF4 | | | | | | | | | | | | |
| 594712NG2 | 0.150% | 0.171% | 0.166% | 0.181% | 0.197% | 0.200% | 0.200% | 0.214% | 0.213% | 0.196% | 0.176% | 0.156% |
| **Overall Weekly** | **0.150%** | **0.171%** | **0.166%** | **0.181%** | **0.197%** | **0.200%** | **0.200%** | **0.214%** | **0.213%** | **0.196%** | **0.176%** | **0.156%** |
| **Weekly Average** | **12/15** | **12/22** | **12/31** | | | | | | | | | |
| 594712NF4 | | | | | | | | | | | | |
| 594712NG2 | 0.150% | 0.150% | | | | | | | | | | |
| **Overall Weekly** | **0.150%** | **0.150%** | | | | | | | | | | |

FIG. 38E

MuniPriceTrackerVR | Cost of Capital - Other | Page 10 of 52

▷ Debt Monitoring and Analytic Services | Report Date 02/22/2012

Client Name: Michigan State University | Report Period: 01/01/2010 to 12/31/2010

No Results Found

FIG. 38F

MuniPriceTrackerVR
▷ Debt Monitoring and Analytic Services

Bucket List – Remarketing Agent

Page 11 of 52
Report Date 02/26/2012

Client Name: Michigan State University  Report Period: 01/01/2011 to 12/31/2011  Bucket Matching Percentage:80%

MER Lynch and Co.

| CUSIP | Borrower | % Matching | # Matching Exactly | Average Rate | Taxable | AMT | Reset Type | Credit Support | Credit Provider | Remarketing Agent | State | Sector |
|---|---|---|---|---|---|---|---|---|---|---|---|---|
| 594712NC1 | Michigan State University | | | .327% | N | N | Weekly | Self | Self | MER Lynch and Co. | MI | Higher Education |
| 57586NDV0 | Massachusetts Housing Finan... | 90.31% | 28 | 0.265% | N | N | Weekly | LOC | BOA N.A. | MER Lynch and Co. | MA | Multifamily Hsg |
| 19464HCH2 | Brittany Bay Partners Ltd | 100.0% | 31 | 0.254% | N | N | Weekly | Self | Self | MER Lynch and Co. | FL | Multifamily Hsg |
| 478271JK6 | Mountain States Health Allianc... | 100.0% | 31 | 0.242% | | N | Weekly | LOC | U.S. Bank NA | MER Lynch and Co. | TN | Medical |
| 684906DQ0 | Milennia Club Partners Ltd | 100.0% | 31 | 0.254% | N | N | Weekly | SBPA | Fannie Mae | MER Lynch and Co. | FL | Multifamily Hsg |

FIG. 38G

MuniPriceTrackerVR

Debt Monitoring and Analytic Services

Query Summary

Page 12 of 52

Report Date 02/22/2012

Client Name: Michigan State University Report Period: 01/01/2011 to 12/31/2011

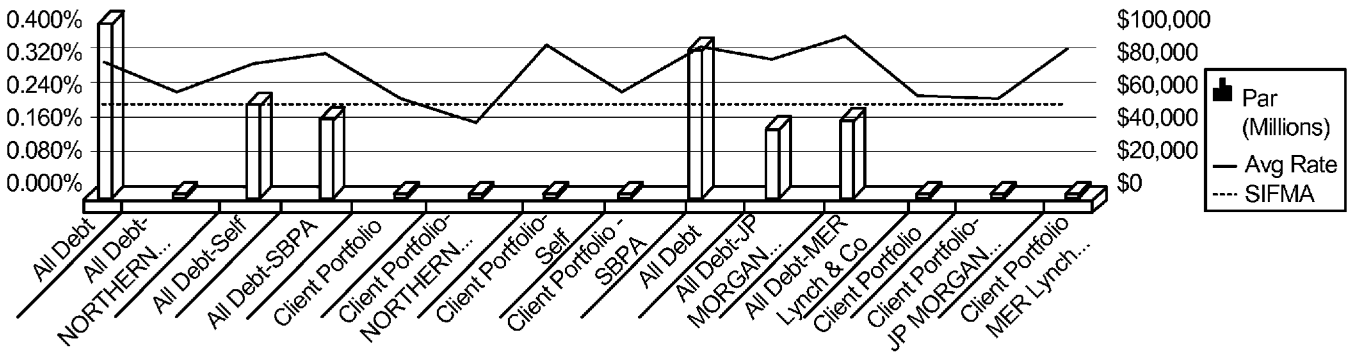

| Query | Par (Millions) | # of CUSIP | # New | #Removed | Average # | Min Rate | Max Rate | Avg. Rate | Vs. SIFMA | Vs. Client |
|---|---|---|---|---|---|---|---|---|---|---|
| | | | | | | Rate Statistics | | | | |
| My CEPS — My Credit Enhancement Providers | | | | | | | | | | |
| ■ All Debt | $99,313 | 3104 | 148 | 577 | 3283 | 0.000% | 18.250% | 0.287% | 0.077% | 0.077% |
| ■ All Debt-NORTHERN... | $2118 | 118 | 0 | 7 | 119 | 0.000% | 5.000% | 0.217% | 0.007% | 0.007% |
| ■ ... | ... | ... | ... | ... | ... | ... | ... | ... | ... | ... |
| REM Agents — My Remarketing Agents | | | | | | | | | | |
| ■ All Debt | $85,600 | 2688 | 94 | 532 | 2900 | 0.005% | 18.250% | 0.325% | 0.115% | 0.115% |
| ■ All Debt-JP MORGAN... | $40,082 | 1185 | 64 | 244 | 1265 | 0.010% | 8.500% | 0.295% | 0.085% | 0.085% |
| ■ ... | ... | ... | ... | ... | ... | ... | ... | ... | ... | ... |

FIG. 38H

MuniPriceTrackerVR Query Summary Page 13 of 52

▷ Debt Monitoring and Analytic Services Report Date 02/22/2012

Client Name: Michigan State University Report Period: 01/01/2011 to 12/31/2011

| Query | Par (Millions) | # of CUSIP | # New | #Removed | Average # | Rate Statistics: Min Rate | Max Rate | Avg. Rate | Vs. SIFMA | Vs. Client |
|---|---|---|---|---|---|---|---|---|---|---|
| My States — My States | | | | | | | | | | |
| ■ All Debt | $7,163 | 484 | 16 | 86 | 515 | 0.000% | 10.000% | 0.444% | 0.234% | 0.234% |
| ■ All Debt-NORTHERN... | $1,303 | 49 | 2 | 2 | 47 | 0.010% | 2.350% | 0.248% | 0.037% | 0.037% |
| ■ ... | ... | ... | ... | ... | ... | ... | ... | ... | ... | ... |

MuniPriceTrackerVR Query Average Rate Page 15 of 52

Debt Monitoring and Analytic Services Report Date 02/22/2012

Client Name: Michigan State University Report Period: 01/01/2011 to 12/31/2011

| **Monthly** | **1/31** | **2/29** | **3/31** | **4/30** | **5/31** | **6/30** | **7/31** | **8/31** | **9/30** | **10/31** | **11/30** | **12/31** |
|---|---|---|---|---|---|---|---|---|---|---|---|---|
| All Debt | 0.378% | ↘ 0.366% | ↘ 0.331% | ↗ 0.334% | ↘ 0.296% | ↘ 0.254% | ↘ 0.223% | ↑ 0.304% | ↘ 0.265% | ↘ 0.241% | ↘ 0.229% | ↘ 0.206% |
| All Debt-N... | 0.372% | ↘ 0.325% | ↘ 0.283% | ↘ 0.279% | ↘ 0.236% | ↓ 0.153% | ↓ 0.113% | ↑ 0.210% | ↘ 0.183% | ↘ 0.166% | ↘ 0.163% | ↘ 0.143% |
| ... | | ... | ... | ... | ... | ... | ... | ... | ... | ... | ... | ... |

| **Quarterly** | | | **3/31** | | | **6/30** | | | **9/30** | | | **12/31** |
|---|---|---|---|---|---|---|---|---|---|---|---|---|
| All Debt | | | 0.358% | | | ↘ 0.294% | | | ↘ 0.264% | | | ↘ 0.226% |
| All Debt-N... | | | 0.327% | | | ↓ 0.222% | | | ↘ 0.168% | | | ↘ 0.157% |
| ... | | | ... | | | ... | | | ... | | | ... |

| **YTD** | **1/31** | **2/29** | **3/31** | **4/30** | **5/31** | **6/30** | **7/31** | **8/31** | **9/30** | **10/31** | **11/30** | **12/31** |
|---|---|---|---|---|---|---|---|---|---|---|---|---|
| All Debt | 0.378% | ↘ 0.372% | ↘ 0.358% | ↘ 0.352% | ↘ 0.341% | ↘ 0.327% | ↘ 0.312% | ↘ 0.311% | ↘ 0.306% | ↘ 0.300% | ↘ 0.294% | ↘ 0.287% |
| All Debt-N... | 0.372% | ↘ 0.350% | ↘ 0.327% | ↘ 0.315% | ↘ 0.298% | ↘ 0.274% | ↘ 0.249% | ↘ 0.244% | ↘ 0.239% | ↘ 0.230% | ↘ 0.224% | ↘ 0.217% |
| ... | ... | ... | ... | ... | ... | ... | ... | ... | ... | ... | ... | ... |

| **Weekly** | **1/7** | **1/14** | **1/21** | **1/28** | **2/4** | **2/11** | **2/18** | **2/25** | **3/3** | **3/10** | **3/17** | **3/24** |
|---|---|---|---|---|---|---|---|---|---|---|---|---|
| All Debt | 0.393% | 0.347% | 0.370% | 0.392% | 0.383% | 0.371% | 0.376% | 0.358% | 0.333% | 0.325% | 0.335% | 0.345% |
| All Debt-N... | 0.386% | 0.339% | 0.363% | 0.389% | 0.365% | 0.336% | 0.333% | 0.306% | 0.208% | 0.279% | 0.284% | 0.304% |
| ... | ... | ... | ... | ... | ... | ... | ... | ... | ... | ... | ... | ... |

| **Weekly** | **3/31** | **4/7** | **4/14** | **4/21** | **4/28** | **5/5** | **5/12** | **5/19** | **5/26** | **6/2** | **6/9** | **6/16** |
|---|---|---|---|---|---|---|---|---|---|---|---|---|
| ... | ... | ... | ... | ... | ... | ... | ... | ... | ... | ... | ... | ... |

| **Weekly** | **6/23** | **7/7** | **7/14** | **7/21** | **7/28** | **8/4** | **8/11** | **8/18** | **8/25** | **9/1** | **9/8** | **9/15** |
|---|---|---|---|---|---|---|---|---|---|---|---|---|
| ... | ... | ... | ... | ... | ... | ... | ... | ... | ... | ... | ... | ... |

| **Weekly** | **9/22** | **9/29** | **10/6** | **10/13** | **10/20** | **10/27** | **11/3** | **11/10** | **11/17** | **11/24** | **12/1** | **12/8** |
|---|---|---|---|---|---|---|---|---|---|---|---|---|
| ... | ... | ... | ... | ... | ... | ... | ... | ... | ... | ... | ... | ... |

| **Weekly** | **12/15** | **12/22** | **12/31** |
|---|---|---|---|
| ... | ... | ... | ... |

FIG. 38K

MuniPriceTrackerVR
Debt Monitoring and Analytic Services

Query Average Rate

Page 16 of 52
Report Date 02/22/2012

Client Name: Michigan State University

Report Period: 01/01/2011 to 12/31/2011

| | | | | | | | | | | | | | | | | | |
|---|---|---|---|---|---|---|---|---|---|---|---|---|---|---|---|---|---|
| Client Portfolio | NR | NR | NR | NR | NR | NR | NR | NR | NR | NR | NR | NR | NR | NR | NR | NR | ... |
| Client Portfolio | 0.166 | 0.216 | 0.213 | 0.197 | 0.244 | 0.250 | 0.260 | 0.250 | 0.260 | 0.292 | 0.282 | 0.250 | 0.233 | 0.257 | 0.268 | 0.263 | ... |

FIG. 38L

MuniPriceTrackerVR
Debt Monitoring and Analytic Services

Query Average Rate

Page 17 of 52
Report Date 02/22/2012

Client Name: Michigan State University

Report Period: 01/01/2011 to 12/31/2011

| Monthly | 1/31 | 2/29 | 3/31 | 4/30 | 5/31 | 6/30 | 7/31 | 8/31 | 9/30 | 10/31 | 11/30 | 12/31 |
|---|---|---|---|---|---|---|---|---|---|---|---|---|
| All Debt | (DATA TABLE) | | | | | | | | | | | |
| All Debt-JP Morgan Secure | | | | | | | | | | | | |
| All Debt-MER Lynch and Co | | | | | | | | | | | | |
| Client Portfolio | | | | | | | | | | | | |
| Client Portfolio-JP Morgan SEC... | | | | | | | | | | | | |
| Client Portfolio-MER Lynch..... | | | | | | | | | | | | |

| Quarterly | 3/31 | 6/30 | 9/30 | 12/31 |
|---|---|---|---|---|
| All Debt | 0.412 | 0.326 | 0.283 | 0.271 |
| All Debt-JP Morgan Secure | 0.384 | 0.314 | 0.257 | 0.217 |
| All Debt-MER Lynch and Co | 0.434 | 0.336 | 0.302 | 0.314 |
| Client Portfolio | 0.260 | 0.182 | 0.211 | 0.184 |
| Client Portfolio-JP Morgan SEC... | 0.256 | 0.182 | 0.211 | 0.184 |
| Client Portfolio-MER Lynch..... | 0.327 | NR | NR | NR |

| YTD | 1/31 | 2/29 | 3/31 | 4/30 | 5/31 | 6/30 | 7/31 | 8/31 | 9/30 | 10/31 | 11/30 | 12/31 |
|---|---|---|---|---|---|---|---|---|---|---|---|---|
| All Debt | (DATA TABLE) | | | | | | | | | | | |
| All Debt-JP Morgan Secure | | | | | | | | | | | | |
| All Debt-MER Lynch and Co | | | | | | | | | | | | |
| Client Portfolio | | | | | | | | | | | | |
| Client Portfolio-JP Morgan SEC... | | | | | | | | | | | | |

| Weekly | 1/7 | 1/14 | 1/21 | 1/28 | 2/4 | 2/11 | 2/18 | 2/25 | 3/3 | 3/10 | 3/17 | ... |
|---|---|---|---|---|---|---|---|---|---|---|---|---|
| All Debt | (DATA TABLE) | | | | | | | | | | | |
| All Debt-JP Morgan Secure | | | | | | | | | | | | |
| All Debt-MER Lynch and Co | | | | | | | | | | | | |
| Client Portfolio | | | | | | | | | | | | |
| Client Portfolio-JP Morgan SEC... | | | | | | | | | | | | |

FIG. 38M

MuniPriceTrackerVR
Debt Monitoring and Analytic Services

Query Average Rate

Page 18 of 52
Report Date 02/22/2012

Client Name: Michigan State University

Report Period: 01/01/2011 to 12/31/2011

| Monthly | 1/31 | 2/29 | 3/31 | 4/30 | 5/31 | 6/30 | 7/31 | 8/31 | 9/30 | 10/31 | 11/30 | 12/31 |
|---|---|---|---|---|---|---|---|---|---|---|---|---|
| All Debt | (DATA TABLE) | | | | | | | | | | | |
| All Debt-State MI by Sect. High | | | | | | | | | | | | |
| All Debt-State MI by CEP North | | | | | | | | | | | | |
| All Debt-State MI by CEP SBPA | | | | | | | | | | | | |
| All Debt-State MI by CEP SBPA | | | | | | | | | | | | |
| ... | | | | | | | | | | | | |

| Quarterly | 3/31 | 6/30 | 9/30 | 12/31 |
|---|---|---|---|---|
| All Debt | 0.566 | 0.461 | 0.386 | 0.354 |
| All Debt-State MI by Sect. High | 0.344 | 0.261 | 0.207 | 0.182 |
| All Debt-State MI by CEP North | 0.238 | 0.159 | 0.102 | 0.096 |
| All Debt-State MI by CEP SBPA | 0.379 | 0.345 | 0.452 | 0.287 |
| All Debt-State MI by CEP Self | 0.467 | 0.383 | 0.285 | 0.283 |
| All Debt-State MI by RMA JP MO | 0.542 | 0.451 | 0.320 | 0.306 |
| All Debt-State MI by RMA MERL | 0.683 | 0.580 | 0.634 | 0.618 |
| Client Portfolio | 0.260 | 0.182 | 0.211 | 0.184 |
| Client Portfolio-State MI by Sect. High | 0.260 | 0.182 | 0.211 | 0.184 |
| Client Portfolio-State MI by CEP North | 0.238 | 0.159 | 0.102 | 0.096 |
| Client Portfolio-State MI by CEP SBPA | 0.260 | 0.188 | 0.239 | 0.206 |
| Client Portfolio-State MI by CEP Self | 0.327 | NR | NR | NR |
| Client Portfolio-State MI by RMA JP MO | 0.256 | 0.182 | 0.211 | 0.184 |
| Client Portfolio-State MI by RMA MERL | 0.327 | NR | NR | NR |

| YTD | 1/31 | 2/29 | 3/31 | 4/30 | 5/31 | 6/30 | 7/31 | 8/31 | 9/30 | 10/31 | 11/30 | 12/31 |
|---|---|---|---|---|---|---|---|---|---|---|---|---|
| All Debt | (DATA TABLE) | | | | | | | | | | | |
| All Debt-State MI by Sect. High | | | | | | | | | | | | |
| All Debt-State MI by CEP North | | | | | | | | | | | | |
| All Debt-State MI by CEP SBPA | | | | | | | | | | | | |
| ... | | | | | | | | | | | | |

FIG. 38N

MuniPriceTrackerVR Query Average Rate Page 19 of 52

Debt Monitoring and Analytic Services Report Date 02/22/2012

Client Name: Michigan State University Report Period: 01/01/2011 to 12/31/2011

Client Portfolio-State MI by RMA MER L

| **Weekly** | **1/7** | **1/14** | **1/21** | **1/28** | **2/4** | **2/11** | **2/18** | **2/25** | **3/4** | **3/11** | **3/18** | **3/25** |
|---|---|---|---|---|---|---|---|---|---|---|---|---|
| All Debt | | | | | | | | | | | | |
| All Debt-State MI by Sect. High | | | | | | | | | | | | |
| All Debt-State MI by CEP North | | | | | | | | | | | | |
| All Debt-State MI by CEP SBPA | | | | | | | | | | | | |
| All Debt-State MI by CEP SBPA | | | | | | | | | | | | |
| All Debt-State MI by CEP Self | | | | | | | | | | | | |
| All Debt-State MI by RMA JP MO | | | | | | | | | | | | |
| All Debt-State MI by RMA MERL | | | | | | | (DATA TABLE) | | | | | |
| Client Portfolio | | | | | | | | | | | | |
| Client Portfolio-State MI by Sect. High | | | | | | | | | | | | |
| Client Portfolio-State MI by CEP North | | | | | | | | | | | | |
| Client Portfolio-State MI by CEP SBPA | | | | | | | | | | | | |
| Client Portfolio-State MI by CEP SBPA | | | | | | | | | | | | |
| Client Portfolio-State MI by CEP Self | | | | | | | | | | | | |
| Client Portfolio-State MI by RMA JP MO | | | | | | | | | | | | |
| Client Portfolio-State MI by RMA MERL | | | | | | | | | | | | |

| **Weekly (Continued)** | **4/1** | **4/8** | **4/15** | **4/22** | **4/29** | **5/6** | **5/13** | **5/20** | **5/27** | **6/3** | **6/10** | **...** |
|---|---|---|---|---|---|---|---|---|---|---|---|---|
| All Debt-State MI by Sect. High | | | | | | | | | | | | |
| All Debt-State MI by CEP North | | | | | | | | | | | | |
| All Debt-State MI by CEP SBPA | | | | | | | | | | | | |
| All Debt-State MI by CEP SBPA | | | | | | | | | | | | |
| All Debt-State MI by CEP Self | | | | | | | (DATA TABLE) | | | | | |
| All Debt-State MI by RMA JP MO | | | | | | | | | | | | |
| All Debt-State MI by RMA MERL | | | | | | | | | | | | |
| Client Portfolio | | | | | | | | | | | | |
| Client Portfolio-State MI by Sect. High | | | | | | | | | | | | |
| Client Portfolio-State MI by CEP North | | | | | | | | | | | | |
| ... | | | | | | | | | | | | |

FIG. 38O

MuniPriceTrackerVR
Debt Monitoring and Analytic Services

Query Average Rate

Page 20 of 52
Report Date 02/22/2012

Client Name: Michigan State University

Report Period: 01/01/2011 to 12/31/2011

My Sectors My Sectors

| Monthly | 1/31 | 2/28 | 3/31 | 4/30 | 5/31 | 6/30 | 7/31 | 8/31 | 9/30 | 10/31 | 11/30 | 12/31 |
|---|---|---|---|---|---|---|---|---|---|---|---|---|
| All Debt | (DATA TABLE) | | | | | | | | | | | |
| All Debt-Sector Highe by State MI | | | | | | | | | | | | |
| All Debt-Sector Hig by CEP NORT | | | | | | | | | | | | |
| All Debt-Sector Hig by CEP SBPA | | | | | | | | | | | | |
| All Debt-Sector Hig by CEP Self | | | | | | | | | | | | |
| All Debt-Sector Hig by RMA JP M | | | | | | | | | | | | |
| All Debt-Sector Hig by RMA MER | | | | | | | | | | | | |
| ... | | | | | | | | | | | | |

| Quarterly | 3/31 | 6/30 | 9/30 | 12/31 |
|---|---|---|---|---|
| All Debt | 0.362 | 0.266 | 0.200 | 0.174 |
| All Debt-Sector Highe by State MI | 0.344 | 0.261 | 0.207 | 0.182 |
| All Debt-Sector Hig by CEP NORT | 0.267 | 0.191 | 0.151 | 0.145 |
| All Debt-Sector Hig by CEP SBPA | 0.237 | 0.167 | 0.159 | 0.148 |
| All Debt-Sector Hig by CEP Self | 0.276 | 0.228 | 0.162 | 0.126 |
| All Debt-Sector Hig by RMA JP M | 0.249 | 0.174 | 0.130 | 0.112 |
| All Debt-Sector Hig by RMA MER | 0.341 | 0.198 | 0.155 | 0.163 |
| Client Portfolio | 0.260 | 0.182 | 0.211 | 0.184 |
| Client Portfolio-Sector Highe by State... | 0.260 | 0.182 | 0.211 | 0.184 |
| Client Portfolio-Sector Hig by CEP NORT | 0.238 | 0.159 | 0.102 | 0.096 |
| Client Portfolio-Sector Hig by CEP SBPA | 0.260 | 0.188 | 0.239 | .206 |
| Client Portfolio-Sector Hig by CEP Self | 0.327 | NR | NR | NR |
| Client Portfolio-Sector Hig by RMA JP M | 0.256 | 0.182 | 0.211 | 0.184 |
| Client Portfolio-Sector Hig by RMA MER | 0.327 | NR | NR | NR |

| YTD | 1/31 | 2/28 | 3/31 | 4/30 | 5/31 | 6/30 | 7/31 | 8/31 | 9/30 | 10/31 | 11/30 | 12/31 |
|---|---|---|---|---|---|---|---|---|---|---|---|---|
| All Debt | (DATA TABLE) | | | | | | | | | | | |
| All Debt-Sector Highe by State MI | | | | | | | | | | | | |
| All Debt-Sector Hig by CEP NORT | | | | | | | | | | | | |
| ... | | | | | | | | | | | | |

FIG. 38P

MuniPriceTrackerVR
Debt Monitoring and Analytic Services

Query Average Rate

Page 21 of 52
Report Date 02/22/2012

Client Name: Michigan State University
Report Period: 01/01/2011 to 12/31/2011

Client Portfolio-Sector Hig by RMA MER

| **Weekly** | **1/7** | **1/14** | **1/21** | **1/28** | **2/4** | **2/11** | **2/18** | **2/25** | **3/4** | **3/11** | **3/18** | **3/25** |
|---|---|---|---|---|---|---|---|---|---|---|---|---|
| All Debt | | | | | | | | | | | | |
| All Debt-Sector Highe by State MI | | | | | | | | | | | | |
| All Debt-Sector Hig by CEP NORT | | | | | | | | | | | | |
| All Debt-Sector Hig by CEP SBPA | | | | | | | | | | | | |
| All Debt-Sector Hig by CEP Self | | | | | | | | | | | | |
| All Debt-Sector Hig by RMA JP M | | | | | | | | | | | | |
| All Debt-Sector Hig by RMA MER | | | | | | | *(DATA TABLE)* | | | | | |
| Client Portfolio | | | | | | | | | | | | |
| Client Portfolio-Sector Highe by State... | | | | | | | | | | | | |
| Client Portfolio-Sector Hig by CEP NORT | | | | | | | | | | | | |
| Client Portfolio-Sector Hig by CEP SBPA | | | | | | | | | | | | |
| Client Portfolio-Sector Hig by CEP Self | | | | | | | | | | | | |
| Client Portfolio-Sector Hig by RMA JP M | | | | | | | | | | | | |

| **Weekly (Continued)** | **4/1** | **4/8** | **4/15** | **4/22** | **4/29** | **5/6** | **5/13** | **5/20** | **5/27** | **6/3** | **6/10** | **...** |
|---|---|---|---|---|---|---|---|---|---|---|---|---|
| All Debt | | | | | | | | | | | | |
| All Debt-Sector Highe by State MI | | | | | | | | | | | | |
| All Debt-Sector Hig by CEP NORT | | | | | | | | | | | | |
| All Debt-Sector Hig by CEP SBPA | | | | | | | | | | | | |
| All Debt-Sector Hig by CEP Self | | | | | | | *(DATA TABLE)* | | | | | |
| All Debt-Sector Hig by RMA JP M | | | | | | | | | | | | |
| All Debt-Sector Hig by RMA MER | | | | | | | | | | | | |
| Client Portfolio | | | | | | | | | | | | |
| Client Portfolio-Sector Highe by State... | | | | | | | | | | | | |
| Client Portfolio-Sector Hig by CEP NORT | | | | | | | | | | | | |
| ... | | | | | | | | | | | | |

FIG. 38Q

MuniPriceTrackerVR
Debt Monitoring and Analytic Services

Client Percentile

Page 23 of 52
Report Date 02/22/2012

Client Name: Michigan State University

Report Period: 01/01/2011 to 12/31/2011

| Monthly | 1/31 | 2/29 | 3/31 | 4/30 | 5/31 | 6/30 | 7/31 | 8/31 | 9/30 | 10/31 | 11/30 | 12/31 |
|---|---|---|---|---|---|---|---|---|---|---|---|---|
| AAA-AA-HE | (DATA TABLE) | | | | | | | | | | | |
| My CEPS | | | | | | | | | | | | |
| REM Agents | | | | | | | | | | | | |
| My States | | | | | | | | | | | | |
| My Sectors | | | | | | | | | | | | |

| Quarterly | 3/31 | 6/30 | 9/30 | 12/31 |
|---|---|---|---|---|
| AAA-AA-HE | 12.4% | 19.2% | 54.0% | 30.4% |
| My CEPS | 32.3% | 45.3% | 86.3% | 61.5% |
| REM Agents | 26.6% | 35.2% | 72.2% | 47.7% |
| My States | 73.5% | 78.4% | 93.6% | 87.7% |
| My Sectors | 44.6% | 56.8% | 84.8% | 69.1% |

| YTD | 1/31 | 2/29 | 3/31 | 4/30 | 5/31 | 6/30 | 7/31 | 8/31 | 9/30 | 10/31 | 11/30 | 12/31 |
|---|---|---|---|---|---|---|---|---|---|---|---|---|
| AAA-AA-HE | (DATA TABLE) | | | | | | | | | | | |
| My CEPS | | | | | | | | | | | | |
| REM Agents | | | | | | | | | | | | |
| My States | | | | | | | | | | | | |
| My Sectors | | | | | | | | | | | | |

| Weekly | 1/7 | 1/14 | 1/21 | 1/28 | 2/4 | 2/11 | 2/18 | 2/25 | 3/4 | 3/11 | 3/18 | 3/25 |
|---|---|---|---|---|---|---|---|---|---|---|---|---|
| AAA-AA-HE | (DATA TABLE) | | | | | | | | | | | |
| My CEPS | | | | | | | | | | | | |
| REM Agents | | | | | | | | | | | | |
| My States | | | | | | | | | | | | |
| My Sectors | | | | | | | | | | | | |

| Weekly (Continued) | 4/1 | 4/8 | 4/15 | 4/22 | 4/29 | 5/6 | 5/13 | 5/20 | 5/27 | 6/3 | 6/10 | ... |
|---|---|---|---|---|---|---|---|---|---|---|---|---|
| AAA-AA-HE | (DATA TABLE) | | | | | | | | | | | |
| My CEPS | | | | | | | | | | | | |
| REM Agents | | | | | | | | | | | | |
| ... | | | | | | | | | | | | |

FIG. 38S

MuniPriceTrackerVR Marginal Percentile Savings Page 25 of 52

Debt Monitoring and Analytic Services Report Date 02/22/2012

Client Name: Michigan State University Report Period: 01/01/2011 to 12/31/2011

| | REM Agents | | My States | | My Sectors | | My CEPS | | AAA-AA HE | |
|---|---|---|---|---|---|---|---|---|---|---|
| Percentile | Rate | Par Savings | Rate | Par Savings | Rate | Par Savings | Rate | Par Savings | Rate | Par Savings |
| ... | (DATA TABLE) | | | | | | | | | |
| 14 | | | | | | | | | | |
| 13 | | | | | | | | | | |
| 12 | | | | | | | | | | |
| 11 | | | | | | | | | | |
| 10 | | | | | | | | | | |
| 9 | | | | | | | | | | |
| 8 | | | | | | | | | | |
| 7 | | | | | | | | | | |
| 6 | | | | | | | | | | |
| 5 | | | | | | | | | | |
| 4 | | | | | | | | | | |
| 3 | | | | | | | | | | |
| 2 | | | | | | | | | | |
| 1 | | | | | | | | | | |

FIG. 38U

MuniPriceTrackerVR
Debt Monitoring and Analytic Services

Query Percentile

Page 26 of 52
Report Date 02/22/2012

Client Name: Michigan State University
Report Period: 01/01/2011 to 12/31/2011

My CEPS My Credit Enhancement Providers

| Monthly | 1/31 | 2/28 | 3/31 | 4/30 | 5/31 | 6/30 | 7/31 | 8/31 | 9/30 | 10/31 | 11/30 | 12/31 |
|---|---|---|---|---|---|---|---|---|---|---|---|---|
| All Debt | | | | | | | | | | | | |
| All Debt-NORTHERN TRUST | | | | | | | | | | | | |
| All Debt-Self | | | | | | | | | | | | |
| All Debt-SBPA | | | | | | | (DATA TABLE) | | | | | |
| Client Portfolio | | | | | | | | | | | | |
| Client Portfolio-NORTHERN TRUST | | | | | | | | | | | | |
| Client Portfolio-Self | | | | | | | | | | | | |
| Client Portfolio-SBPA | | | | | | | | | | | | |

| Quarterly | 3/31 | 6/30 | 9/30 | 12/31 |
|---|---|---|---|---|
| All Debt | 27.4% | 27.5% | 24.8% | 25.8% |
| All Debt-NORTHERN TRUST | 26.6% | 26.6% | 43.5% | 38.5% |
| All Debt-Self | 30.2% | 27.5% | 24.8% | 25.8% |
| All Debt-SBPA | 22.5% | 27.5% | 27.5% | 30.7% |
| Client Portfolio | 30.3% | 31.7% | 30.0% | 26.9% |
| Client Portfolio-NORTHERN TRUST | 32.3% | 45.3% | 86.3% | 61.5% |
| Client Portfolio-Self | 96.7% | 87.4% | 61.6% | |
| Client Portfolio-SBPA | 78.9% | 82.2% | 84.2% | 61.4% |

| YTD | 1/31 | 2/28 | 3/31 | 4/30 | 5/31 | 6/30 | 7/31 | 8/31 | 9/30 | 10/31 | 11/30 | 12/31 |
|---|---|---|---|---|---|---|---|---|---|---|---|---|
| All Debt | | | | | | | | | | | | |
| All Debt-NORTHERN TRUST | | | | | | | | | | | | |
| All Debt-Self | | | | | | | | | | | | |
| All Debt-SBPA | | | | | | | | | | | | |
| Client Portfolio | | | | | | | | | | | | |
| Client Portfolio-NORTHERN TRUST | | | | | | | (DATA TABLE) | | | | | |
| Client Portfolio-Self | | | | | | | | | | | | |
| Client Portfolio-SBPA | | | | | | | | | | | | |

FIG. 38V

MuniPriceTrackerVR
Debt Monitoring and Analytic Services

Query PERCENTILE

Page 27 of 52
Report Date 02/22/2012

Client Name: Michigan State University

Report Period: 01/01/2011 to 12/31/2011

My CEPS My Credit Enhancement Providers

| **Weekly** | **1/7** | **1/14** | **1/21** | **1/28** | **2/4** | **2/11** | **2/18** | **2/25** | **3/4** | **3/11** | **3/18** | **...** |
|---|---|---|---|---|---|---|---|---|---|---|---|---|
| All Debt-NORTHERN TRUST | | | | | | | | | | | | |
| All Debt-Self | | | | | | | | | | | | |
| All Debt-SBPA | | | | | | | | | | | | |
| Client Portfolio | | | | | | *(DATA TABLE)* | | | | | | |
| Client Portfolio-NORTHERN TRUST | | | | | | | | | | | | |
| Client Portfolio-Self | | | | | | | | | | | | |
| Client Portfolio-SBPA | | | | | | | | | | | | |

| **Weekly** | **...** | **10/21** | **10/28** | **11/4** | **11/11** | **11/18** | **11/25** | **12/2** | **12/9** | **12/16** | **12/23** | **3/25** |
|---|---|---|---|---|---|---|---|---|---|---|---|---|
| All Debt-NORTHERN TRUST | | | | | | | | | | | | |
| All Debt-Self | | | | | | | | | | | | |
| All Debt-SBPA | | | | | | | | | | | | |
| Client Portfolio | | | | | | | *(DATA TABLE)* | | | | | |
| Client Portfolio-NORTHERN TRUST | | | | | | | | | | | | |
| Client Portfolio-Self | | | | | | | | | | | | |
| Client Portfolio-SBPA | | | | | | | | | | | | |

FIG. 38W

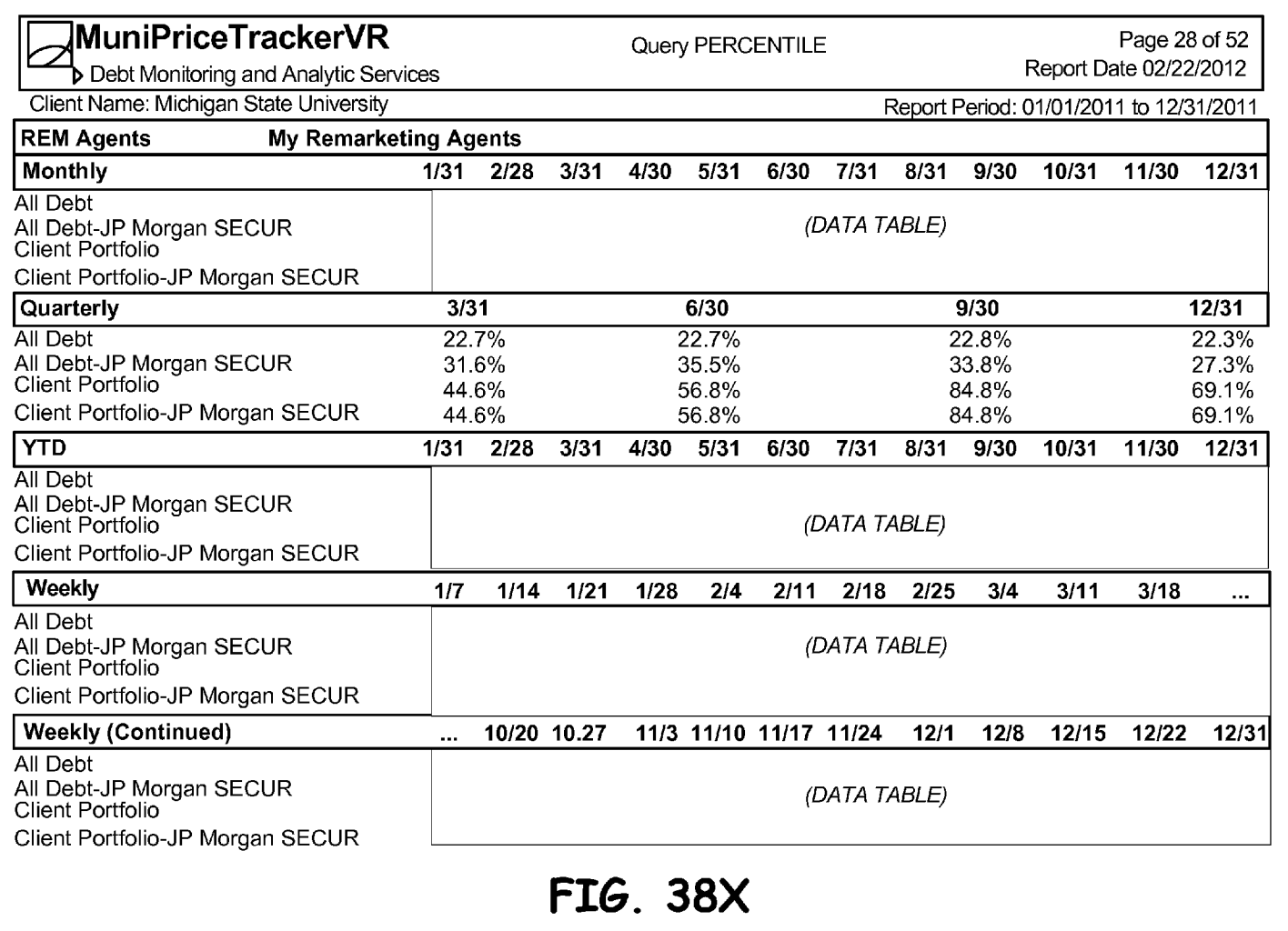

MuniPriceTrackerVR
Debt Monitoring and Analytic Services

Query PERCENTILE

Page 28 of 52
Report Date 02/22/2012

Client Name: Michigan State University
Report Period: 01/01/2011 to 12/31/2011

REM Agents My Remarketing Agents

| **Monthly** | **1/31** | **2/28** | **3/31** | **4/30** | **5/31** | **6/30** | **7/31** | **8/31** | **9/30** | **10/31** | **11/30** | **12/31** |
|---|---|---|---|---|---|---|---|---|---|---|---|---|
| All Debt<br>All Debt-JP Morgan SECUR<br>Client Portfolio<br>Client Portfolio-JP Morgan SECUR | *(DATA TABLE)* | | | | | | | | | | | |

| **Quarterly** | **3/31** | **6/30** | **9/30** | **12/31** |
|---|---|---|---|---|
| All Debt | 22.7% | 22.7% | 22.8% | 22.3% |
| All Debt-JP Morgan SECUR | 31.6% | 35.5% | 33.8% | 27.3% |
| Client Portfolio | 44.6% | 56.8% | 84.8% | 69.1% |
| Client Portfolio-JP Morgan SECUR | 44.6% | 56.8% | 84.8% | 69.1% |

| **YTD** | **1/31** | **2/28** | **3/31** | **4/30** | **5/31** | **6/30** | **7/31** | **8/31** | **9/30** | **10/31** | **11/30** | **12/31** |
|---|---|---|---|---|---|---|---|---|---|---|---|---|
| All Debt<br>All Debt-JP Morgan SECUR<br>Client Portfolio<br>Client Portfolio-JP Morgan SECUR | *(DATA TABLE)* | | | | | | | | | | | |

| **Weekly** | **1/7** | **1/14** | **1/21** | **1/28** | **2/4** | **2/11** | **2/18** | **2/25** | **3/4** | **3/11** | **3/18** | **...** |
|---|---|---|---|---|---|---|---|---|---|---|---|---|
| All Debt<br>All Debt-JP Morgan SECUR<br>Client Portfolio<br>Client Portfolio-JP Morgan SECUR | *(DATA TABLE)* | | | | | | | | | | | |

| **Weekly (Continued)** | **...** | **10/20** | **10.27** | **11/3** | **11/10** | **11/17** | **11/24** | **12/1** | **12/8** | **12/15** | **12/22** | **12/31** |
|---|---|---|---|---|---|---|---|---|---|---|---|---|
| All Debt<br>All Debt-JP Morgan SECUR<br>Client Portfolio<br>Client Portfolio-JP Morgan SECUR | *(DATA TABLE)* | | | | | | | | | | | |

FIG. 38X

MuniPriceTrackerVR Query Percentile Page 29 of 52

Debt Monitoring and Analytic Services Report Date 02/22/2012

Client Name: Michigan State University Report Period: 01/01/2011 to 12/31/2011

| **My States** | **My States** | | | | | | | | | | | |
|---|---|---|---|---|---|---|---|---|---|---|---|---|
| **Monthly** | **1/31** | **2/28** | **3/31** | **4/30** | **5/31** | **6/30** | **7/31** | **8/31** | **9/30** | **10/31** | **11/30** | **12/31** |
| All Debt | (DATA TABLE) | | | | | | | | | | | |
| All Debt-MI - CEP B o NY | | | | | | | | | | | | |
| All Debt-MI - CEP JPM Ch | | | | | | | | | | | | |
| All Debt-State MI By CEP NORTH | | | | | | | | | | | | |
| All Debt-State MI By RMA JP MO | | | | | | | | | | | | |
| All Debt-State MI By Sect. High | | | | | | | | | | | | |
| ... | | | | | | | | | | | | |

| **Quarterly** | **3/31** | **6/30** | **9/30** | **12/31** |
|---|---|---|---|---|
| All Debt | 22.8% | 23.6% | 24.3% | 22.1% |
| All Debt-MI - CEP B o NY | 97.9% | 93.9% | 88.0% | |
| All Debt-MI - CEP JPM Ch | 32.9% | 32.3% | 31.6% | 28.4% |
| All Debt-State MI By CEP NORTH | 95.9% | 98.4% | 96.6% | 94.6% |
| All Debt-State MI By RMA JP MO | 24.0% | 23.6% | 24.3% | 21.7% |
| All Debt-State MI By Sect. High | 67.0% | 70.5% | 66.5% | 62.2% |
| Client Portfolio | 73.5% | 78.4% | 93.6% | 87.7% |
| Client Portfolio-MI - CEP B o NY | 97.9% | 93.9% | 88.0% | |
| Client Portfolio-MI - CEP JPM Ch | 94.7% | 93.2% | 93.2% | 87.5% |
| Client Portfolio-State MI By CEP NORTH | 95.7% | 95.3% | 93.6% | 87.6% |
| Client Portfolio-State MI By RMA JP MO | 73.5% | 78.4% | 93.6% | 87.7% |
| Client Portfolio-State MI By Sect. High | 73.5% | 78.4% | 93.6% | 87.7% |

| **YTD** | **1/31** | **2/28** | **3/31** | **4/30** | **5/31** | **6/30** | **7/31** | **8/31** | **9/30** | **10/31** | **11/30** | **12/31** |
|---|---|---|---|---|---|---|---|---|---|---|---|---|
| All Debt | (DATA TABLE) | | | | | | | | | | | |
| All Debt-MI - CEP B o NY | | | | | | | | | | | | |
| All Debt-MI - CEP JPM Ch | | | | | | | | | | | | |
| All Debt-State MI By CEP NORTH | | | | | | | | | | | | |
| All Debt-State MI By RMA JP MO | | | | | | | | | | | | |
| All Debt-State MI By Sect. High | | | | | | | | | | | | |
| ... | | | | | | | | | | | | |

FIG. 38Y

MuniPriceTrackerVR
Debt Monitoring and Analytic Services

Query Percentile

Page 30 of 52
Report Date 02/22/2012

Client Name: Michigan State University

Report Period: 01/01/2011 to 12/31/2011

| **Weekly** | **1/7** | **1/14** | **1/21** | **1/28** | **2/4** | **2/11** | **2/18** | **2/25** | **3/4** | **3/11** | **3/18** | **...** |
|---|---|---|---|---|---|---|---|---|---|---|---|---|
| All Debt | | | | | | | | | | | | |
| All Debt-MI - CEP B o NY | | | | | | | | | | | | |
| All Debt-MI - CEP JPM Ch | | | | | | | | | | | | |
| All Debt-State MI By CEP NORTH | | | | | | | | | | | | |
| All Debt-State MI By RMA JP MO | | | | | | | | | | | | |
| All Debt-State MI By Sect. High | | | | | | | (DATA TABLE) | | | | | |
| Client Portfolio | | | | | | | | | | | | |
| Client Portfolio-MI - CEP B o NY | | | | | | | | | | | | |
| Client Portfolio-MI - CEP JPM Ch | | | | | | | | | | | | |
| Client Portfolio-State MI By CEP NORTH | | | | | | | | | | | | |
| Client Portfolio-State MI By RMA JP MO | | | | | | | | | | | | |
| Client Portfolio-State MI By Sect. High | | | | | | | | | | | | |

| **Weekly (Continued)** | **...** | **10/20** | **10.27** | **11/3** | **11/10** | **11/17** | **11/24** | **12/1** | **12/8** | **12/15** | **12/22** | **12/31** |
|---|---|---|---|---|---|---|---|---|---|---|---|---|
| All Debt | | | | | | | | | | | | |
| All Debt-MI - CEP B o NY | | | | | | | | | | | | |
| All Debt-MI - CEP JPM Ch | | | | | | | | | | | | |
| All Debt-State MI By CEP NORTH | | | | | | | | | | | | |
| All Debt-State MI By RMA JP MO | | | | | | | | | | | | |
| All Debt-State MI By Sect. High | | | | | | | (DATA TABLE) | | | | | |
| Client Portfolio | | | | | | | | | | | | |
| Client Portfolio-MI - CEP B o NY | | | | | | | | | | | | |
| Client Portfolio-MI - CEP JPM Ch | | | | | | | | | | | | |
| Client Portfolio-State MI By CEP NORTH | | | | | | | | | | | | |
| Client Portfolio-State MI By RMA JP MO | | | | | | | | | | | | |
| Client Portfolio-State MI By Sect. High | | | | | | | | | | | | |

FIG. 38Z

MuniPriceTrackerVR
Debt Monitoring and Analytic Services

Query Percentile

Page 31 of 52
Report Date 02/22/2012

Client Name: Michigan State University
Report Period: 01/01/2011 to 12/31/2011

| My Sectors | My Sectors | | | | | | | | | | | |
|---|---|---|---|---|---|---|---|---|---|---|---|---|
| **Monthly** | **1/31** | **2/28** | **3/31** | **4/30** | **5/31** | **6/30** | **7/31** | **8/31** | **9/30** | **10/31** | **11/30** | **12/31** |
| All Debt | | | | | | | | | | | | |
| All Debt-High Ed-CEP JPM | | | | | | | | | | | | |
| All Debt-Sector Hig By CEP NORT | | | | | | | | | | | | |
| All Debt-Sector Hig By RMA JP M | | | | | | | | | | | | |
| All Debt-Sector Highe By State MI | | | | | | *(DATA TABLE)* | | | | | | |
| Client Portfolio | | | | | | | | | | | | |
| Client Portfolio-High Ed-CEP JPM | | | | | | | | | | | | |
| Client Portfolio-Sector Hig By CEP NORT | | | | | | | | | | | | |
| Client Portfolio-Sector Hig By RMA JP M | | | | | | | | | | | | |
| Client Portfolio-Sector Highe By State M... | | | | | | | | | | | | |

| **Quarterly** | **3/31** | **6/30** | **9/30** | **12/31** |
|---|---|---|---|---|
| All Debt | | | | |
| All Debt-High Ed-CEP JPM | | | | |
| All Debt-Sector Hig By CEP NORT | | *(DATA TABLE)* | | |
| All Debt-Sector Hig By RMA JP M | | | | |
| All Debt-Sector Highe By State MI | | | | |
| ... | | | | |

| **YTD** | **1/31** | **2/28** | **3/31** | **4/30** | **5/31** | **6/30** | **7/31** | **8/31** | **9/30** | **10/31** | **11/30** | **12/31** |
|---|---|---|---|---|---|---|---|---|---|---|---|---|
| All Debt | | | | | | | | | | | | |
| All Debt-High Ed-CEP JPM | | | | | | *(DATA TABLE)* | | | | | | |
| All Debt-Sector Hig By CEP NORT | | | | | | | | | | | | |
| All Debt-Sector Hig By RMA JP M | | | | | | | | | | | | |
| All Debt-Sector Highe By State MI | | | | | | | | | | | | |
| ... | | | | | | | | | | | | |

FIG. 38AA

MuniPriceTrackerVR
Debt Monitoring and Analytic Services

Query Percentile

Page 32 of 52
Report Date 02/22/2012

Client Name: Michigan State University

Report Period: 01/01/2011 to 12/31/2011

| My States | My States | | | | | | | | | | | |
|---|---|---|---|---|---|---|---|---|---|---|---|---|
| **Weekly** | **1/7** | **1/14** | **1/21** | **1/28** | **2/4** | **2/11** | **2/18** | **2/25** | **3/4** | **3/11** | **3/18** | **...** |
| All Debt | (DATA TABLE) | | | | | | | | | | | |
| All Debt-High Ed-CEP JPM | | | | | | | | | | | | |
| All Debt-Sector Hig By CEP NORT | | | | | | | | | | | | |
| All Debt-Sector Hig By RMA JP M | | | | | | | | | | | | |
| All Debt-Sector Highe By State MI | | | | | | | | | | | | |
| Client Portfolio | | | | | | | | | | | | |
| Client Portfolio-High Ed-CEP JPM | | | | | | | | | | | | |
| Client Portfolio-Sector Hig By CEP NORT | | | | | | | | | | | | |
| Client Portfolio-Sector Hig By RMA JP M | | | | | | | | | | | | |
| Client Portfolio-Sector Highe By State M... | | | | | | | | | | | | |
| **Weekly (Continued)** | **...** | **10/20** | **10.27** | **11/3** | **11/10** | **11/17** | **11/24** | **12/1** | **12/8** | **12/15** | **12/22** | **12/31** |
| All Debt | (DATA TABLE) | | | | | | | | | | | |
| All Debt-High Ed-CEP JPM | | | | | | | | | | | | |
| All Debt-Sector Hig By CEP NORT | | | | | | | | | | | | |
| All Debt-Sector Hig By RMA JP M | | | | | | | | | | | | |
| All Debt-Sector Highe By State MI | | | | | | | | | | | | |
| Client Portfolio | | | | | | | | | | | | |
| Client Portfolio-High Ed-CEP JPM | | | | | | | | | | | | |
| Client Portfolio-Sector Hig By CEP NORT | | | | | | | | | | | | |
| Client Portfolio-Sector Hig By RMA JP M | | | | | | | | | | | | |
| Client Portfolio-Sector Highe By State M... | | | | | | | | | | | | |

FIG. 38BB

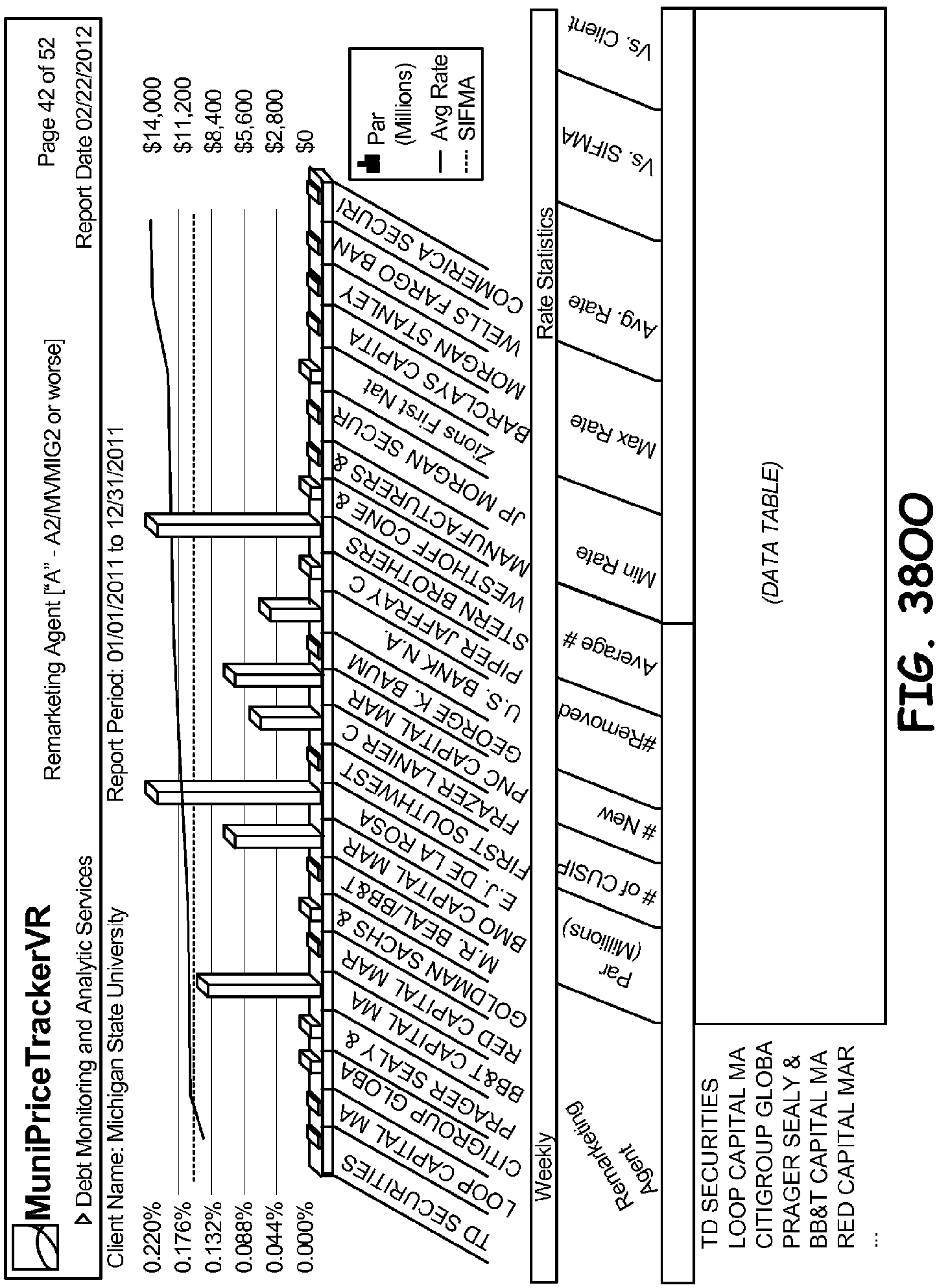
FIG. 3800

MuniPriceTrackerVR

▸ Debt Monitoring and Analytic Services

STARS List

Page 50 of 52
Report Date 02/26/2012

Client Name: Michigan State University

Report Period: 01/01/2010 to 12/31/2010

| | | Avg. Rate | Reset Type | State | | | | | Credit Support | | | Credit Provider Rating | | | Debt Rating | | Underlying Debt Rating |
|---|---|---|---|---|---|---|---|---|---|---|---|---|---|---|---|---|---|
| CUSIP | Borrower | Debt Client | Issue type | Sector | Taxable | AMT | Remarketing Agent | Credit Provider | Fitch | S&P | Moody's | Fitch | S&P | Moody's | Fitch | S&P | Moody's |
| 64972F4W3 | New York City Municipal water Finance Authority | 0.036% | Daily VRDO | NY Water | N | N | Wells Fargo BA | SBPA Mizuho Corp.… | NA/ NA | NA/ NA | Aa1/ NA | AA+/ F1 | AAA/ A-1 | Aa1/ Na | NA/ NA | NA/ NA | NA/ NA |
| ... | ... | ... | ... | ... | ... | ... | ... | ... | ... | ... | ... | ... | ... | ... | ... | ... | ... |

FIG. 38UU

MuniPriceTrackerVR STARS List Page 51 of 52

▶ Debt Monitoring and Analytic Services Report Date 02/26/2012

Client Name: Michigan State University Report Period: 01/01/2010 to 12/31/2010

| | | Avg. Rate | Reset Type | State | | | | Credit Support | Credit Provider Rating | | Debt Rating | | | Underlying Debt Rating | | | |
|---|---|---|---|---|---|---|---|---|---|---|---|---|---|---|---|---|---|
| CUSIP | Borrower | Debt Client | Issue type | Sector | Taxable | AMT | Remarketing Agent | Credit Provider | Fitch | S&P | Moody's | Fitch | S&P | Moody's | Fitch | S&P | Moody's |
| ... | ... | ... | ... | ... | ... | ... | ... | ... | ... | ... | ... | ... | ... | ... | ... | ... | |
| 839423BY5 | South Placer Waste-water Authority/ CA | 0.098% 0.210% | VRDO Weekly | CA Water | N | N | Morgan Stanley | LOC STATE STREET B | NA/ NA | NA/ NA | NA/ NA | NA/ NA | AAA/ A-1+ | Aa1/ VMI G1 | NA/ NA | NA/ NA | NA/ NA |

FIG. 38VV

MuniPriceTrackerVR
Debt Monitoring and Analytic Services

STARS List

Page 52 of 52
Report Date 02/22/2012

Client Name: Michigan State University

Report Period: 01/01/2011 to 12/31/2011

| | | | | | | | | | |
|---|---|---|---|---|---|---|---|---|---|
| 839423BZ2 | Wastewater Autority /CA | 0.098% 0.210% | Weekly VRDO | NY Water | N N | MORGAN STANLY | LOC U.S. BANK NA | NA/ NA NA/ NA Aa1/ NA NA/ NA AAA/ A-L+ Aa1/V MIG1 | NA/ NA NA/ NA NA/ NA |
| 64986UJY4 | New York State Housing Finance Agency | 0.098% 0.210% | Weekly VRDO | NY Multifa-mily Hsg | N | MANUFAC-TURERS | LOC WELLS FARGO BA | NA/ NA NA/ NA Aa1/ NA NA/ NA NA/ NA Aa3/V MIG1 | NA/ NA NA/ NA NA/ NA |
| 64986UGT8 | New York State Housing Finance Agency | 0.098% 0.210% | Weekly VRDO | NY Multifa-mily Hsg | N N | JP MORGAN SECUR | LOC WELLS FARGO BA | NA/ NA NA/ NA Aa1/ NA NA/ NA NA/ NA Aa3/V MIG1 | NA/ NA NA/ NA NA/ NA |

FIG. 38WW

| Query / Credit Provider | Par (Millions) | # of CUSIP | # New | #Removed | Average# | Rate Statistics: Max Rate | Min Rate | Avg Rate | Vs. SIFMA | Vs. Client |
|---|---|---|---|---|---|---|---|---|---|---|
| All Debt | $27,758 | 1241 | 49 | 163 | 1307 | 0.040% | 6.050% | 0.349% | 0.085% | 0.106% |
| All Debt-JPM REM Agent | $2,076 | 68 | 5 | 12 | 71 | 0.050% | 4.000% | 0.322% | 0.058% | 0.080% |
| All Debt-Merrill Remark. | $15,416 | 690 | 28 | 33 | 701 | 0.040% | 4.300% | 0.340% | 0.076% | 0.098% |
| Client Portfolio | $108 | 7 | 0 | 0 | 7 | 0.100% | 0.420% | 0.242% | -0.022% | 0.000% |
| Client Portfolio-JPM REM Agent | $75 | 5 | 0 | 0 | 5 | 0.120% | 0.430% | 0.242% | -0.022% | -0.001% |
| Client Portfolio-Merrill Remark | $32 | 2 | 0 | 0 | 2 | 0.100% | 0.420% | 0.244% | -0.020% | 0.001% |

| Credit Provider | | |
|---|---|---|
| Monthly | 1/31 | 2/28 |
| All Debt | 31.4 | ↘ 29.2 |
| All Debt-JPM Rem Agent | 14.3 | ↑ 27.5 |
| All Debt-Merrill Remark. | 44.6 | ↘ 34.4 |
| Client Portfolio | 69.3 | ↗ 75.1 |
| Client Portfolio-JPM Rem Agent | 55.8 | ↗ 69.7 |
| Client Portfolio-Merrill Remark. | 78.8 | ↗ 89.9 |

FIG. 43

| Percentile | Credit Provider | |
|---|---|---|
| | Rate | Par(000) |
| 100 | 6.300% | $11,177 |
| 99 | 4.456% | $7,906 |
| 98 | 4.100% | $7,274 |
| 97 | 3.524% | $6,252 |
| 96 | 3.232% | $5,734 |
| 95 | 2.640% | $4,684 |
| 94 | 2.248% | $3,988 |
| 93 | 1.856% | $3,293 |
| 92 | 1.700% | $3,016 |
| 91 | 1.400% | $2,483 |
| 90 | 1.100% | $1,951 |
| 89 | 1.000% | $1,774 |
| 88 | 0.800% | $1,419 |
| 87 | 0.800% | $1,419 |
| 86 | 0.700% | $1,241 |
| 85 | 0.600% | $1,064 |
| 84 | 0.400% | $709 |
| 83 | 0.400% | $709 |
| 82 | 0.300% | $532 |
| 81 | 0.200% | $354 |
| 80 | 0.100% | $177 |
| 79 | -0.132% | -$234 |
| 78 | -0.300% | -$532 |
| 77 | -0.600% | -$1,064 |
| 76 | -0.900% | -$1,596 |
| 75 | -1.300% | -$2,306 |
| 74 | -1.776% | -$3,151 |
| 73 | -2.684% | -$4,762 |
| 72 | -3.000% | -$5,322 |
| 71 | -3.100% | -$5,500 |
| 70 | -3.460% | -$6,138 |

FIG. 44

| Weekly | | Rate Statistics | | | |
|---|---|---|---|---|---|
| Credit Provider | Par (Millions) | Min Rate | Max Rate | Avg Rate | Vs. SIFMA |
| FREDDIE MAC | $1,727 | 0.08% | 2.25% | 0.30% | 0.03% |
| FANNIE MAE | $2,868 | 0.05% | 7.00% | 0.30% | 0.04% |
| BRANCH BANKING | $3,130 | 0.12% | 0.53% | 0.30% | 0.04% |
| PNC BANK, N.A | $4,018 | 0.10% | 4.00% | 0.33% | 0.07% |
| WELLS FARGO BAN | $1,591 | 0.08% | 4.25% | 0.35% | 0.08% |
| WELLS FARGO BOFA | $3,035 | 0.10% | 4.15% | 0.36% | 0.10% |
| | $13,857 | 0.05% | 4.30% | 0.36% | 0.10% |

FIG. 45

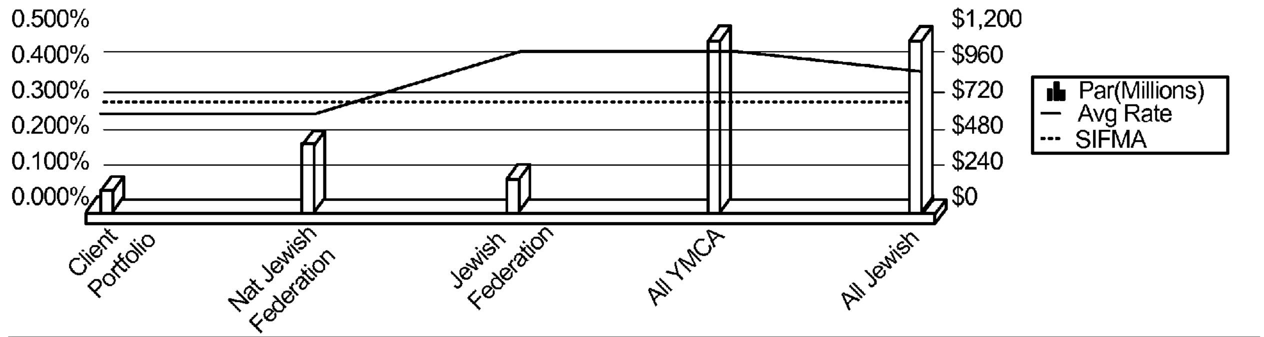

| Query | Par (Millions) | #of CUSIP | # New | # Removed | Avg# | Max Rate | Min Rate | Avg Rate | Vs. SIFMA | Vs. Client |
|---|---|---|---|---|---|---|---|---|---|---|
| | | | | | | Rate Statistics | | | | |
| YMCA and Jewish | Compare toYMCA and other Jewish Orgs | | | | | | | | | |
| Client Portfolio | $108 | 7 | 0 | 0 | 7 | 0.030% | 0.400% | 0.153% | 0.000% | 0.000% |
| Nat Jewish Federation | $466 | 31 | 1 | 0 | 30 | 0.030% | 0.570% | 0.154% | 0.001% | 0.001% |
| Jewish Federation | $246 | 13 | 2 | 5 | 16 | 0.020% | 2.500% | 0.293% | 0.140% | 0.140% |
| ALL YMCA | $1,283 | 113 | 6 | 24 | 121 | 0.020% | 5.420% | 0.328% | 0.175% | 0.175% |
| ALL Jewish | $1,293 | 82 | 3 | 6 | 85 | 0.010% | 2.500% | 0.219% | 0.066% | 0.066% |

FIG. 46

| YMCA and Jewish | Compare toYMCA and other Jewish Orgs | | | | |
|---|---|---|---|---|---|
| **Monthly** | 1/31 | 2/29 | 3/31 | 4/30 | 5/31 |
| ALL Jewish | 43.7% | 37.8% | 36.3% | 40.1% | 35.6% |
| ALL YMCA | 15.4% | 17.2% | 17.6% | 16.5% | 18.4% |
| Client Portfolio | 79.9% | 82.7% | 69.7% | 93.7% | 92.0% |
| Jewish Federation | 54.6% | 52.2% | 46.4% | 40.1% | 20.0% |
| Nat Jewish Federation | 68.0% | 79.7% | 69.2% | 92.5% | 76.4% |

FIG. 47

JP MORGAN SECUR

| CUSIP | Borrower | %Matching | #Matching Exactly | Average Rate | Taxable | AMT | Reset Type | Credit Support | Credit Provider | Remarketing Agent | State | Sector |
|---|---|---|---|---|---|---|---|---|---|---|---|---|
| 010808CB7 | Alameda Pub... | 100.00% | 52 | 0.105% | N | N | Weekly | LOC | California St... | JP MORGAN SEC... | CA | Development |
| 040507EM3 | Southwest Be... | 100.00% | 52 | 0.105% | N | N | Weekly | LOC | JPMorgan... | JP MORGAN SEC... | AZ | Medical |
| 040507JT3 | Catholic Healt... | 100.00% | 52 | 0.105% | N | N | Weekly | LOC | JPMorgan... | JP MORGAN SEC... | AZ | Medical |
| 040507JU0 | Catholic Healt... | 100.00% | 52 | 0.105% | N | Y | Weekly | LOC | PNC BANK... | JP MORGAN SEC... | AZ | Medical |
| 13033K4F3 | California Hou... | 100.00% | 52 | 0.105% | N | Y | Weekly | LOC | FANNIE MAE | JP MORGAN SEC... | CA | Single Fami... |
| 13033K4R7 | California Hou... | 100.00% | 52 | 0.105% | N | Y | Weekly | LOC | FANNIE MAE | JP MORGAN SEC... | CA | Single Fami... |
| 13033K4S5 | California Hou... | 100.00% | 52 | 0.105% | N | Y | Weekly | LOC | FANNIE MAE | JP MORGAN SEC... | CA | Single Fami... |
| 13033KB73 | California Hou... | 100.00% | 52 | 0.105% | N | Y | Weekly | LOC | FANNIE MAE | JP MORGAN SEC... | CA | Single Fami... |
| 13033KW70 | California Hou... | 100.00% | 52 | 0.105% | N | Y | Weekly | LOC | FANNIE MAE | JP MORGAN SEC... | CA | Single Fami... |
| 13034PQK6 | California Hou... | 100.00% | 52 | 0.105% | N | Y | Weekly | LOC | FANNIE MAE | JP MORGAN SEC... | CA | Single Fami... |
| 13034PQL4 | California Hou... | 100.00% | 52 | 0.105% | N | Y | Weekly | LOC | FANNIE MAE | JP MORGAN SEC... | CA | Single Fami... |
| 13034PQM2 | California Hou... | 100.00% | 52 | 0.105% | N | Y | Weekly | LOC | FANNIE MAE | JP MORGAN SEC... | CA | Single Fami... |
| 13034PQP5 | California Hou... | 100.00% | 52 | 0.105% | N | N | Weekly | LOC | FANNIE MAE | JP MORGAN SEC... | CA | Single Fami... |
| 196474K58 | Sisters of Cha... | 100.00% | 52 | 0.105% | N | N | Weekly | SBPA | JPMorgan... | JP MORGAN SEC... | CO | Medical |
| 196474YM6 | Sisters of Cha... | 100.00% | 52 | 0.105% | N | N | Weekly | SBPA | JPMorgan... | JP MORGAN SEC... | CO | Medical |
| 196479UR8 | Colorado Hou... | 100.00% | 52 | 0.105% | N | Y | Weekly | SBPA | JPMorgan... | JP MORGAN SEC... | CO | Multifamily... |
| 196483BW0 | Colorado Hou... | 100.00% | 52 | 0.105% | N | N | Weekly | SBPA | Federal Ho... | JP MORGAN SEC... | CO | Single Fami... |
| 212491AN4 | PacifiCorp | 100.00% | 52 | 0.105% | N | N | Weekly | LOC | Wells Fargo... | JP MORGAN SEC... | WY | Pollution |
| 250116AQ3 | Central Iowa ... | 100.00% | 52 | 0.105% | Y | N | Weekly | LOC | Wachovia... | JP MORGAN SEC... | IA | Medical |
| 286344AC0 | Judson Colle... | 100.00% | 52 | 0.105% | Y | N | Weekly | LOC | JPMorgan... | JP MORGAN SEC... | IL | Higher Edu... |
| 291147BW5 | PacifiCorp | 100.00% | 52 | 0.105% | N | | Weekly | LOC | JPMorgan... | JP MORGAN SEC... | UT | Pollution |

FIG. 48

MUNICIPAL BOND TRACKING AND EVALUATION SYSTEM

CROSS-REFERENCE TO RELATED APPLICATIONS

This continuation-in-part patent application claims the benefit of priority to the non-provisional patent application filed on Oct. 17, 2012, Ser. No. 13/573,990 and the provisional patent application filed on Oct. 17, 2011, Ser. No. 61/547,922.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. © MuniPriceTracker, LLC. 2011. All Rights Reserved.

BACKGROUND OF THE INVENTION

Field of the Invention

The present invention relates to variable rate bond obligations ("VRDOs" or "VRs," typically public debt), commercial paper ("CP", typically private debt) and Auction Rate Securities ("ARS") sold in the marketplace. More specifically, the invention concerns locating, assimilating and quantifying data regarding VRDOs, CPs and ARS (collectively "Debt Securities") sold in the marketplace to assist parties involved with such Debt Securities to increase efficiencies in issuing the Debt Securities to better rate, classify and value the same.

Variable rate demand obligations, notes or bonds are long term debt instruments typically issued by municipalities, health care organizations, colleges and universities and non-profit agencies and corporations, which are sold in the marketplace for capital funding or cash management purposes. The VRDO market is an active "push" market where agents actively reach out to potential investors via phone and electronic mail to drive sales.

VRDO interest rates are frequently driven by benchmark interest rates on which the VRDO depends. Further, the interest rates paid on VRDOs are periodically reset by remarketing agents based on the bids of potential buyers.

VRDOs frequently require a liquidity backstop typically in the form of third-party letters of credit (LOCs), standby bond purchase agreements (SBPAs) or backing from the bond issuer or borrower. These liquidity backstops are typically provided by Credit Enhancement Providers (CEPs).

VDRO quality is rated by various rating agencies. However, each VRDO has different characteristics and attributes, making it very difficult to identify or group "similar" VRDOs and to compare performance of VRDOs to obtain meaningful analysis or insight regarding pricing and performance of VRDOs, both at the time of initial issuance and when the VRDO is resold in the secondary market.

Commercial paper (CP) consists of short-term, promissory notes offered and issued primarily by corporations. Maturities typically range up to 270 days but average about 30 days. Many companies use CP to raise cash needed for current transactions, and many find it to be a lower-cost alternative to bank loans. The CP market is mostly a "pull" market where inventory is offered by dealers on electronic marketplaces, with less frequent dealer/investor interaction.

An auction rate security (ARS) is a municipal security for which the interest rate resets on a periodic basis through an auction process. The typical auction process is one referred to as a Dutch auction in which securities are sold at the lowest interest rate, or "clearing rate," at which all of the securities that have been offered for sale by current holders of the securities will clear the market. Auctions are conducted by agents of the issuer of the ARS, called auction agents, and orders are submitted to the auction agent by certain dealers, called program dealers, that have rights granted to them through an agreement with the issuer or auction agent to submit orders.

Information and data regarding Debt Securities is scattered and what data exists is typically provided in disparate formats. Further, data sources frequently capture different information regarding Debt Securities making it very difficult to find and use information concerning how a Debt Security was grouped or rated and if that classification was proper, (industry) sector influences, the cost of issuance of Debt Securities, how Debt Securities performed, how the Debt Securities compared to truly similar Debt Securities and what patterns can be gleaned when Debt Securities are compared to similar Debt Securities.

There is a need in the marketplace to provide issuers, dealers, buyers, CEPs, advisors and rating services with real time, comparative information regarding VRDOs, CPs and ARS costs, market rates, liquidity, ratings and pricing patterns.

BRIEF DESCRIPTION OF THE DRAWINGS

Referring now to the drawings, wherein like reference numerals indicate corresponding structure through the several views:

FIG. 30 is an exemplary embodiment of a table showing the labeling of three rating connections along with three rating organizations;

FIGS. 38-38WW constitute a Master Report generated by the present invention;

FIG. 38 is an exemplary Client Portfolio Report identifying client debts;

FIG. 38A is an exemplary Client Portfolio Detail Report of the same securities identified in FIG. 38, disclosing additional information, such as state, sector, remarketing agent, credit provider ratings, debt ratings and underlying debt ratings;

FIG. 38B is a Client Summary Report illustrating an exemplary periodic Client and SIFMA average information;

FIGS. 38K-38Q constitute an exemplary Query Average Rate Report for the queries identified in FIGS. 38H-38J for various periods;

FIGS. 38T-38U constitute an exemplary Marginal Percentile Savings Report for the queries identified in FIGS. 38H-38J which show how much savings the client could achieve by performing better in each of the queries;

FIGS. 38V-38BB constitute an exemplary Query Percentile Report for the queries and sub queries identified in FIGS. 38H-38J which show how each sub query compares to the overall query;

FIGS. 38CC-38DD constitute an exemplary Credit Enhancement Provider Report illustrating the top 25 performing CEP by lowest average reset rate by daily and weekly resetting debts;

FIGS. 38EE-38FF constitute an exemplary Credit Enhancement Provider Report illustrating the top 25 performing CEP by lowest average reset rate and having a "AA" rating or better by daily and weekly resetting debts;

FIGS. 38GG-38HH constitute an exemplary Credit Enhancement Provider Report illustrating the top 25 performing CEP by lowest average reset rate and having an "A" rating or worse by daily and weekly resetting debts;

FIGS. 38II-38JJ is an exemplary Remarketing Agent Report illustrating the top 25 performing Remarketing Agents by lowest average reset rate by daily and weekly resetting debts;

FIGS. 38KK, 38MM is an exemplary Remarketing Agent Report illustrating the top 25 performing Remarketing Agents by lowest average reset rate by daily and weekly resetting debts with debts having a "AA" rating or better;

FIGS. 38NN-38OO is an exemplary Remarketing Agent Report illustrating the top 25 performing Remarketing Agents by lowest average reset rate by daily and weekly resetting debts with debts having an "A" rating or worse.

FIGS. 38PP-38RR is an exemplary General Market Statistics Report which shows aggregate data grouped by tax status, specialty states, sectors, and ratings;

FIGS. 38SS-38TT is an exemplary States Report of debt information;

FIGS. 38UU, 38VV and 38WW constitute an exemplary STARS List Report ranking securities by overall performance;

FIG. 43 is an exemplary CEP Marginal Percentile Savings report of the present invention;

FIG. 44 is an exemplary CEP Performance Summary report for CEPs having at least 100 associated securities of the present invention;

FIG. 45 is an exemplary summary report illustrating the performance of a client portfolio to other portfolios of the present invention;

FIG. 46 is an exemplary client portfolio Percentile summary of the present invention; and FIG. 47 is an exemplary summary report of a client remarketing agent bucket list of the present invention; and FIG. 48 is an exemplary listing of fields that may appear in a "Query Management Screen" of the present invention.

BACKGROUND OF THE INVENTION

Figure 1:
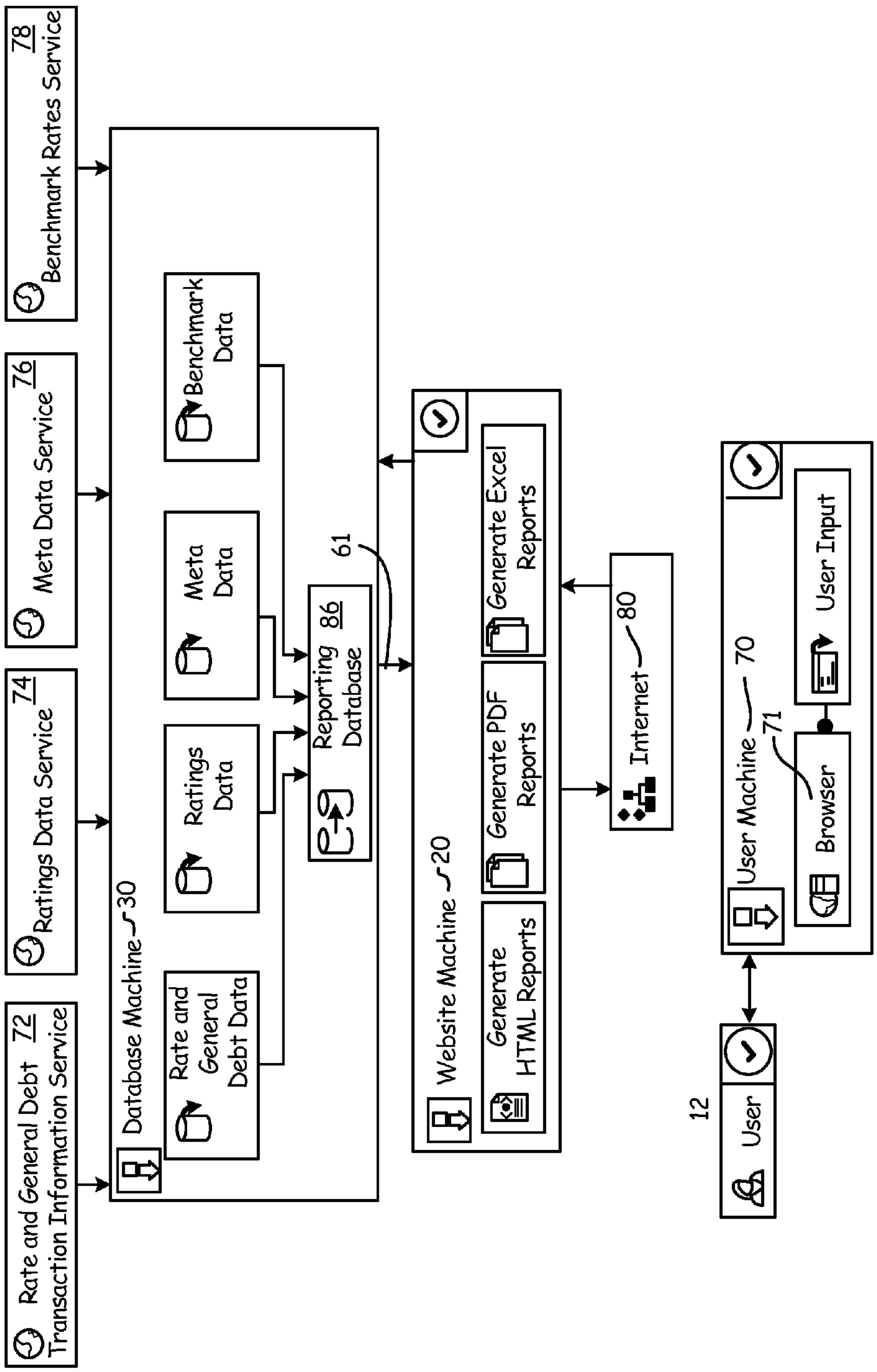
FIG. 1 is a general overview and flow diagram of the system and communication network of the present invention.

Historically, gathering information for Debt Securities was decentralized, inefficient and unreliable. Market participants have found it difficult to obtain even the most basic information about key terms and features of securities and increasingly recognize the need for security-specific market participant data. The centralized, searchable database system of the present invention provides a cost and time efficient solution to this problem.

SUMMARY OF THE INVENTION

The present invention is a web-based, real time system for tracking VRDO, Commercial Paper borrowings and Auction Rate Securities referred to as the MuniPriceTracker Variable Rate, MuniPriceTracker-VR or MPT-VR system. The system includes one or more web based database servers in communication with live data feeds from networked databases containing Debt Securities trade information, such as VRDO, CP and ARS daily, weekly, monthly and other periodic interest rate period resets, and Meta Data or meta-tags of descriptive information regarding the Debt Securities, including without limitation, debt issuance date, benchmark rates, debt ratings, debt list, debt history, business sector, state sector, tax sector, interest rates, resetting history and any other criteria of interest.

The data that is available from these live data feeds varies considerably from one data feed to another and is typically provided in different data formats. Once the data feed information is gathered by database servers, the data is converted to a common format so that it can be combined and manipulated to provide useful results.

The database servers are communicatively connected over a network to a website server. The Munipricetracker program resident on the website or program server combines Meta Data pertaining to VDRO, CP and ARS with rating information to create a searchable database of data that can be used to compare debt performance, identify patterns and ascertain inefficiencies in debt issuance based on queried debt criteria and characteristics.

Potential Users of the system could include:

1) Borrowers looking to lower cost of capital;
2) Investors of Money Market Funds and Individually Managed Accounts looking to pick up yield;
3) Dealers looking to rank their own performance by sectors to tout superior performance;
4) Brokers;
5) Advisors looking for new recurring services to provide to existing client base;
6) Credit Enhancement Providers (CEP) to assess the performance of previous VRDO and CP which the CEP is asked to enhance; and
7) Governmental entities.

A system User may operate the website server directly or may link to the website server through a networked User computer to initiate search queries. A query engine, typically contained within the website server, allows the User to create unique queries to retrieve desired information, evaluate patterns and compare and rank the performance of Debt Security issuers and dealers, among other actions. The User can save the queries for periodic performance evaluation. The user can also save a portfolio of their securities which is used as a compare source for any query.

By way of example, queries can be conducted on the present system include but are not limited to:

A) rank the performance and return statistics for, by way of example:
   1) all AA-rated hospitals nationwide;
   2) all hospitals with common ownership or management;
   3) all AA-rated hospitals that are remarketing clients of a particular brokerage;
   4) all AA-rated hospitals nationwide by dealer; and
   5) all AA-rated hospitals nationwide by credit enhancement provider.

B) determine whether a client portfolio is properly grouped with similarly situated securities;

C) compare performance of a client portfolio to similarly grouped portfolios;

D) examine remarketing agent performance over time; or

E) examine general market data for various categories including:
   1) by State
   2) top Credit Enhancement Providers by reset type and credit rating
   3) top Remarketing Agents by reset type and credit rating
   4) top Securities with lowest resets by reset type
   3) by Credit Enhancement Type
   3) by Credit Enhancement Ratings
   3) by Sector
   3) by Tax Status By way of further example, Borrower queries might include determining if the borrower's cost of capital is lower or higher relative to the market average and options available to the borrower to tweak its service provider or enhance its credit. Investor queries would be very similar but reverse logic would apply in order to find the best yield. Advisors assisting either borrowers or investors would use both methods.

The unique business information obtained through this process can be utilized to deliver cost saving measures to borrowers (such as municipalities, health care organizations, colleges and universities, and non-profit agencies, corporations and other CP issuers), yield pick-up for investors, dealer ranking for dealers in the business of arranging such financing, inform advisors, assist in establishing issue or offering prices, provide information that discloses pricing patterns, groupings of debts, debt characterization and performance and credit enhancements provided in different sectors and the effectiveness of the same, among other unlimited possibilities.

DETAILED DESCRIPTION OF THE PREFERRED EMBODIMENT

For a thorough understanding of the present disclosure, refer to the following detailed description, including the appended claims, in connection with the above-described drawings. The present invention is described infra in terms of a VRDO (by way of example only), but the system works equally well for Commercial Paper and Auction Rate Securities. Although the present disclosure is described in connection with exemplary embodiments, the present disclosure is not intended to be limited to the specific forms set forth herein. The disclosure is illustrative only, and changes may be made in detail within the principles of the invention to the full extent indicated by the broad general meaning of the terms in which the appended claims are expressed. It is understood that various omissions and substitutions of equivalents are contemplated as circumstances may suggest or render expedient, but these are intended to cover the application or implementation without departing from the spirit or scope of the claims of the present disclosure.

It is also to be understood that the phraseology and terminology used herein is for the purpose of description and should not be regarded as limiting. Further, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

DEFINITIONS

The following defined terms are used in this description of the present invention:

Benchmark Rates

A base index rate on which a particular security or debt interest rate is based, typically at a margin or spread.

Borrower

A Borrower is an organization that is using funds on credit.

Broker/Dealer

The term broker or dealer is used interchangeably and sometimes hyphenated. A broker-dealer is a term used in United States financial services regulations. It is a natural person, a company or other organization that trades securities for its own account or on behalf of its customers. Although many broker-dealers are "independent" firms solely involved in broker-dealer services, many others are business units or subsidiaries of commercial banks, investment banks or investment companies. When executing trade orders on behalf of a customer, the institution is said to be acting as a broker. When executing trades for its own account, the institution is said to be acting as a dealer. Securities bought from clients or other firms in the capacity of dealer may be sold to clients or other firms acting again in the capacity of dealer, or they may become a part of the firm's holdings.

Credit Enhancement Provider (CEP)

A CEP is an organization that creates an instrument that enhances the debt ratings for the Issuer/Borrower. The enhancement instruments may include:

1. (L)—LOC—Letter Of Credit;
2. (S)—SBPA—Standby Bond Purchase Agreement;
3. (D)—Dedicated Line;
4. (G)—Guarantee Agreement; and
5. (O)—An instrument other than a LOC or SBPA.

CUSIP

A CUSIP is a unique identifier often used to identify bonds or other debt obligation.

Debt

A debt is a bond or other security, including a variable rate demand obligation, an auction rate security or commercial paper (or other private debt). A Debt may or may not have a CUSIP if it is private debt. The system may also use Debt ID as the primary key throughout the database model instead of CUSIP.

Issuer

An issuer is an organization that is able to issue its own securities. The Issuer may also be the Borrower.

Master Report

A report that contains a complete set of all client requested reports.

Meta Data: Data regarding debt characteristics or identifiers, including without limitation:

1. CUSIP
2. Initial Par Amount—The initial amount of Par Amount associated with the debt. This is not necessarily the amount that is being traded.
3. Date Dated—The date the bond was first put on the market.
4. Bond Name—The name of the bond
5. Description—A description of the bond
6. Reset Date—Date of Reset
7. Par Amount—The Par Amount associated with a particular reset
8. Issuance Type—Describes the issuance type of the debt. This list includes but is not limited to Variable Rate Debt Obligation (VRDO), Commercial Paper (CP Mode), and Auction Rate Security (ARS).
9. Reset Type—Describes what normal interval the debt resets. The list of options includes but is not limited to Daily, Weekly, Monthly, Quarterly, Semi-Annual, Yearly, 1-180, 1-270, and Unknown. Our system groups them into Daily, Weekly, and Other.
10. Maturity Date—Date the debt matures.
11. Data Feed—Describes whether or not the data was received from one of the data feeds or was user entered.
12. Is State Taxable—Determines if the debt is taxable at the state level.
13. Is Fed Taxable—Determines if the debt is taxable at the federal level.
14. Is AMT—Determines if is Alternative Minimum Tax is applicable for this debt.
15. Remarketing Agent—Who remarkets the debt, sets the reset rates.
16. State Province—What state/province is the debt from.
17. Business Sector—What business sector is the Issuer of the debt considered to be from 18. Debt Sector—What business sector is the debt considered to be from.
19. Credit Enhancement Type—What type of credit enhancement does the debt have. This includes but is not limited to Letter of Credit (LOC) and Purchase Agreement.
20. Credit Enhancement Provider—Who the credit enhancement provider is
21. Credit Enhancement End Date—When the credit enhancement ends
22. Min Rate—The minimum rate that the variable rate can be set to.
23. Max Rate—The maximum rate that the variable rate can be set to.
24. Issuer—Who issued the debt
25. Borrower—The underlying borrower. This may or may not be the same as the Issuer.
26. Rating—The rating of the debt. The system subscribes to various Credit Rating Provider feeds and collects the short, long, and underlying for all its Credit Rating Providers.

Ratings

A rating from a service such as Moody's, S&P, and Fitch, among others, that helps determine the credit risk factor of various organizations as well as the specific debts.

Remarketing Agent

An agent that is responsible for setting the reset interest rates of the VRDO

Reset Rates

A periodic change in the market interest rate of a VRDO. Resets can occur hourly, daily, weekly, monthly or other periods of time, but are typically daily.

Threshold

A specified value or limit for a monitored variable which triggers a notification of the value or limit being reached or surpassed.

Users

The following may be some of the typical Users of the system:

A. Operations Staff (OS, also Facilitator Application Administrative Staff)
   OS are responsible for validating the data automatically obtained by the system and evaluating any issues that are reported. In the event that a discrepancy is found, OS has the ability to correct and replace the data.
B. Sales Staff (SS, also Facilitator Staff for Demonstrations of the system)
   SS may have a client account with dummy data and use it to demonstrate the functionality offered by the service. SS will have no additional functionality compared to other customers.
C. System Clients:
   Clients or Customers of the system may include Borrowers, Investors, CEPS, Advisors, bank regulators, Securities Dealers and Brokers.
D. Borrowers.
E. Investors.
F. Advisors (Multiple Clients Access).
G. Governmental entities at all levels.

The system is intended to be used by all of the Users and for all of the Debt Securities identified above. By way of illustration only, the system will be described as being used by a "client" of a system provider. The client in this illustration owns a portfolio of securities and will use the system to obtain information about VRDOs. It is to be understood that Advisors, Brokers, CEPs and other potential Users of the system could use the system in a like manner for information of interest to such Users.

System Configuration

FIG. 1 is a general overview and flow diagram of the system 10 and communication network of the present invention. In this specimen embodiment, a computing device 20 is connected (e.g., networked over an intranet or, as shown, internet 61) to one or more database servers 30. The computing device 20 obtains data feeds from one or more data base servers 30, which in turn obtain data from one or more networked data feed sources 32. In this networked deployment, the computing device 20 can operate in the capacity of a website server or a client machine in a server-client network environment, or as a peer machine in a peer-to-peer (or distributed) network environment. The website server 20 is also in communication over a network, typically the internet 80, with a User computer 70.

Figure 2:
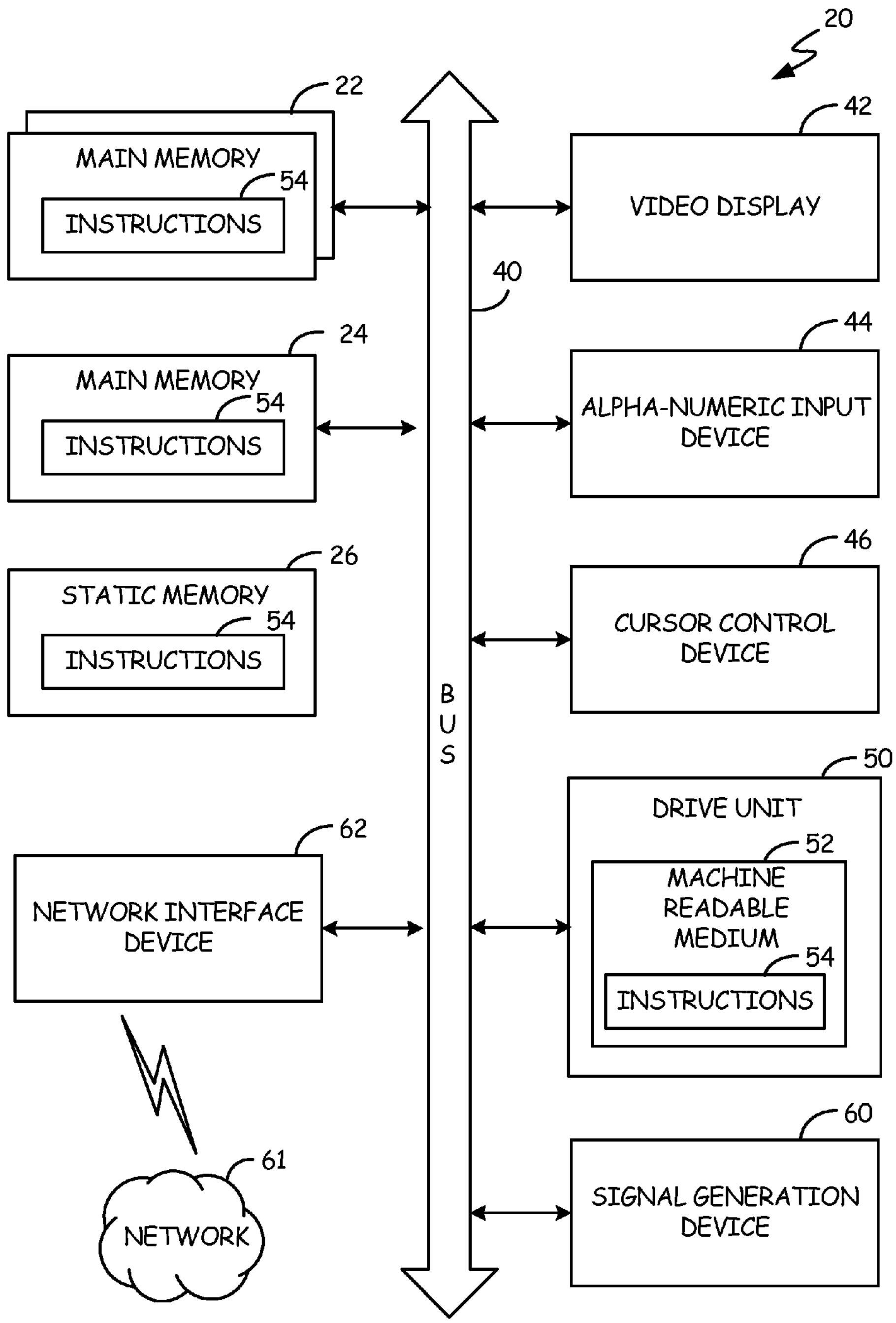
FIG. 2 is a diagrammatic representation of an example embodiment of a computer used in the present invention.

FIG. 2 shows a diagrammatic representation of a computing device 20 of the present invention utilized as a website server. All activities related to a service may be automated from the website server 20. These activities include generally, account creation, data access, notification set up, and report generation.

Website server 20 can be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single computing device 20 is illustrated, the terms "computing device" or "machine" shall also be taken to include any collection of devices that individually or jointly execute a set (or multiple sets) of instructions to perform any one or more of the methodologies discussed herein. Data feeds are automatically provided to the database servers 30, including data pertaining to debt ratings and meta data identifying debt trade detail. This information is assimilated mathematically to provide the data in a common format. Meta Data is applied to the reformatted data by the website server 20 to identify unique characteristics pertaining to various debts identified in the data feeds. This allows the data to be substantively searched for various information of concern to the User. Again, Users may include debt issuers, borrowers, investors, advisors, dealers/brokers, credit enhancement providers, as well as government agencies.

The website server 20 includes a processor or multiple processors 22 (e.g., a central processing unit (CPU), a graphics processing unit (GPU), arithmetic logic unit or all), and a main memory 24 and a static memory 26, which communicate with each other via a bus 40. The computing device 20 can further include a video display unit 42 (e.g., a liquid crystal displays (LCD) or a cathode ray tube (CRT)). The computing device 20 also includes an alphanumeric input device 44 (e.g., a keyboard), a cursor control device 46 (e.g., a mouse), a disk drive unit 50, a signal generation device 60 (e.g., a speaker) and a network interface device 62.

The disk drive unit 50 includes a computer-readable medium 52 on which is stored one or more sets of instructions and data structures (e.g., instructions 54) embodying or utilized by any one or more of the methodologies or functions described herein. The instructions 54 can also reside, completely or at least partially, within the main memory 24 and/or within the processors 22 during execution thereof by the computing device 20. The main memory 24 and the processors 22 also constitute machine-readable media. The instructions 54 can further be transmitted or received over a network 61 via the network interface device 62 utilizing any one of a number of well-known transfer protocols (e.g., Hyper Text Transfer Protocol (HTTP), CAN, Serial, or Modbus).

While the computer-readable medium 52 is shown in an example embodiment to be a single medium, the term "computer-readable medium" should be taken to include a single medium or multiple media (e.g., a centralized or distributed database, and/or associated caches and servers) that store the one or more sets of instructions and provide the instructions in a computer readable form. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, tangible forms and signals that can be read or sensed by a computer. Such media can also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. Modules as used herein can be hardware or hardware including circuitry to execute instructions. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method(s) can be written in any number of suitable programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Figure 27:
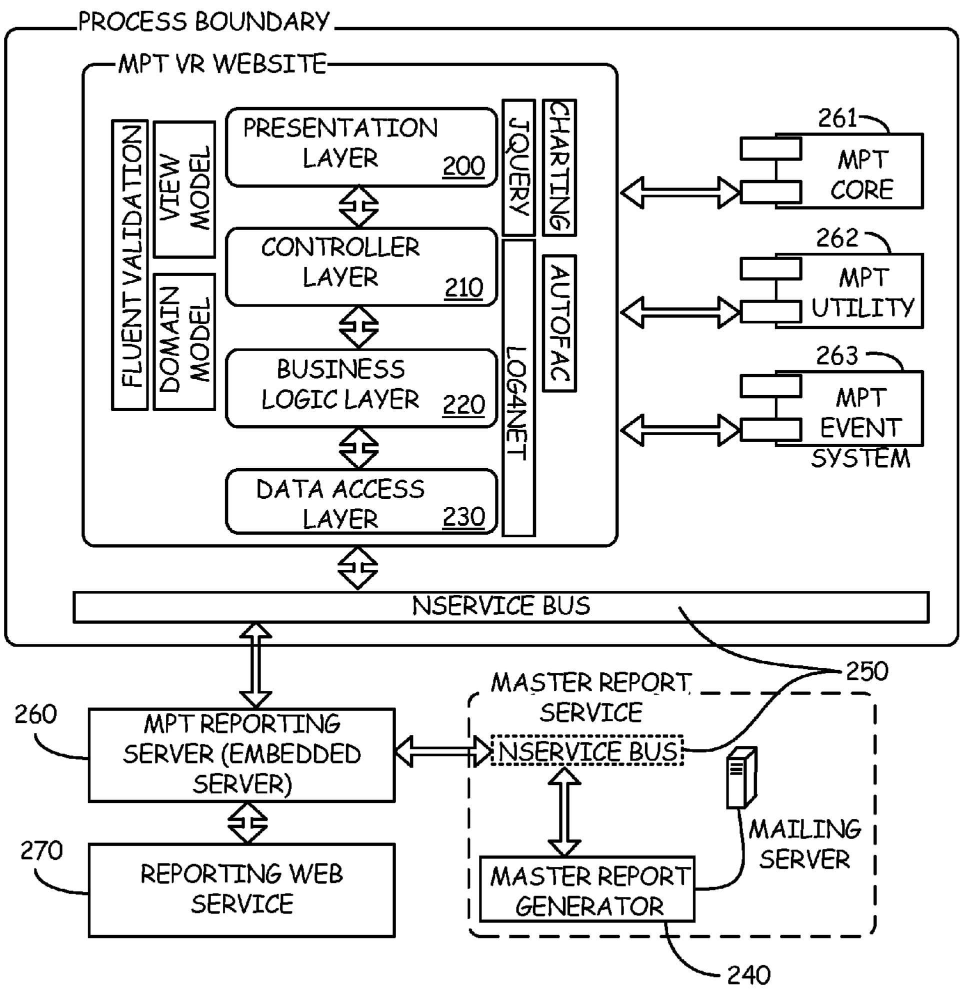
FIG. 27 is a schematic drawing depicting a broad level layout of the layers/components of the system when computing device 20 acts as a website server.

The website server 20 serves as a gateway to request and change account information and the means by which the reports are requested and served. The schematic diagram in FIG. 27 depicts a broad level layout of the layers/components of the website server 20, including a presentation layer 200, a controller layer 210, a business logic layer 220 and a data access layer 230.

The Presentation Layer 200 represents a User graphical interface provided to an MPT-VR client/User. The functionalities provided on the graphical interface may include without limitation:

1) Client Dashboard;
2) Portfolio Creation for private and public debts (CUSIPS);
3) Reports generation and Master Report configuration;
4) Client Reports;
5) General Marketing Reports;
6) Comparison Reports;
7) Report Query Management (Query Creation and its management);
8) Group Creation and its management;
9) Interactive Charting feature for reports;
10) Account Management; and
11) CMS Menu Items, including: How To Read Reports and Report Descriptions.

Controllers 211 in the Controller Layer 210 respond to User requests and queries, and based on the request, communicate with other system components to produce the desired output. The controllers may use and or interact with base controller classes, such as Repositories, Validation Framework (Fluent Validation), IoC Framework (Autofac) for dependency injection and Logging Framework. The Views (GUIs) and the Controllers might share the information through "ViewModel" classes, each containing information pertaining to a given View or GUI.

For reference, Repositories are a programming notion that creates a connection to a data system (does not have to be a database specifically). Validation Framework (Fluent Validation) refers to a Framework (set of programming code) that is used to validate data inputs from the User and from the database. IoC Framework (Autofac) for dependency injection and Logging Framework is used to connect to a framework functionality at runtime instead of at compile time. View Model refers to a memory class that contains the data required to create a View (in the website's case HTML output).

The Business Logic Layer 220 encapsulates the domain models and the business logic and may also have services to cater to a User request. This layer may also contain the custom validators derived from a fluent validation framework required for additional business validations. The business logic layer also creates reports in the form of PDFs, HTML, and Excel. A PDF Generation service exists on the Website server and contains the logic to put the page numbers on the reports and to combine multiple reports into one Master Report. It also includes the business logic to create dynamic queries against a reporting database. Business logic also exists in the way data is merged from the disparate feeds sources. Business logic is also provided to handle the feed data when a historical value/entry is modified or canceled.

The Data Access Layer 230 may use data access technologies for communicating with the databases. It may implement the repository pattern and use ORM for communication with a database. (Object-relational mapping (ORM, O/RM, and O/R mapping) in computer software is a programming technique for converting data between incompatible type systems in object-oriented programming languages. This creates, in effect, a "virtual object database" that can be used from within the programming language.) This layer may define the base repository class and interfaces for the repositories.

A Master Report Service (engine or generator) 240 can be used to generate a report in various formats, such as PDF, Excel and HTML, and mail it to a User. The Master Report Engine may, by way of example, use an Nservice Bus 250 to communicate with a Reporting Server 260 to accomplish this task.

A number or components also comprise an "MPT Suite" of functionality. The non-exclusive components (dlls) that are shown in use in the MPT-VR website in FIG. 27 include:

1. MPT.Core 261, which provides basic components e.g. validation, messaging for all MPT applications, including access to a centralized User/account system.
2. MPT.Utility 262 which provides commonly identified developer required utility/helper functionalities.
3. MPT.EventSystem 263 which is used to subscribe to global events (domain level) which have an impact across multiple applications. The Event system may inform all the Entities (applications or objects inside the applications) that have registered for the occurring event and use a call back to invoke actions from these Entities.

4. MPT.Reporting infrastructure 260 using NserviceBus 250. This PDF generation service consists of a web service and an http server that communicate to the outside world using NserviceBus and HTTP requests. MPT VR may use the Report web service to upload data using an http request and register with the NserviceBus to receive notification of the report generation being completed. Upon completion, the Report Web service will notify MPTVR and the MPTVR may use another HTTP request to get the report in the PDF format
5. Reporting WebService 270 enables report generation using HTML & XSLT.

Resets

All debts have reset rates every day of the year on which they are outstanding. When comparing the debt counts at a given point in time to the debt counts at the start of a year, the beginning debt count can be achieved by viewing debts that had resets on 12/31. The holidays and dates which have no value may be managed as per the section Resets (How to calculate).

Because the data going into the system is comprised of many different and disparate inputs, with many data providers not knowing the correct way to input reset around weekends and holidays, certain assumptions may be used for the various calculations required. For instance, Reset averages may be based on every day having a reset value. All averages may be based upon a set period (Daily, Weekly, Monthly, Quarterly, etc.). In the present system, each reset has an effective date (Date) which is the date the rate starts to apply. That rate stays into effect until the next reset date. When calculating the average for a period, the reset dates within that period are filled in the values that are missing between reset dates. If the last reset date falls before the end of the period, in one embodiment of the present invention, that rate may be used for the rest of the period. For instance: Daily Reset for the week of 4/11-4/18

| 4/11 | 4/12 | 4/13 | 4/14 | 4/15 | 4/17 | 4/18 |
|---|---|---|---|---|---|---|
| .005 | | .0055 | .0048 | .004 | | |

Filled Out Values

| 4/11 | 4/12 | 4/13 | 4/14 | 4/15 | 4/17 | 4/18 |
|---|---|---|---|---|---|---|
| .005 | .005 | .0055 | .0048 | .004 | .004 | .004 |

$$Average=0.004614=(0.005+0.005+0.0055+0.0048+0.004+0.004+0.004)/7$$

Reset Period

The system tests the period entered from the data feed. If the period end date ends on a holiday or weekend, the system extends that reset period until the next business day after.

Issue Type

As holidays and weekends cause reset periods to fluctuate, the following rules may be used, in one embodiment, to classify the Issue Type:

1. Daily—Any reset less than or equal to 4 days;
2. Weekly—Any reset between 5 and 10 days; and
3. Other—Any reset greater than or equal to 11 days.

User vs. System Data

For some of the data, such as private debt like CP, the system may ask the User to provide the most accurate values according to the User. Rather than dismissing the public system data, User entered data pertaining to debt and rates are only pertinent to that User. This means that if a User updates the business sector for its debts to all be the same because the system set them differently, when a query is performed, the query uses the system debt for system results and client debt for client results. A data feed column may be used to determine the source of such values.

To ensure that privately set data has an opportunity to be updated by the data feeds, a notification system may be created that may notify the User whenever public data changes. This would alert the Users of the change and allow them to enter their own value if the public data is incorrect or to take the public values.

System Data Notification

An additional feature may be signing up for notification of any changes in the Public (System) meta data including ratings for anything that is associated to a client's portfolio. This may allow the client to see what changes are happening that they may not be aware of or are expecting to see updated in the system.

CUSIP vs. Debt ID

As the privately entered data may not be associated with a CUSIP, the system associates all debt information using Debt ID instead. This may allow the User to define their own 9 character ID or use a System Generated ID when referencing private data. The private data may only be accessible via that client.

System Generated ID (Optional)

The system generated ID may be created as follows:

1-3="MPT"

4-6=Last 3 of Organization ID 7-9=Sequential numbers starting at 000 (Allows for 999 debts per client)

Data Feeds

Both public and private debt or securities data exist. Public information is generally retrievable by the system provided the information is electronically available. Both public and private data that is published or is available to a client or User can be manually input into the system as well.

The database servers or machines 30 (FIG. 1) generally refer to electronically available data (public or private) collect data and information pertaining to VRDO and CP through networked data feed services 32. This information may include, by way of example and not by limitation, Rate and General Debt transaction Information 72 (such as EMMA, discussed infra), Debt Ratings Data 74 (obtained from a service like Bloomberg L.P., a premier site for business and financial market news), Meta Data 76 (available from a service like Bloomberg) pertaining to one or more traded debts (securities), and Benchmark Rates 78 (available from a service like Securities Industry and Financial Markets Association (SIFMA), a leading securities industry trade group representing securities firms, banks, and asset management companies in the U.S. and Hong Kong) and daily rates available through services like Bloomberg) applicable to Debt. This data is processed in a Database server 30 to create a Reporting Database 86 that can be accessed over network 61 by the website server 20. From the Reporting Database 86, the website server 20 is able to generate various reports in response to queries from a User 12 sent from User machine or computer 70. The reports may be generated in different formats, including without limitation, in HTML, PDF and Excel. User computer 70 includes a browser 71 for accessing the website server 20 via internet 80 (or other network) and for allowing User input to create queries from which the website server generates reports.

Various data feeds may be imported into the system to the common MPT-VR database 30. Data may be added to the system using daily batch feeds. The data feeds may populate the reporting database with appropriate values and may have their own historical databases. The system may use external storage to save the raw data for data sources that do not produce end of day values. As most of the feeds the system receives are based on independent data feed sources that do not have a standard method of entering data, the system is vigilant in verifying the data and correcting the values if needed.

The data components required for system operation may include the following, which may need to be updated at a desired frequency (typically not more than once per day):

1. Variable Rate Values:
   a. Data feed.
2. Meta Tags describing debt:
   a. Data feed;
   b. Operations entered; and
   c. User entered.
3. Ratings (may include other services than those identified below):
   a. Data feed;
   b. S&P;
   c. Moody's; and
   d. Fitch.
4. Additional Analytics (may include other services than those identified below):
   a. Bloomberg; and
   b. Market Data Management.
5. Market Data—periodic (typically day end) values:
   a. Data feed (may include other services than those identified below):
      i. LIBOR; and
      ii. SIFMA.

In some embodiments, the computing system includes a module for monitoring a benchmark index on which an interest rate of the selected investment depends. The index monitoring module monitors prices after the initial sale or initial public offering of an investment. In one embodiment, the index monitoring module utilizes the internet connection and finds one or more data bases related to the index being monitored.

Ratings

Ratings may be set by a number of methods:

1. M—Max Rate;
2. F—Set by Formula;
3. R—Set by Remarketing Agent;
4. H—All Hold Rate; and
5. A—Set by Auction.

Credit Ratings may be provided for the following entities:

1. CUSIP (debt);
2. Borrower (Underlying);
3. Credit Enhancement Provider (CEP); and
4. The ratings of a particular debt may be the greater of the Borrower or CEP rating. That rating may be used to compare against other debt of the same rating to determine if the remarketing agent is pricing the debt using the proper rating.

Ratings may be connected in at least 3 different ways:

(1) By Debt

The rate used to determine the credit risk of the debt. This is independent of Borrower and Credit Enhancement Provider (may be the higher of the two). Some debt may not have a rating; if it does, the rating may be found in the DebtRating table. 'N/A' may be used for any missing ratings.

(2) By Credit Enhancement Provider (CEP)

This is the rate of the CEP Organization. This may be connected via the CreditEnhancementProviderID and the OrganizationID in the OrganizationRating table. Some debt may not have a CEP. 'N/A' may be used for any missing ratings.

(3) By Borrower (Underlying)

This is the rate of the Borrowing Organization. This may be connected via the BorrowerID and the OrganizationID in the OrganizationRating table. Some debt may not have a Borrower rating. 'N/A' may be used for any missing ratings.

Reports may show all three rating connections along with all three rating organizations as shown in FIG. 30.

At least two options exist to filter ratings:

(1) Query by Rating Groups; and (2) Query by Per Rating.

Following is a list of common terminology used with resets:

| | | |
|---|---|---|
| 1. | Daily/Weekly | The results may include only Daily & Weekly resetting debts. |
| 2. | Minimum Rate | The lowest rate from the results. |
| 3. | Maximum Rate | The highest rate from the results. |
| 4. | Average Rate | The average rate from the results. |
| 5. | Versus Avg. SIFMA | The average SIFMA rate over the period of the request subtracted from the Average Rate for all the results. (Average Rate − SIFMA Average). |
| 6. | Versus Avg. Client. | The average value of any client debt that is included in the results subtracted from the Average Rate of the results. (Average Rate − Client Average). |

Debt Rating information can be utilized for both private or non-private debt. Organizational ratings are managed by the present invention. For instance, there may be a need to separate services such as Moody's, Fitch, and S&P into Short and Long Term ratings and to separately display these ratings. The system can also provide ratings for individual debt. This may be accomplished by a data feed driven device. When clients enter their own debt, they are able to associate applicable ratings to their debt.

Ratings can be viewed and printed by the system. A View/Edit Ratings screen and functionality may show all long term and short term ratings from all the rating agencies associated with a Debt including, but not limited to:

1. Debt Rating;
2. Issuer Ratings;
3. Borrower Ratings; and
4. CEP Provider Ratings.

The User may also edit the Debt Rating if it is incorrect. The Debt Rating changes may be saved in the system as set by the User and may be limited for use only in connection with the User's own statistics.

Private Debt Rating

This may be drop-down lists from the ratings in MPT-VR system and may include, among other possibilities:

Moody's Short Effective Date
Moody's Long Effective Date
S&P Short Effective Date
S&P Long Effective Date
Fitch Short Effective Date
Fitch Long Effective Date A CUSIP may be added to the portfolio from the system. If it cannot be found, an alert is provided and the User may be presented with these options:

1. Search for Similar CUSIPs
   a. This will send the User to the Add Debt by CUSIP lookup to search for CUSIPs that have the same starting Issuer description (first 6 chars).
2. Manually Enter Debt
   a. This will send the User to the Manually Enter Debt page.
3. Cancel
   a. Returns the User to Portfolio page leaving the entered value in place.

For private debt without CUSIPs, the Users may be able to enter in the general information for the debt, as well as date-centric resets and ratings, which are not publicly known. The primary means may be by rating groups as a drop down menu. Per rating may be an optional choice that will bring up a popup (modal) window and allow Users to choose specific ratings.

To make it easier on the User, the system may define groups across all the rating agencies so that the system can define, by way of example, AAA rating as Moody's Aaa OR Fitch AAA OR S&P AAA. The rating groups may be the primary way to select ratings and may have a drop down list. The User may also be able to define a rating or group of ratings only for himself that can be used as a filter. The User can select ratings of his choice and give the rating or group of ratings a relevant name. During execution of a query for the filter criteria, the system may check if the debt rating falls within the list of defined ratings.

All ratings may be considered against other ratings. For example, the User could compare any debt rated Moody's Long Debt Rating Aaa to any debt rated S&P Long Debt Rating AAA. The system may provide the User with a matrix of check boxes for each rating, ordered by ranking. This will allow the User to compare any groups of ratings.

The system may treat each rating type (Long/Short) as a Rating Agency in the Organization table, such as Moody's, S&P, and Fitch. The system operator may add others, such as Moody's Short, S&P Short, and Fitch Short.

Top Menu

The top menu of the system consists primarily of login/account options. The following links may also apply:

1. Dash Board
2. My Account
   a. Change Password;
   b. Edit Account; and
   c. Edit Login.

These refer to the main MPT Login and Account management, not the individual services (Compliance, VR).

Dashboard

A Dashboard Page contains summary data for the client's portfolio and comparisons of top performing sector, state, credit enhancement provider and remarketing agent against the clients top performing sector, state, credit enhancement provider and remarketing agent. It also has links to the complete listings for each comparison. The summary data compares the average rate for the client against the average rate for SIFMA for the current day, week, month, quarter, and year to the prior week, month, quarter, and year.

Account Creation

Account creation can be accomplished by a program operator. The operator inputs identification of customer data, such as customer name and address, individuals authorized to access the system and the person or group responsible for receiving information and the type of information that is authorized to be retrieved and viewed. Once an account has been established for a User, the user can browse to a Home Page that is created by a Content Management System (CMS) and system Users may log into the system website via the User networked computer 70 with a Username (personal identifier), password and/or email address or customer number. (The CMS delivers simple updating of non-logged in User content (content accessible without logging into the system). Examples on compliance module are 'How to Read Reports' and 'Report Descriptions'. Further, a PDF Generation Service may interact with the CMS service to upload data for reports. Upon completion of the report generation, the calling application may be informed through the event system and the report may be fetched though another http call.)

Alternatively, a User may self enroll. The User is directed to a Home Page generated by the CMS. At the Home Page, the User is directed to a Sign In Page. If the User is new to the system, the User is directed to a Create Login page. The User may enter the following information:

1) Username;
2) Password (Twice to verify); and
3) Email Address (Twice to verify).

An email is generated to the User directing the User to an Email Verification Page to verify the login. After verification of the User's unique Username and matching password, the User is enrolled. The Email Verification Page may also be used to notify a User that he/she/it has not validated his/her/its email yet. All authorized pages of the program may direct the User to the Email Verification Page until the User verifies his/her/its email.

If a User has previously enrolled, a Sign In Page is provided for the User to login to the website and includes the following:

1. Textboxes:
   a. Username:
   b. Password—validates the User login
2. Buttons:
   c. Sign In—sends the User to a Dashboard Page
3. Links:
   d. Forgot Password—sends the User to a Forgot Password Page
   e. Create Login—sends the User to a Create Login Page Any time the User logs in, the User may also be directed to an Edit Page. This page may be used to edit a User's login information. The User may edit the following information, among other things:

1) User ID;
2) Password; and
3) Email Address.

The system also includes an Edit Account Page used to edit a User's account information. This is the same information that may show on reports. The User may enter the following information:

First Name
Last Name
Title
Organization
Address #
Address 1
Address 2
City
State
Zip
Phone A Forgot Password Page allows the User to retrieve their password if they forgot it. This page includes text boxes for a User name and email address and a button for retrieving the User's password and a link to a sign in page. The Retrieve Password button verifies the User name or email address and sends an email with a rest password link. The system performs validation of the password in New Password and Confirm New Password fields and if the passwords are the same, the system submits the new password for the User to the system.

The User must accept the terms of use of the program before any other program functionality is accessible. A User Agreement Page displays the User agreement and if a User has not agreed yet includes "I Accept" button that when clicked, saves the accepted User Agreement to the system and sends the User to the Dashboard Page.

The system may have a provision for Users to be assigned to any combination of Services and Accounts. This permits Advisors, Brokers/Dealers and others to use any and all authorized or permitted services for their respective customers. Additionally, the MPT framework allows multiple accounts for multiple services. When accessing the system, Users are tasked to select which type(s) of service(s) the User wants to use. User permissions, which may be based on specified criteria, will control what service levels, screens and reports may be viewed or utilized by a User.

Following Login

Upon validation of the login and acceptance of the terms of use, the User may be able to search a list of organizations to find information about their own organization. If the User cannot find this information, the User may be allowed to create a new account or organization or the Operations Staff may create the new account or organization for them. If a User organization has merged with another User, the system can be instructed to track the merger so that requests for parent organization information will automatically be associated with children organization information.

The User may be given the option to utilize all services the User is authorized by the system to use, such as "Compliance" or "VR". Compliance covers tax compliance issues for issued debt and is the subject of a companion patent application filed Jul. 30, 2010 as application Ser. No. 12/847,796, Publication Number 2012/0030136 A1, which is incorporated herein by reference. The VR service is the subject of this application. They both exist on the same website as separate modules that share a common home page, login, and general account information. If the User is only authorized for one service, the User will be directed to that service with which they have an active account.

If the User does not have an active account, the User may be redirected to a page informing the User he/she has no active account, and directing the User to contact Operations Staff. Operations Staff manages the MPT-VR program. Clients may also be able to go to a portfolio data input screen where the User may input a list of CUSIPs that the User has in his/her/its portfolio. The CUSIPs will drive debt comparisons on predefined reports programmed into the system.

The website should contain the following capabilities:

1. Master Report Sections:
   a. Cover Page;
   b. Table of Contents;
   c. Disclaimers;
   d. Client Summary;
   e. Client Percentile Summary;
   f. Client Portfolio;
   g. Client Portfolio Detail;
   h. Cost of Capital Summary;
   i. Cost of Capital by Issue Type (Daily, Weekly, Other);
   j. Stars List;
   k. General Market Statistics—General;
   l. General Market Statistics—States;
   m. General Market Statistics—CEP;
   n. General Market Statistics—Remarketing Agent;
   o. Bucket List Reports—One section for each Remarketing Agent in portfolio;
   p. Comparison Reports:
      i. Client Query Summary;
      ii. Query Percentile Scorecard;
      iii. Marginal Percentile Savings; and
      iv. Query Average Rate Report (Optional).
   q. Hedge Report.
2. Groupings:
   a. Create Groups; and
   b. Maintain Groups.
3. Query Management:
   a. Query Creation—Filter, Sources, Sub-query, Show in results; and
   b. Query management—listing, delete, edit and show in Master Report interface; and
   c. Auto Query generation.
4. Edit Portfolio:
   a. edit ratings;
   b. Edit meta tags; and
   c. Edit public data.
5. Query Management:
   a. Use Ratings group for query filters.
6. Cost of Credit Enhancement Provider Input—for client and non clients.
7. Dynamic/Interactive charts on existing and new reports.
8. Service Level permissions:
   a. Report Permission Management;
   b. Website screen permission management; and
   c. Display/Edit permission for User on reports.
9. Hedging:
   a. Hedge related reporting; and
   b. Asset Liability Association.
10. Threshold:
    a. Setup, monitoring and notification.
11. Use cases for Investors—A provision to log into the system, where they may be using the analysis provided by Facilitator to determine in which debt to invest. For investors, this application may include additional charts/reports.
12. Granularity of Report Level Configuration in "Master Report Configuration Section".

Debt View

Figure 28:
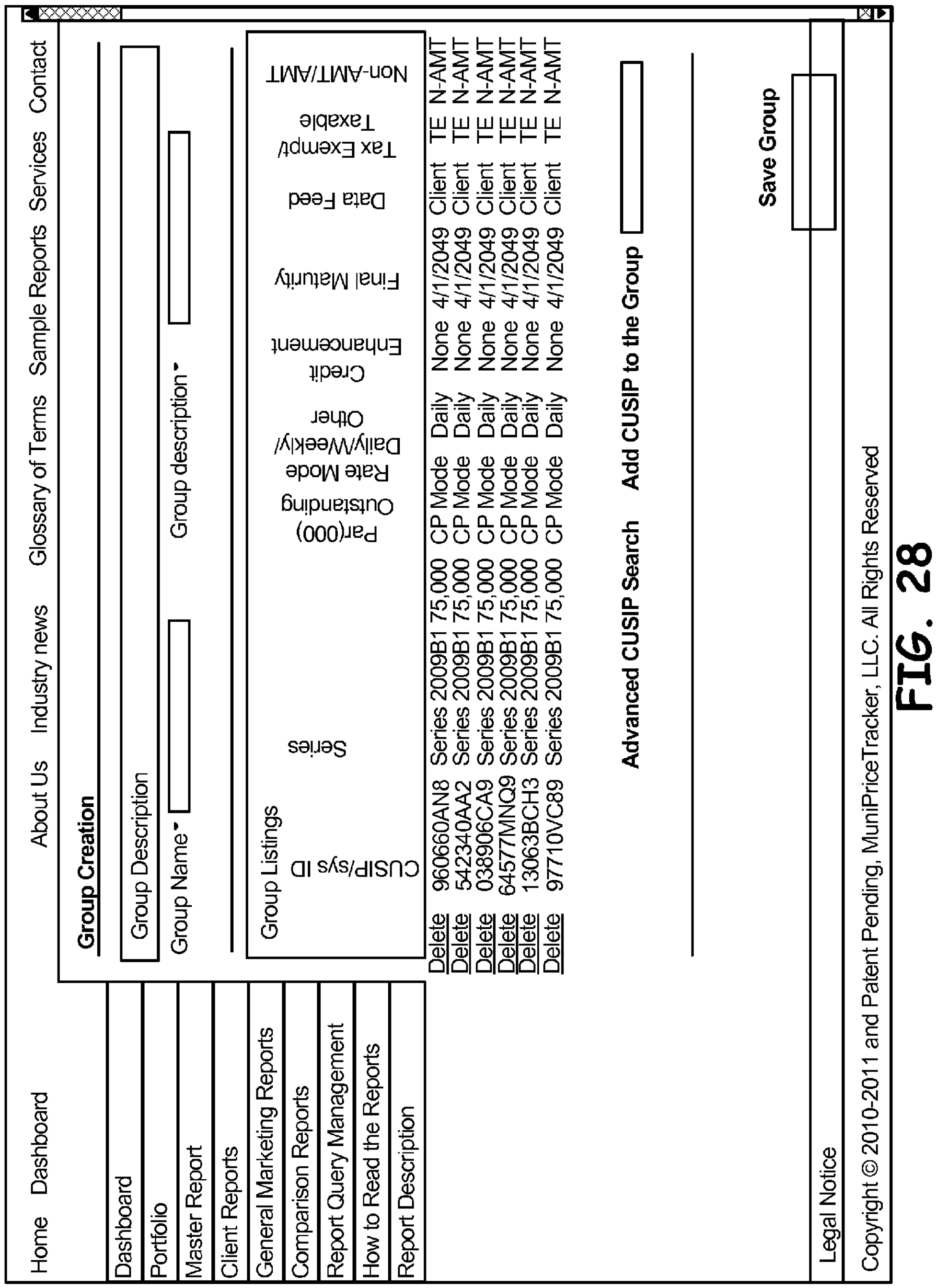
FIG. 28 is an exemplary screenshot of a Group Description Page (grouping debts by identified criteria) generated by the computer program of the present invention.

A side menu, shown in FIG. 28, provides program functions. Side Menu items may be added/disabled based upon where the User is navigating in the program and includes:

1. Dashboard—Sends User to the Dashboard page.
2. Portfolio—Sends User to the Portfolio page.
3. Master Report—sends User to the Master Report Configuration UI.
4. Client Reports—list of available reports that are relevant for clients.
5. General Marketing Reports—contains the list of available general market reports.
6. Query Comparisons Reports—contains the list of available query comparison reports.
7. Report Query Management—Opens a page the may enable User to create queries for reporting and thresholds.
8. Group Creation—Opens a page that may enable User to edit/delete/create groups used for query creation. See FIG. 28.
9. How to Read Reports—Sends User to the How to Read Report page.
10. Report Descriptions—Sends User to the Report Descriptions page.

Administration

On the high level view, the Administrative functions include the ability to grant or deny any permission to a login or account. Those permissions include but are not limited to login permission, account access permission, and access additional functionality such as creating excel reports. Additional Administrative functions include the ability to impersonate any User/Account so that the system operator can interact with the system as a Client without having to know the client's password. This is used to trouble shoot issues clients incur.

Administrative Users may have access to managing accounts. The dashboard feed may include VR accounts and portfolio management. Some data input/management may also be required by Operations Staff. This may be done via an Account Management System (AMS). AMS information is stored in a database. An interface can be defined to enable interfacing with the AMS data to provide organization, rating and threshold management. The organizational management developed in AMS may be used for the purpose of tracking organizations associated with VR debt. Tags such as State, Sector, etc. may be associated with the debt.

Figure 29:
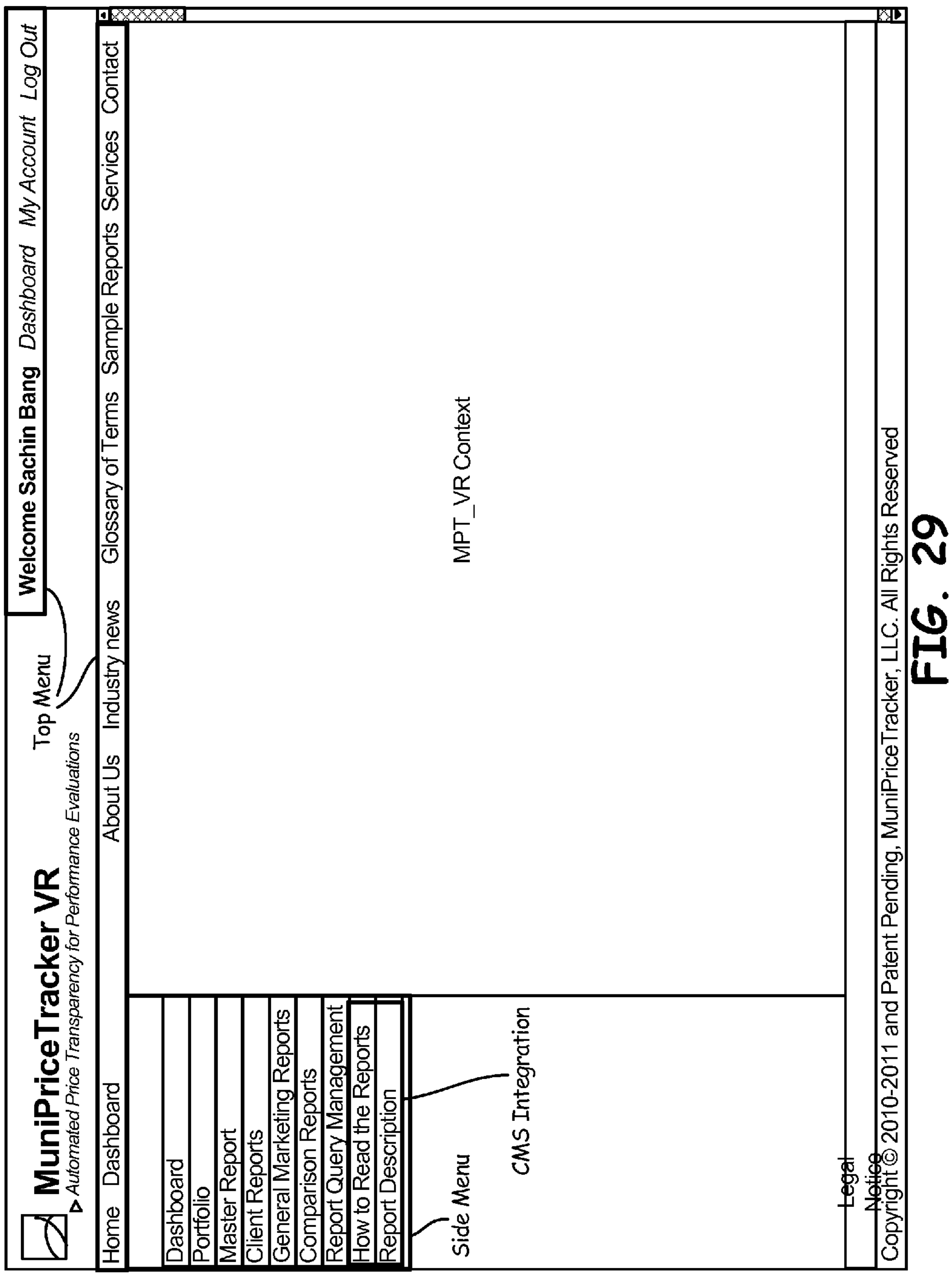
FIG. 29 is an exemplary screenshot of a Top Menu Page generated by the computer program of the present invention.

A Client Portfolio page, see FIG. 38, may contain the list of or link to debts associated with the User. If there is no portfolio there may be a Create Portfolio link for creating a portfolio. The Portfolio List may be similar to the graphic shown in FIG. 29 (in Create Portfolio Page). Additional options on the Client Portfolio Page include:

Delete Link: Deletes the debt from the Portfolio

View/Edit Ratings: Brings you to the View/Edit Ratings Page

Details: May show all the details that pertain to the deal including connections to Issuer Ratings, CEP Provider Ratings, and Borrower Ratings.

The Create Portfolio page will allow the User to define all the debt associated to them. Users will be able to create their portfolio from all the CUSIP associated debt in the system. The first step in identifying CUSIP related debt is to find all debt associated with their organization ID.

When the page loads, a popup may show asking the User if they want to populate their portfolio based on all the debt associated with their organization. This will search the system for any debt that has the User as an issuer or borrower; if they are in a parent or child organization, they may be given the option of searching for both.

Portfolio creation actions include:

a) activate-inactivate debt;

b) CUSIP Basic search;

c) CUSIP Advanced search; and d) Dashboard.

The results may show on a grid with the CUSIPS and some of the related data. The system data may auto fill and the User could potentially change the system values (See User vs. System Data). Additional Links/Buttons could include:

1. Add New CUSIP using a text box;
2. Advanced CUSIP Search; and
3. Manually Enter Debt.

Figure 35:
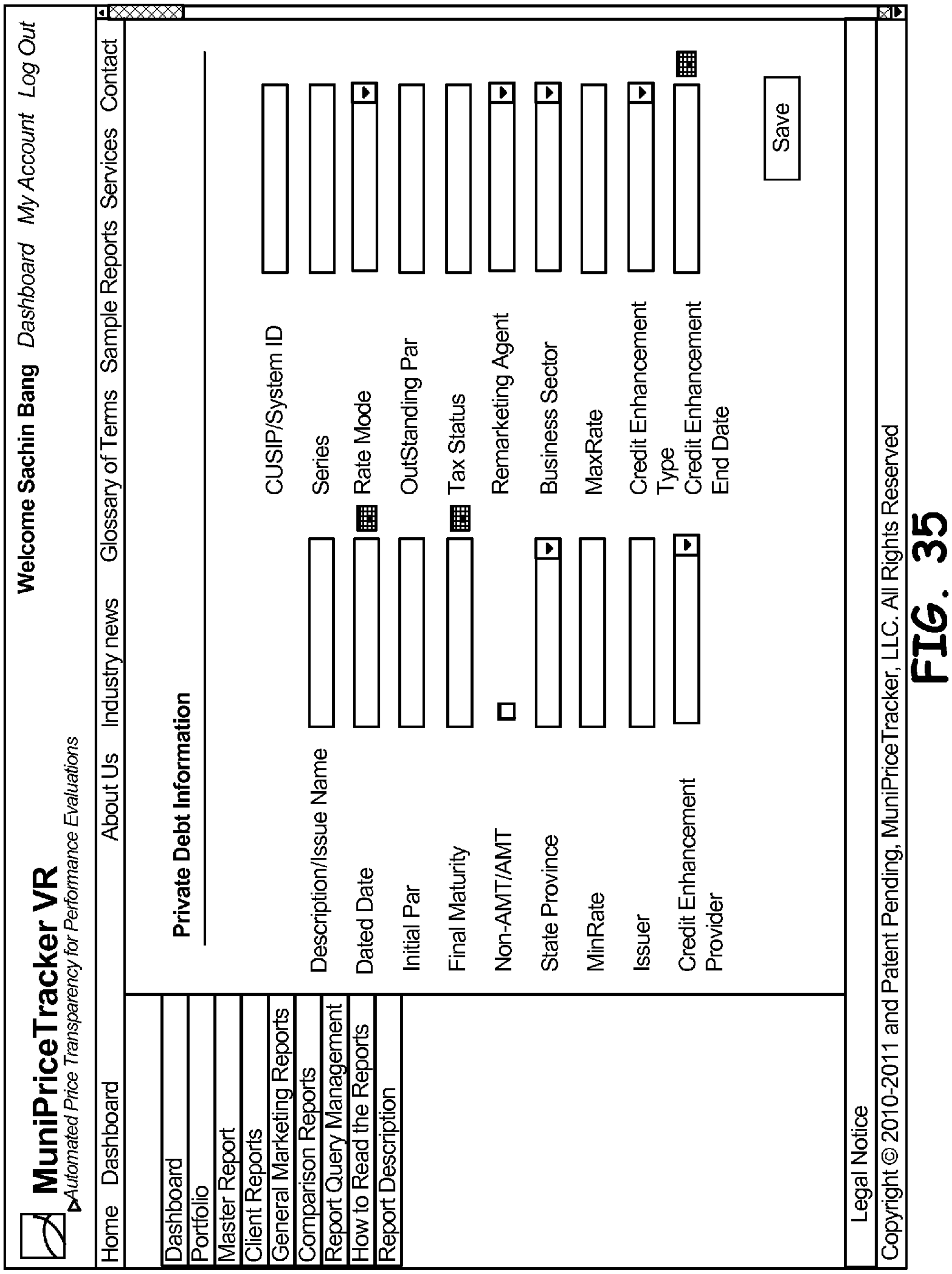
FIG. 35 is an exemplary screenshot of a Private Debt Information page generated by the computer program of the present invention, partially completed.
Figure 36:
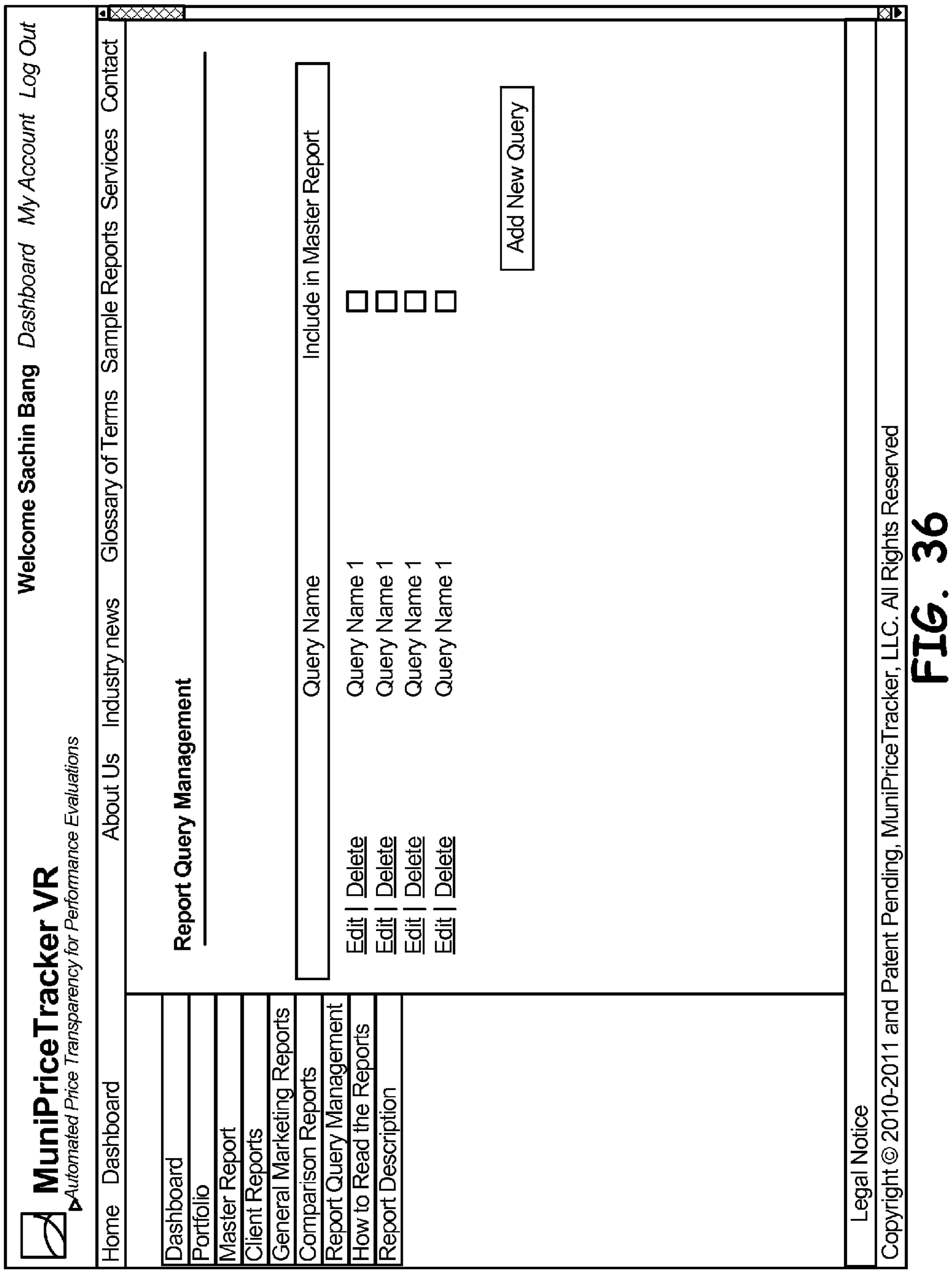
FIG. 36 is a an exemplary screenshot of a Report Query Management Page generated by the software program of the present invention for identifying and managing query results.
Figure 37:
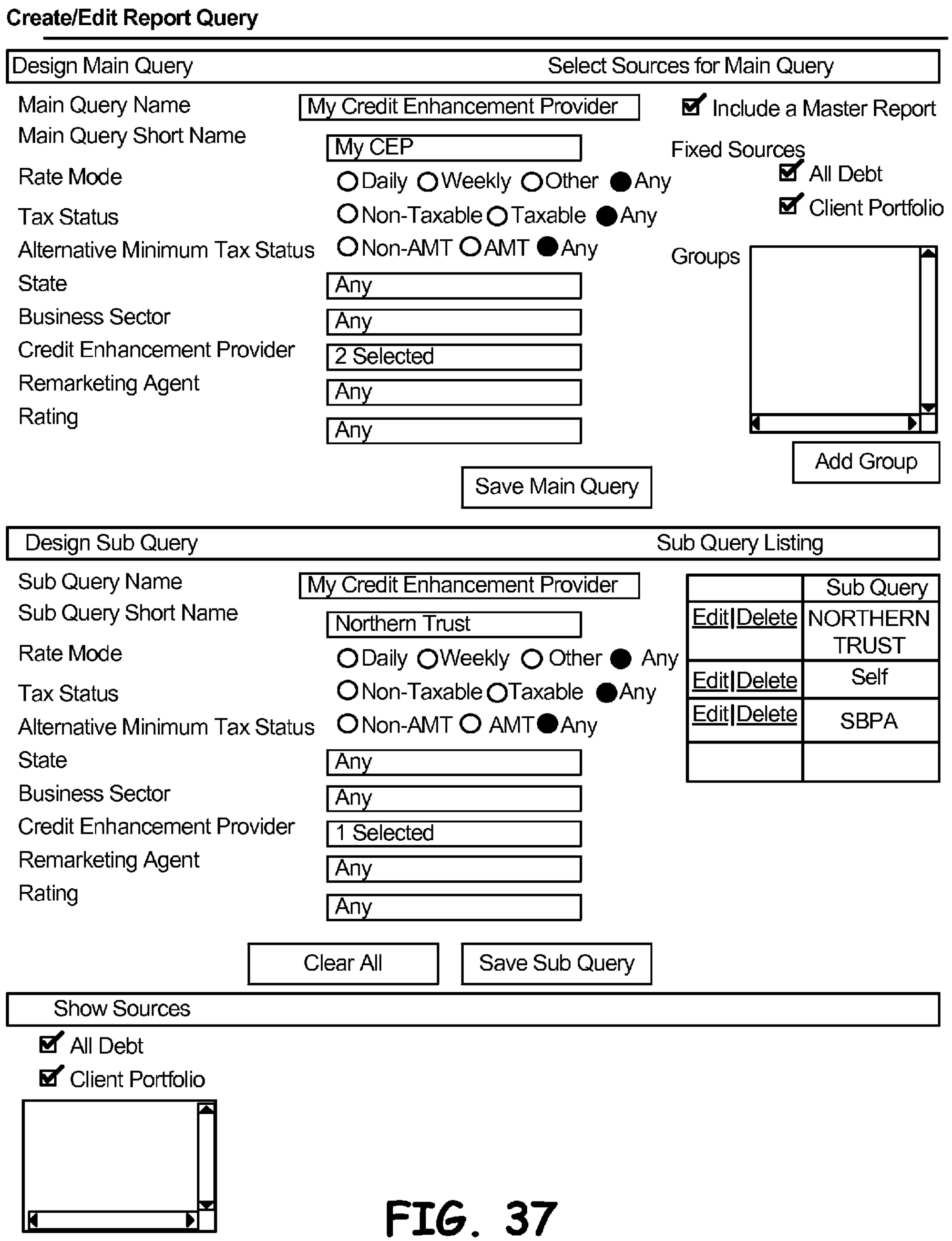
FIG. 37 is an exemplary screenshot of a Create/Edit Report Query Page, partially completed, establishing criteria for a query based on credit enhancement provider.
Figure 38I:
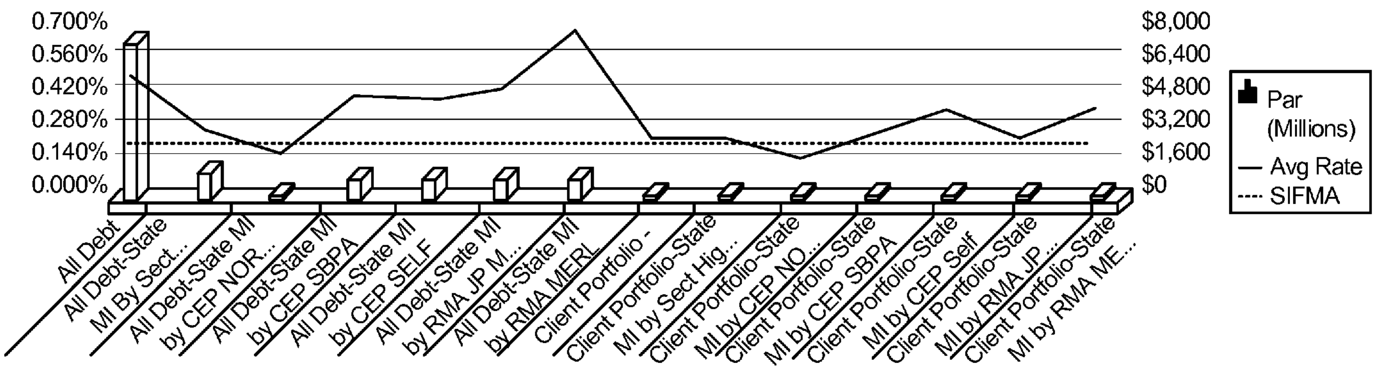
FIG. 38I is an exemplary a Query Summary Report ranking debt by the client's states and further sub queried to the client's sector, CEP, and remarketing agents.
Figure 38J:
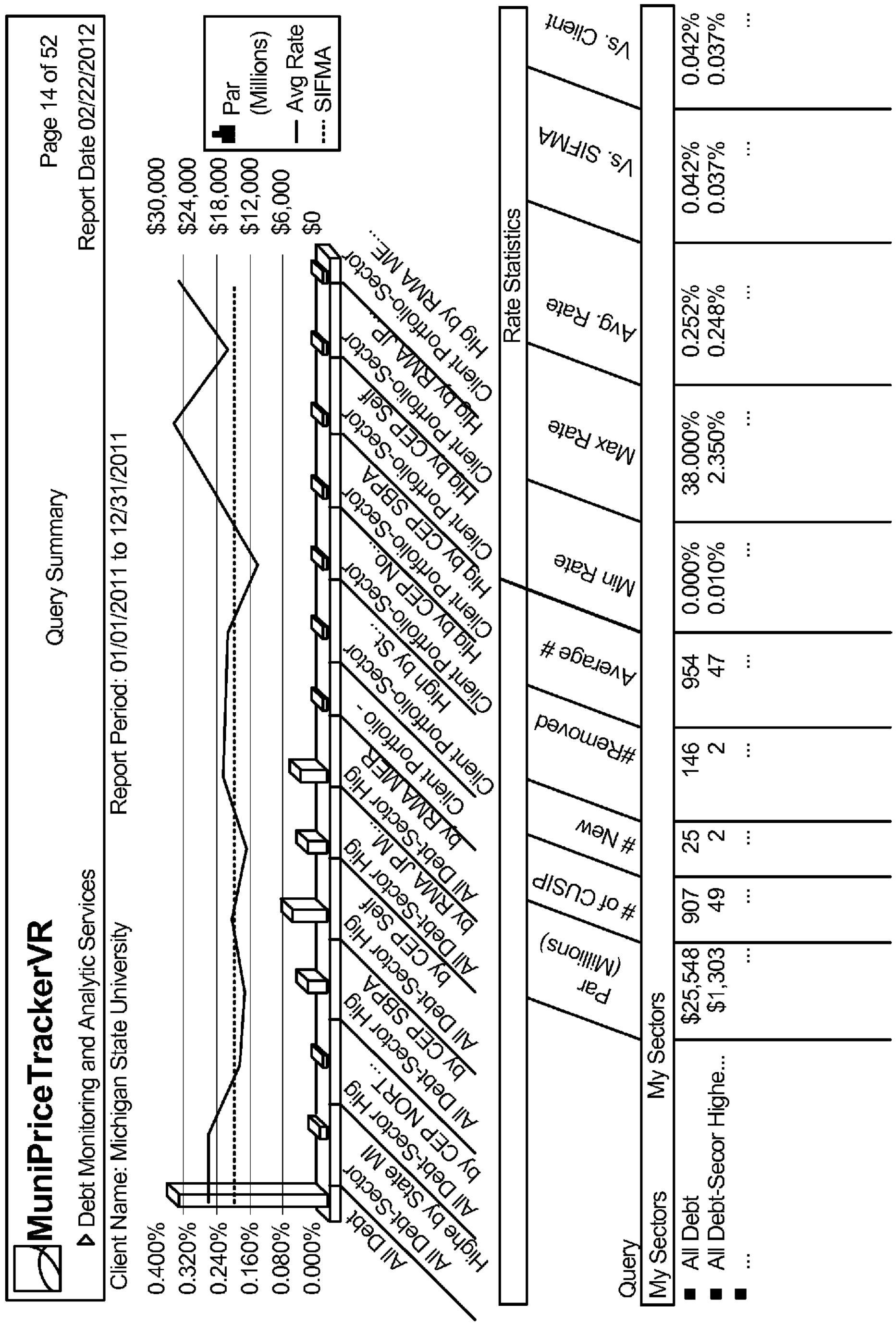
FIG. 38J is an exemplary Query Summary Report ranking debt by the client's sectors further sub queried to the client's state, CEP, and remarketing agents.
Figure 38R:
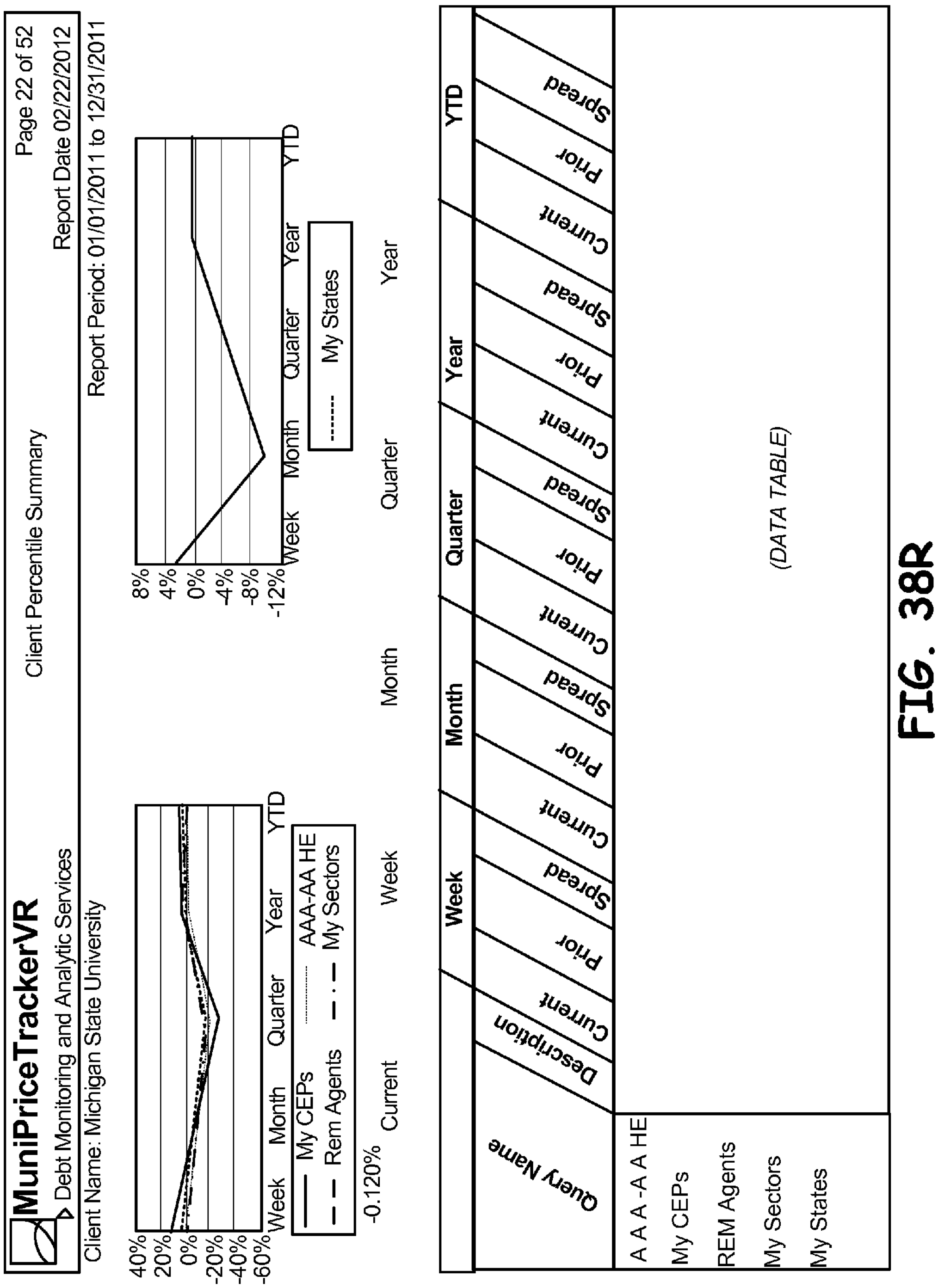
FIG. 38R is an exemplary Client Percentile Summary Report for the queries identified in FIGS. 38H-38J which show how the client performed in each of the queries over various reporting periods.
Figure 38T:
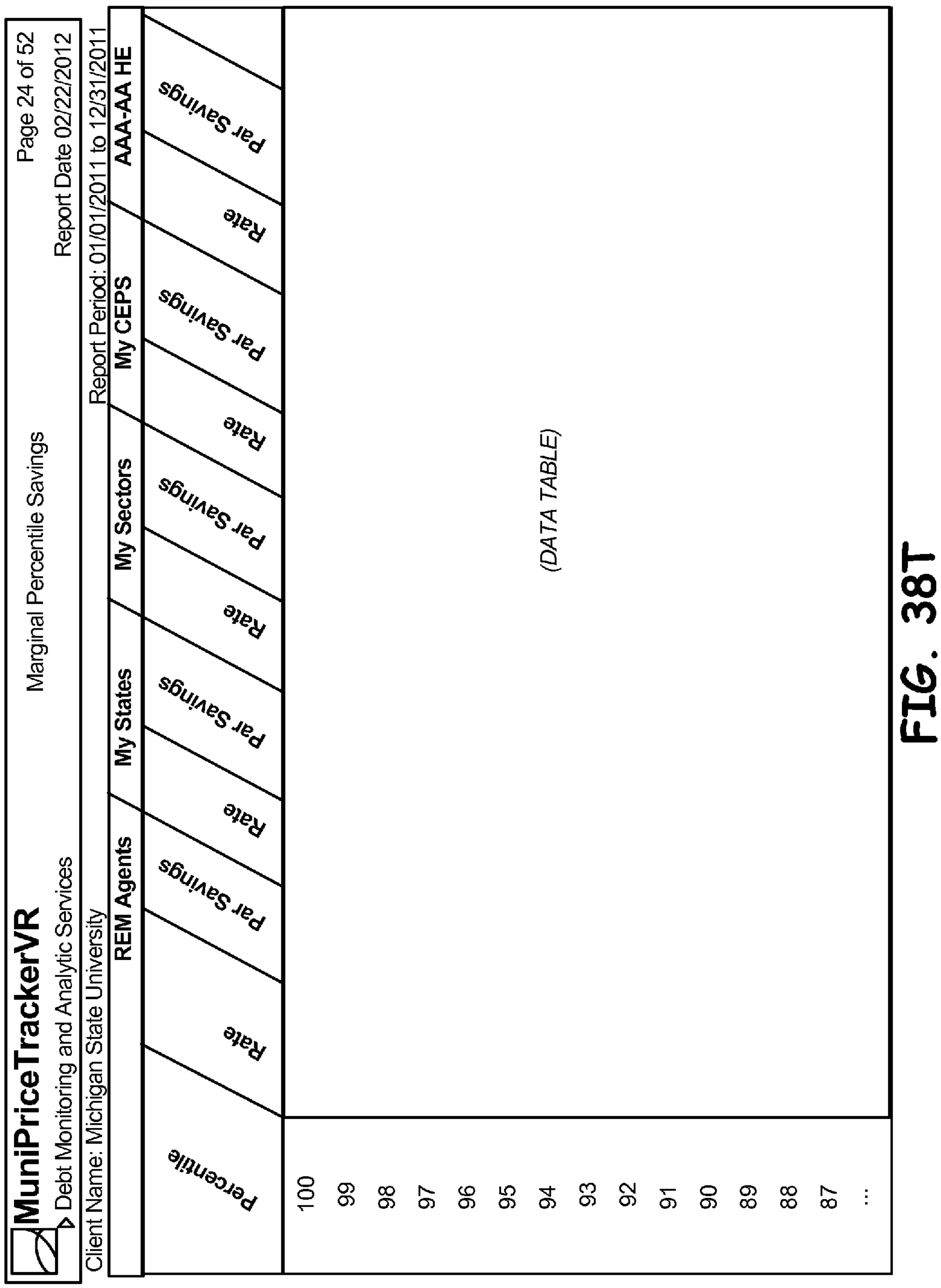
Figure 38C:
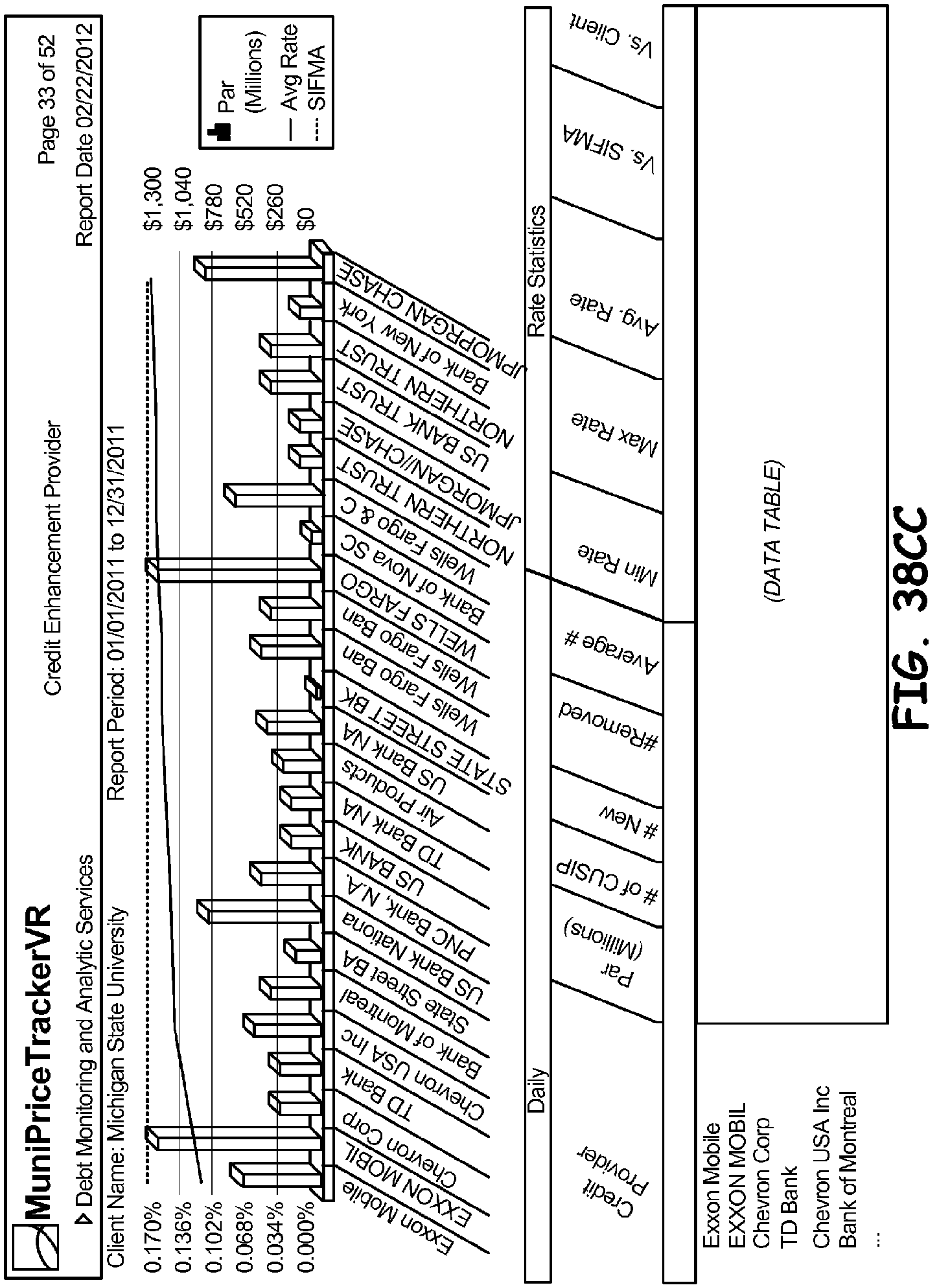
FIG. 38C is an exemplary Cost of Capital Summary Report.
Figure 38D:
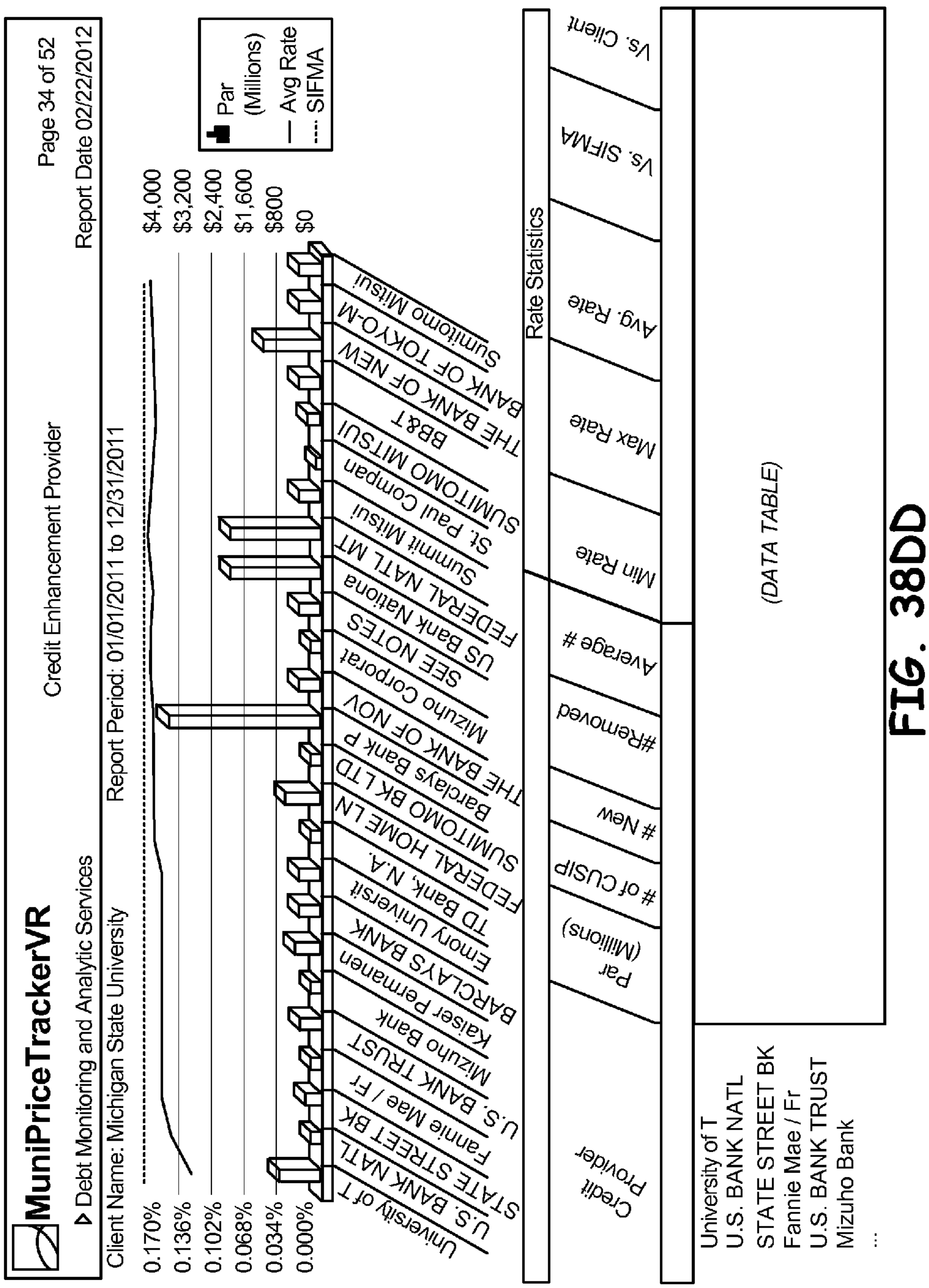
FIG. 38D is an exemplary Cost of Capital—Daily Summary Report which denotes the portfolio does not contain any daily resetting debts.
Figure 38E:
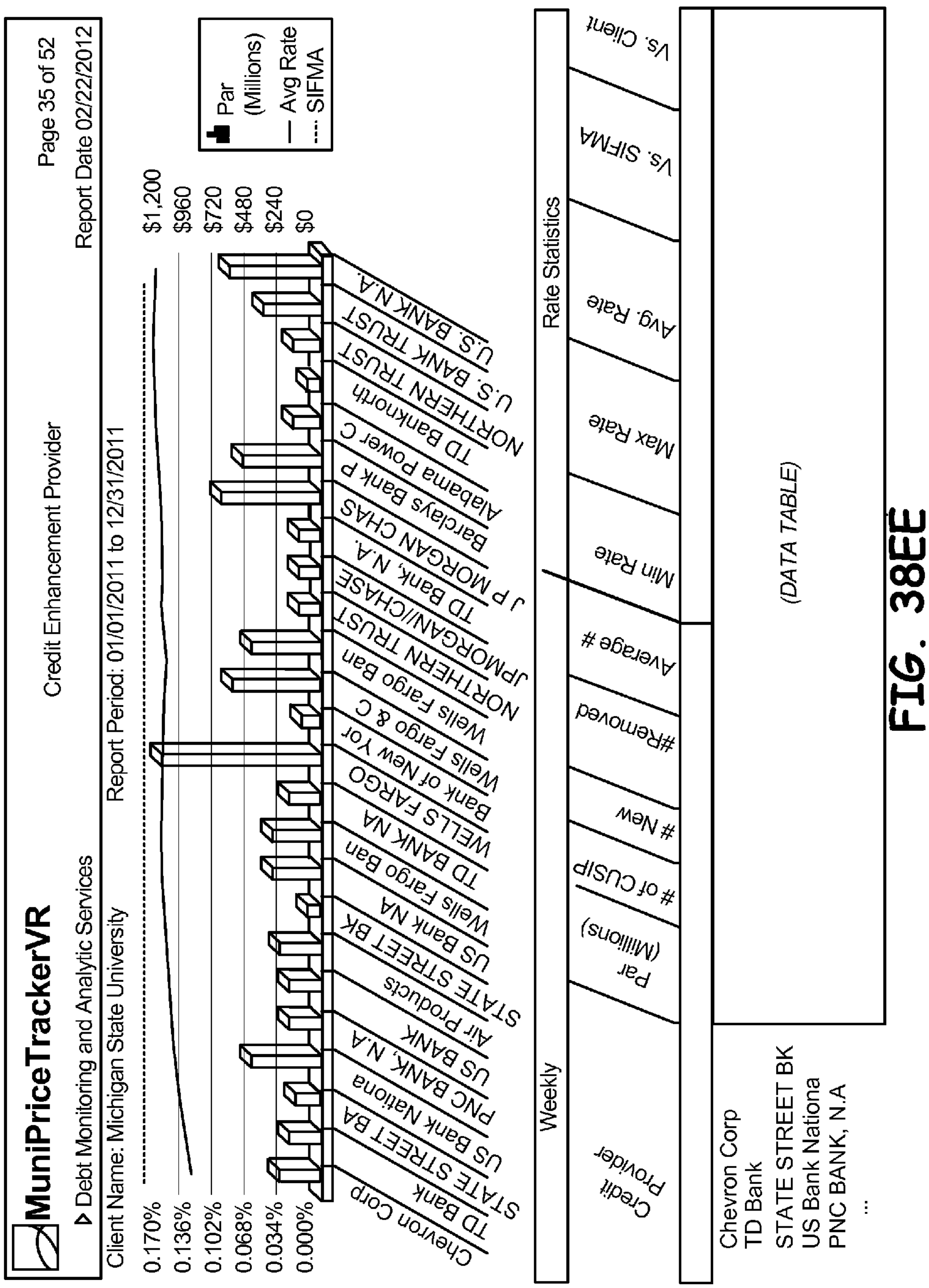
FIG. 38E constitutes an exemplary Cost of Capital—Weekly Summary Report.
Figure 38F:
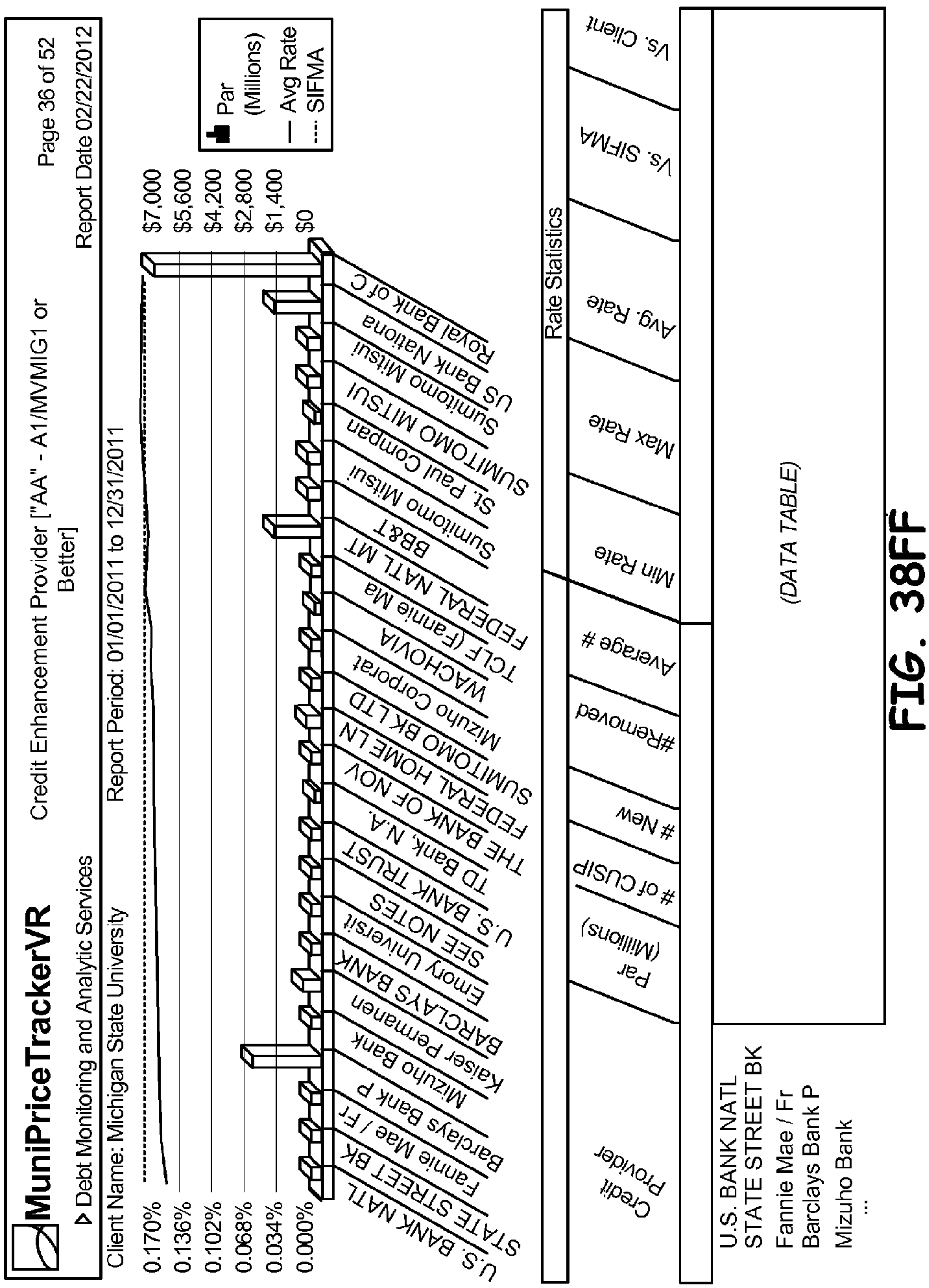
FIG. 38F constitutes an exemplary Cost of Capital—Other Summary Report which denotes the portfolio does not contain any debts with resets that are neither daily or weekly resetting.
Figure 38G:
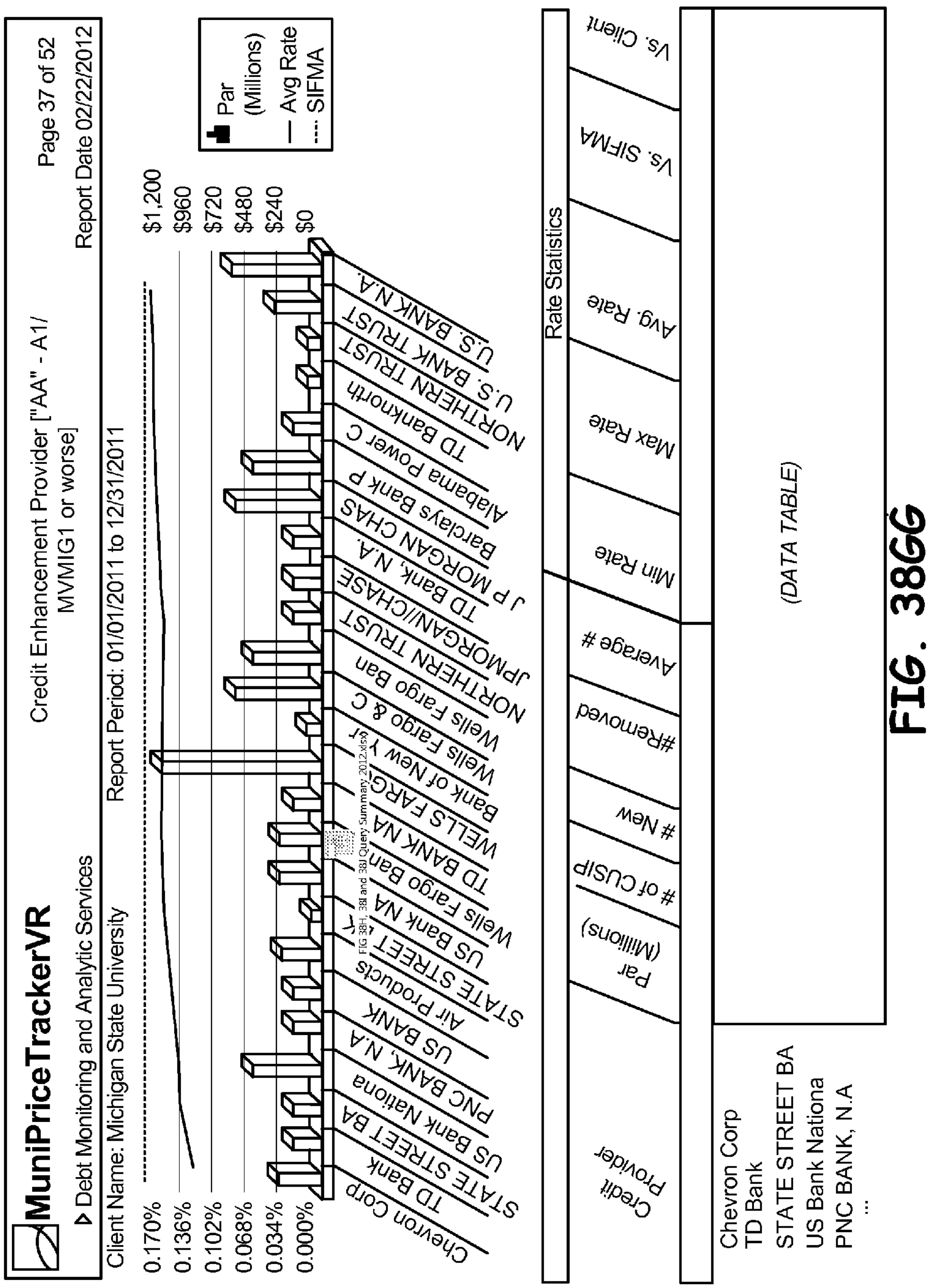
FIG. 38G is an exemplary Bucket List—Remarketing Agent Report disclosing located securities having substantial matching criteria to a client identified security or debt.
Figure 38H:
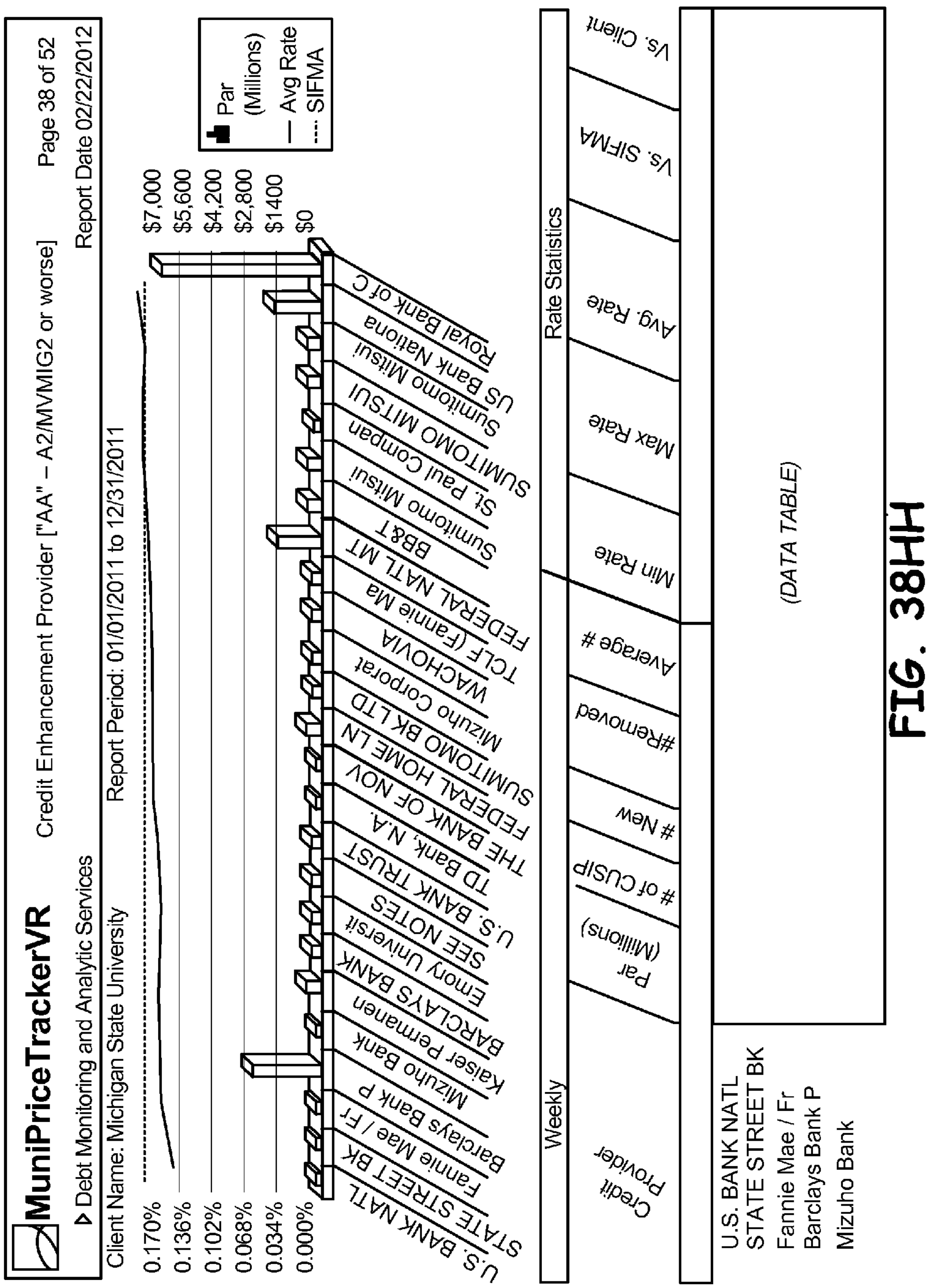
FIG. 38H is an exemplary Query Summary Report ranking debt by the client's CEPs and remarketing agents.
Figure 38I:
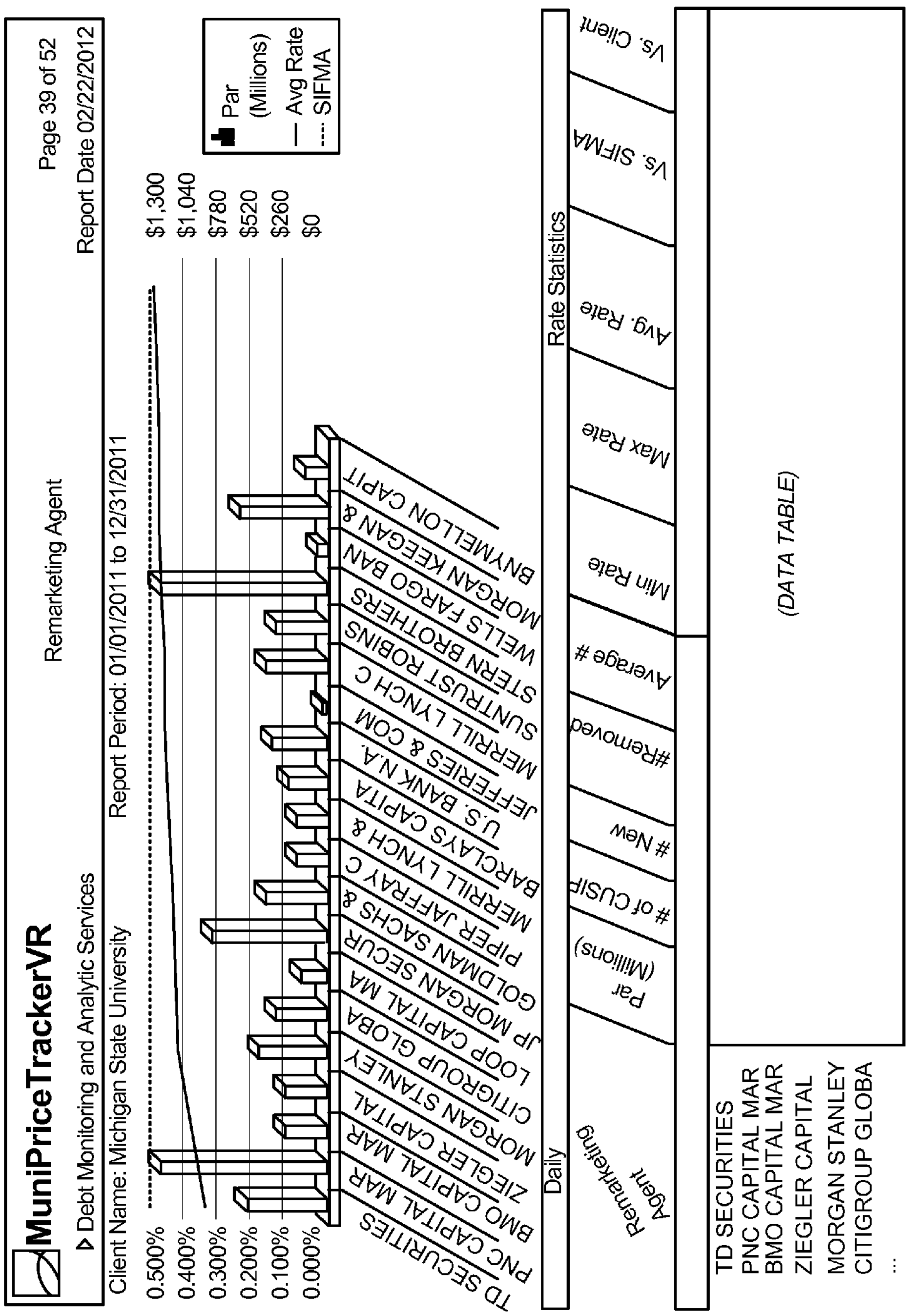
Figure 38J:
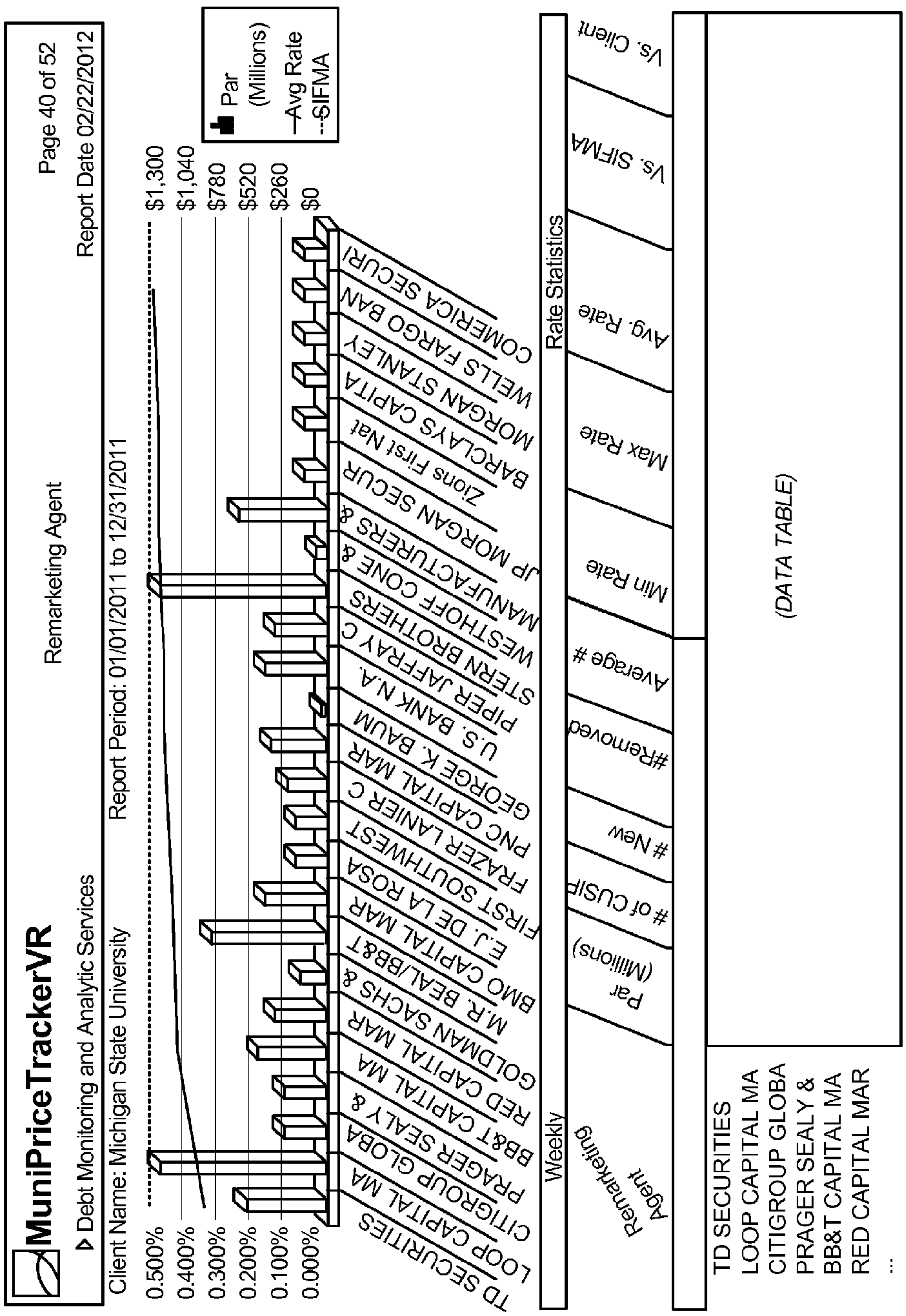
Figure 38K:
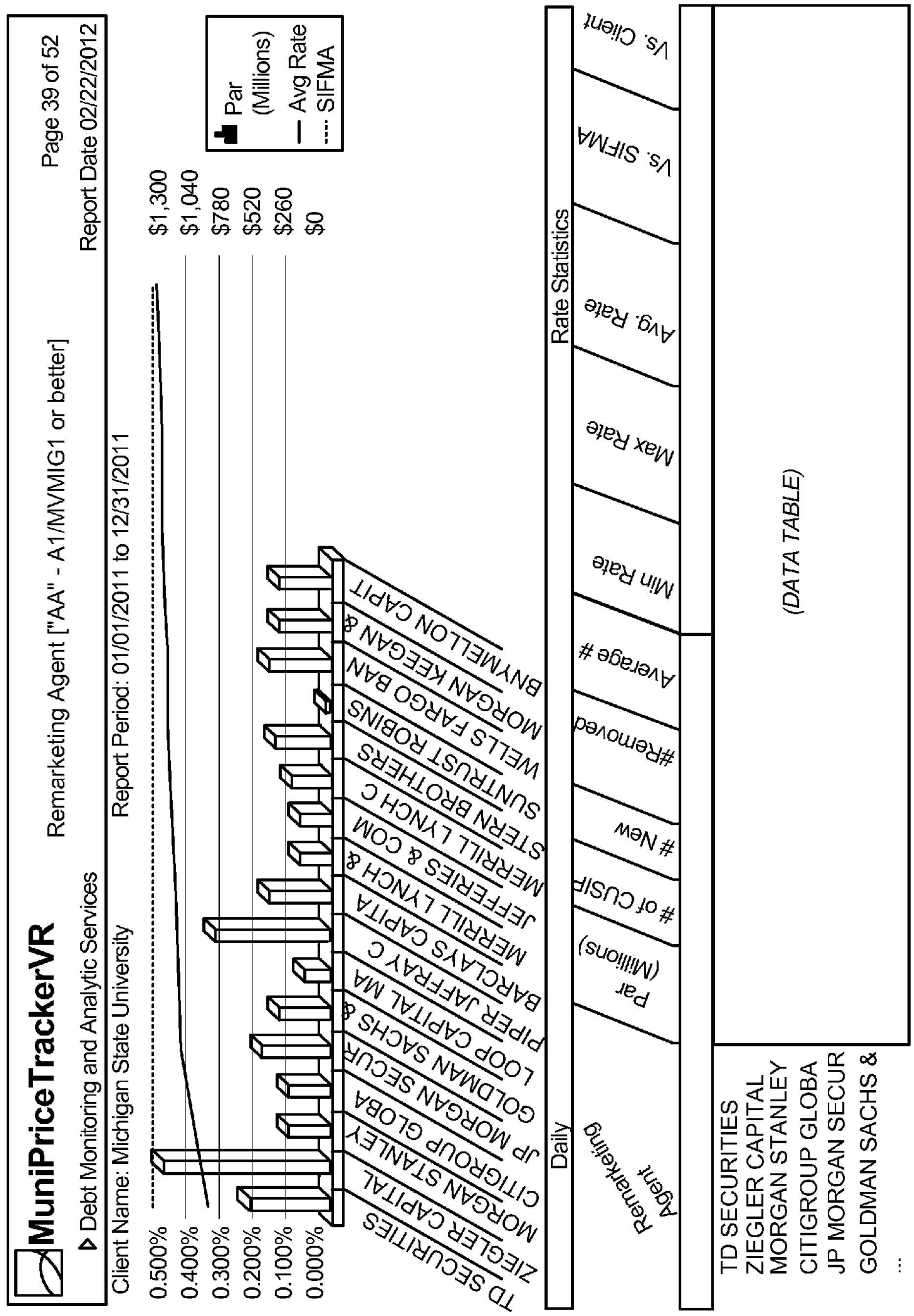
Figure 38M:
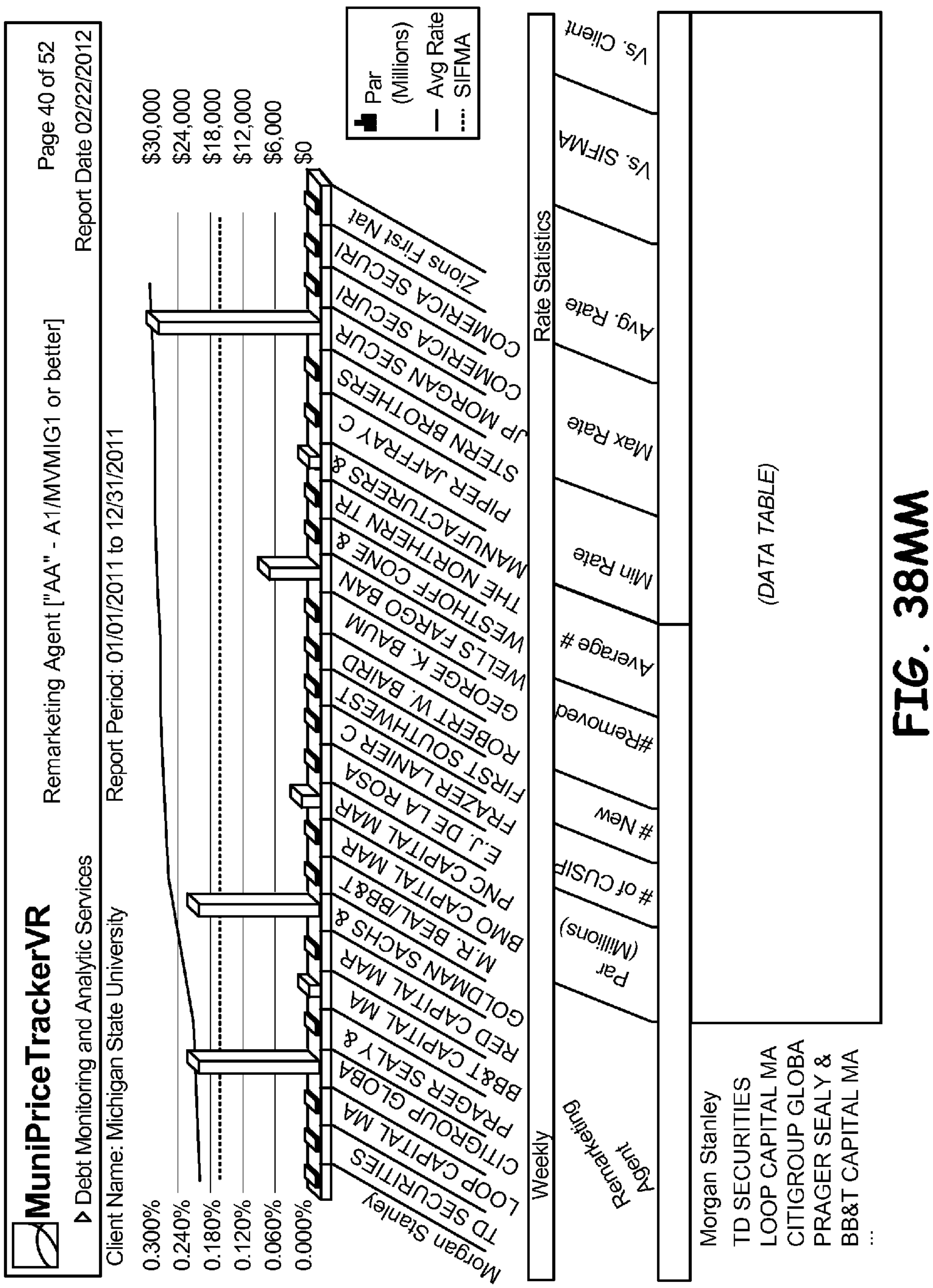
Figure 38N:
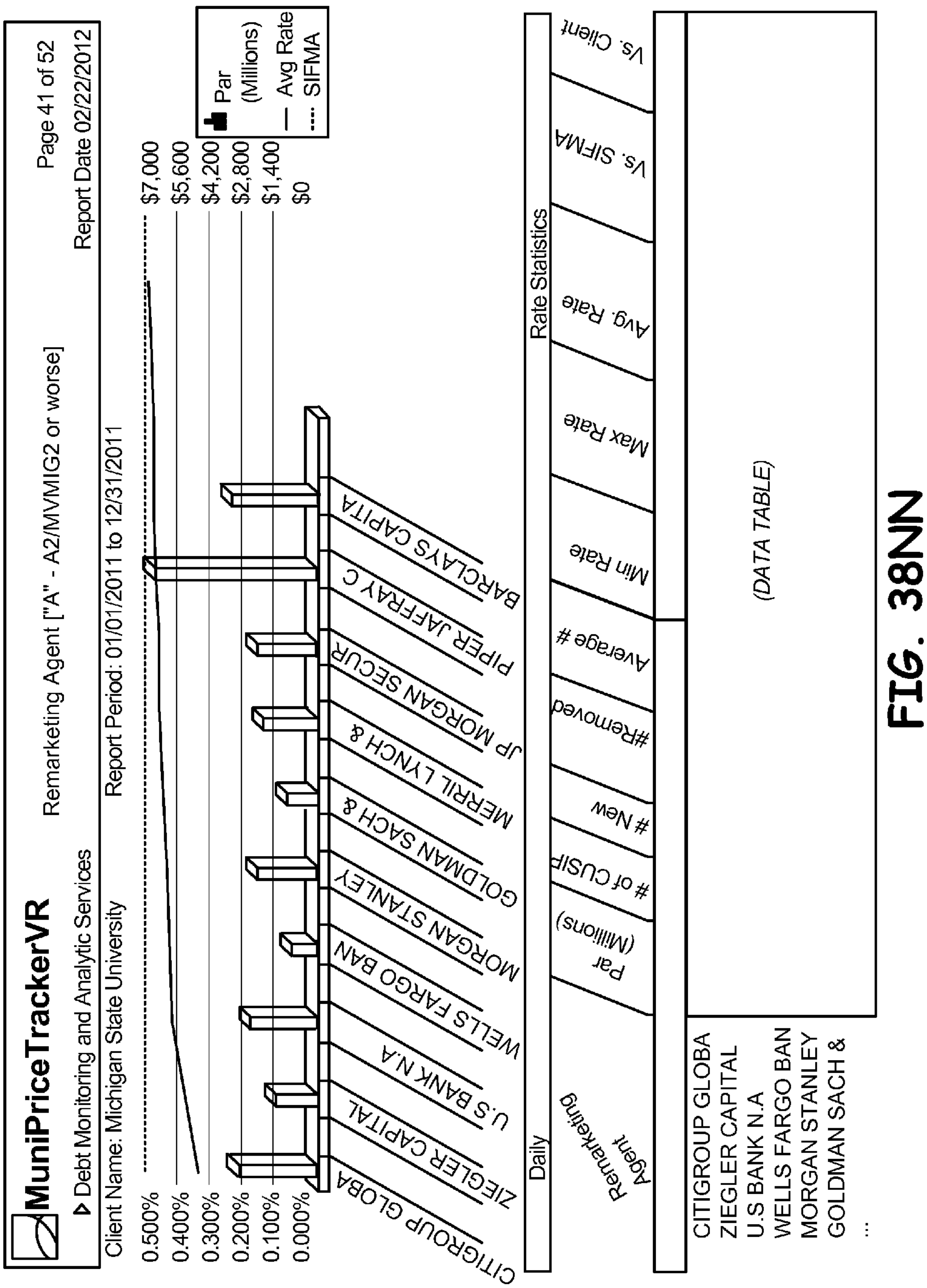
Figure 38P:
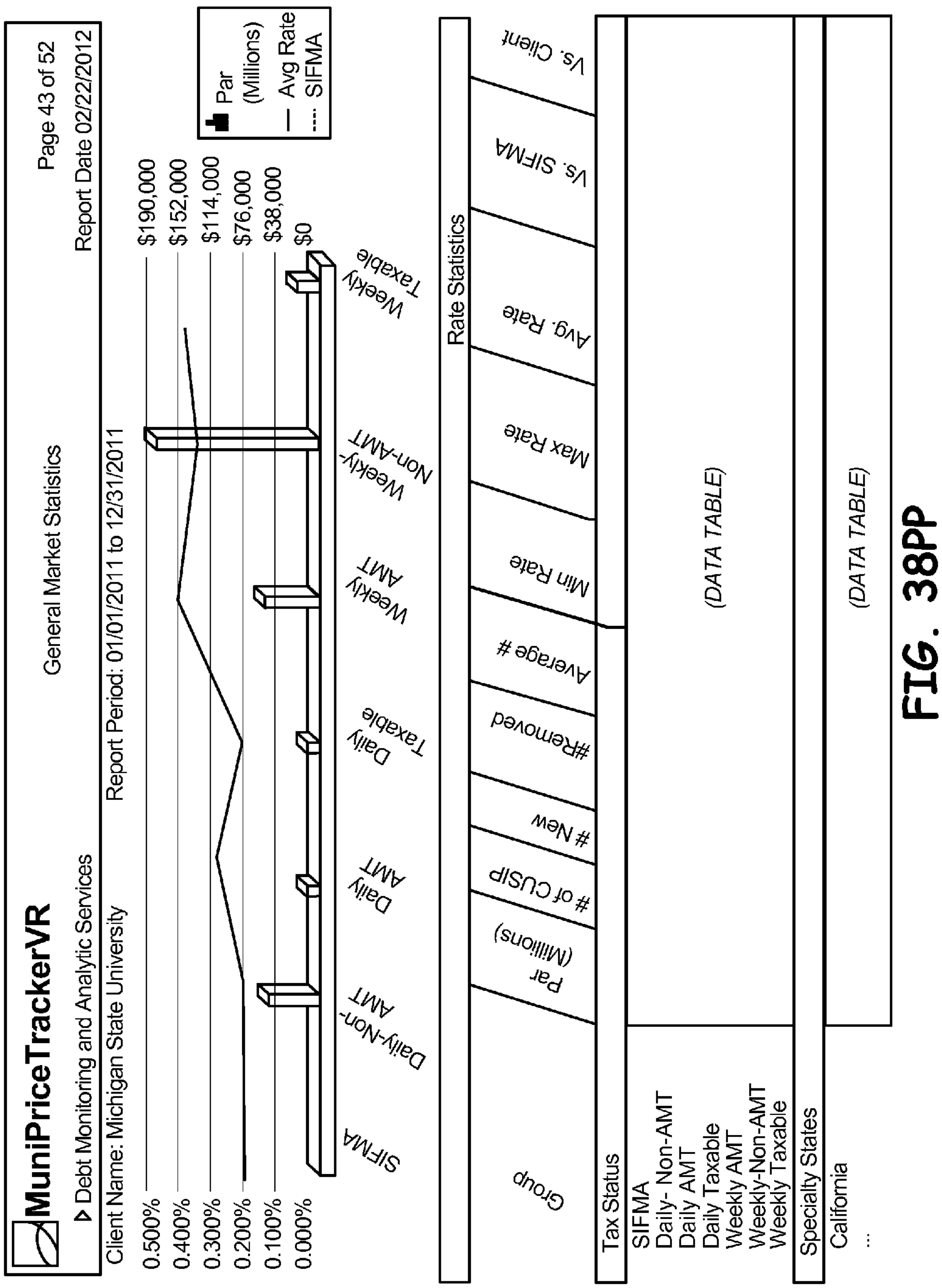
Figure 38Q:
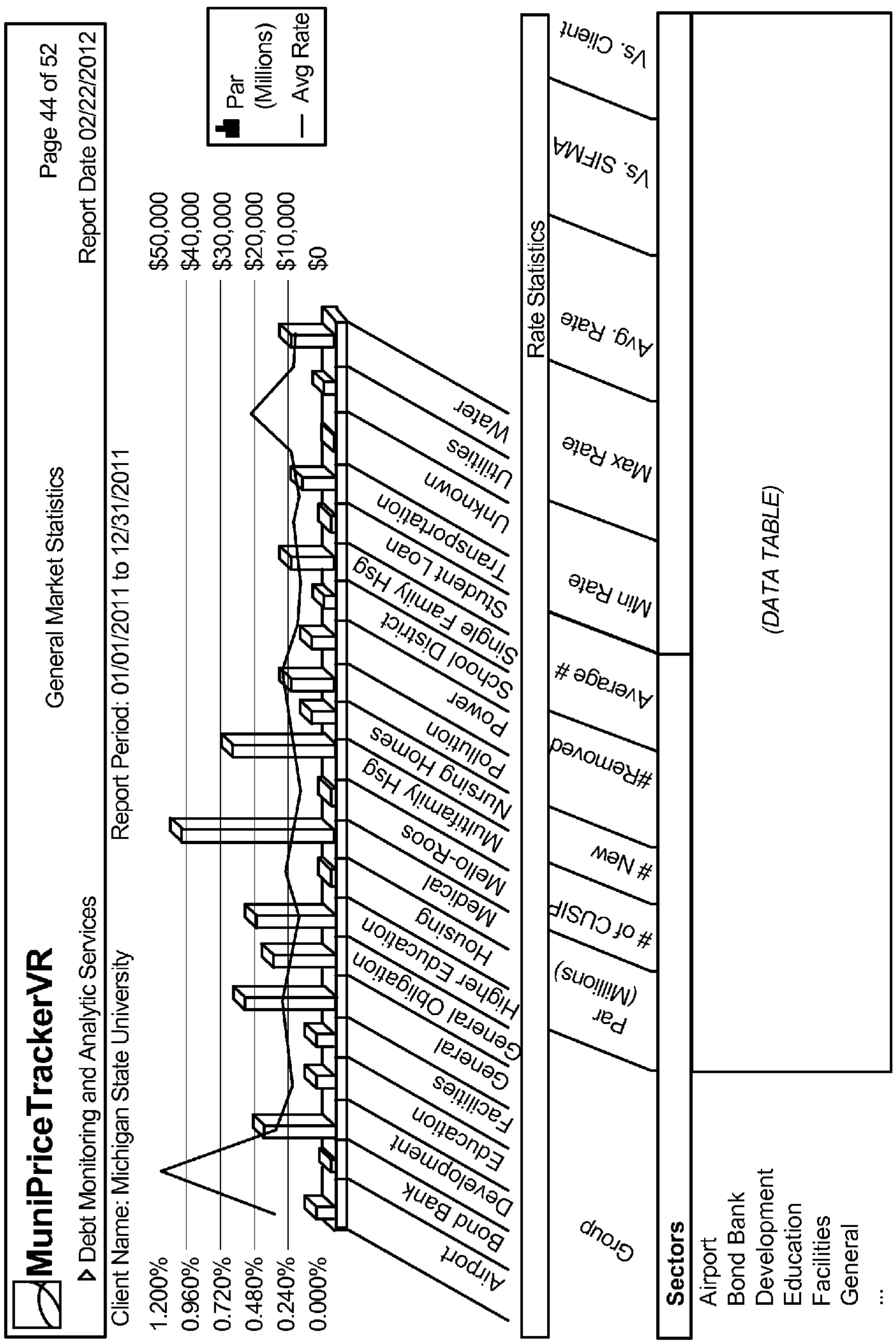
Figure 38R:
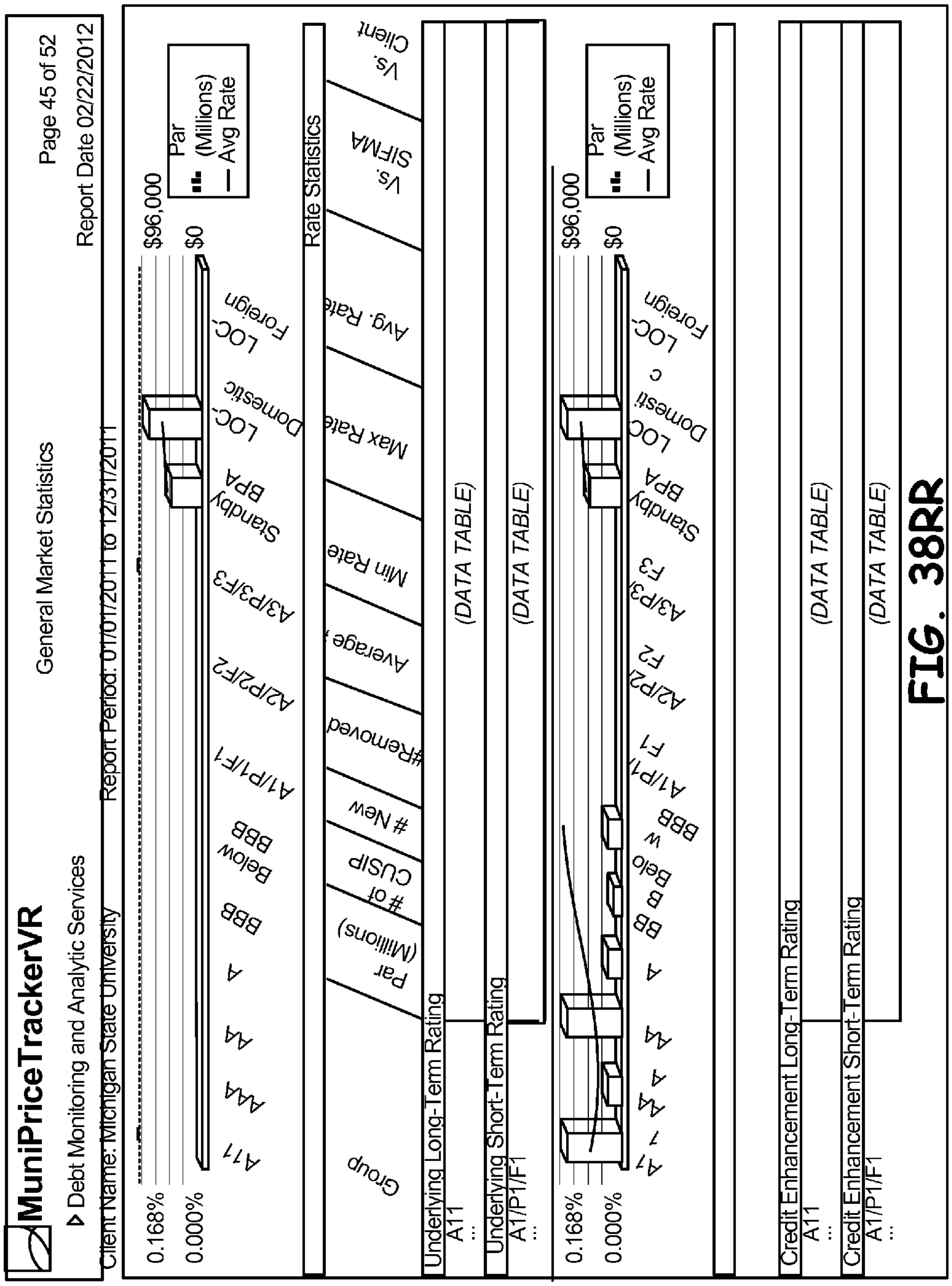
Figure 38S:
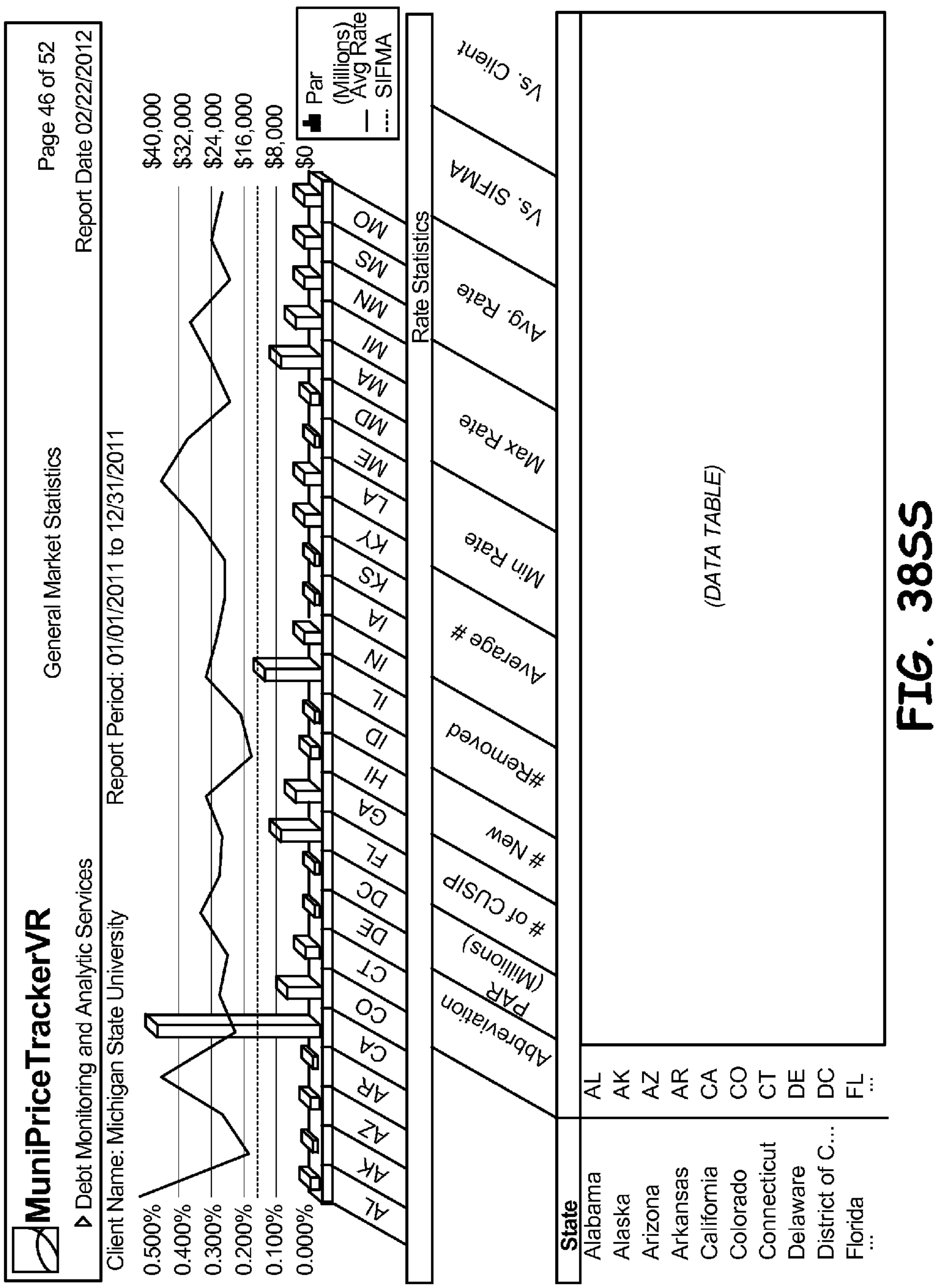
FIG. 38S is an exemplary Client Percentile Report for the queries identified in FIGS. 38H-38J which show how the client performed in each of the queries over various reporting periods.
Figure 38T:
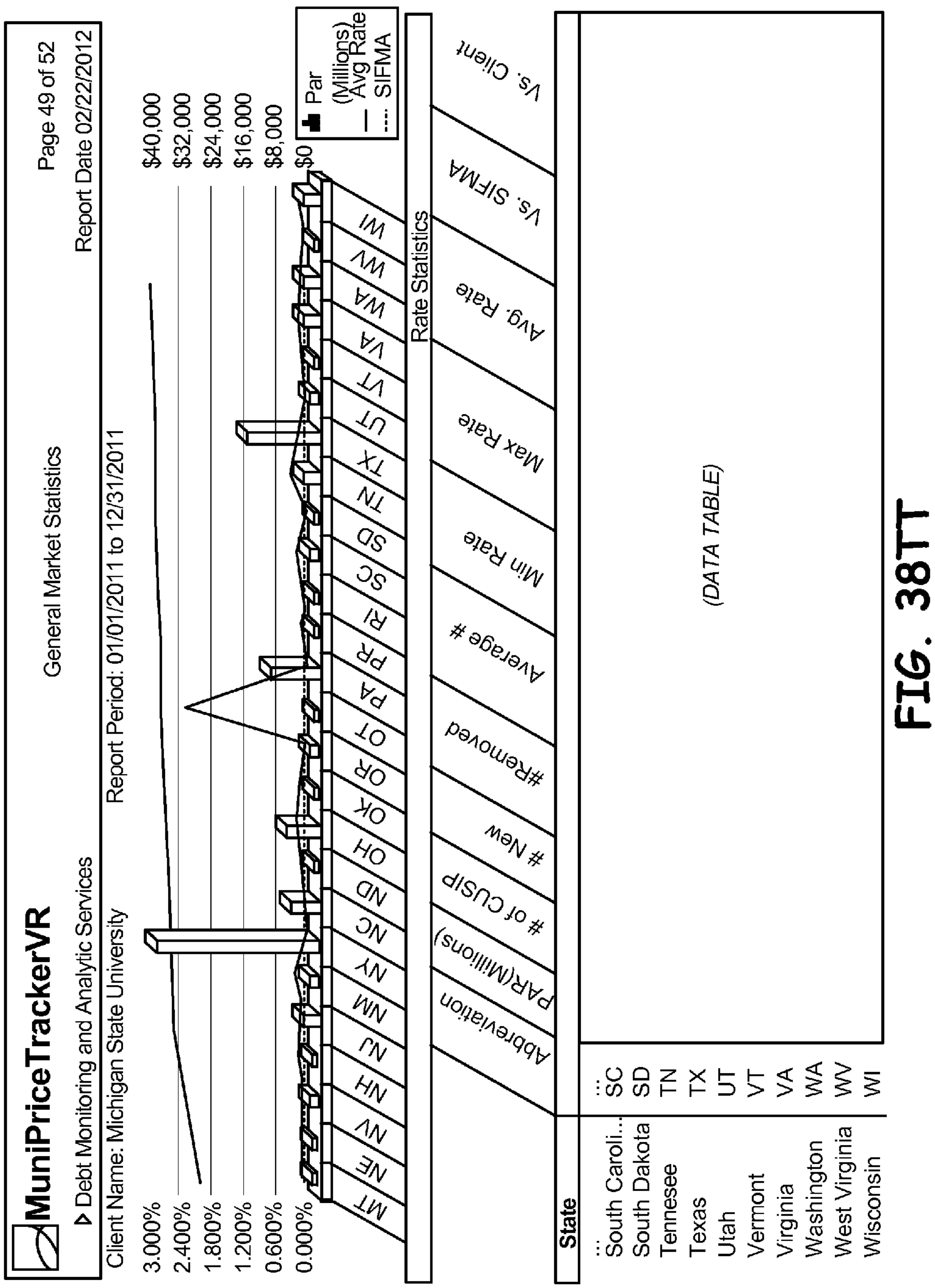
Figure 39:
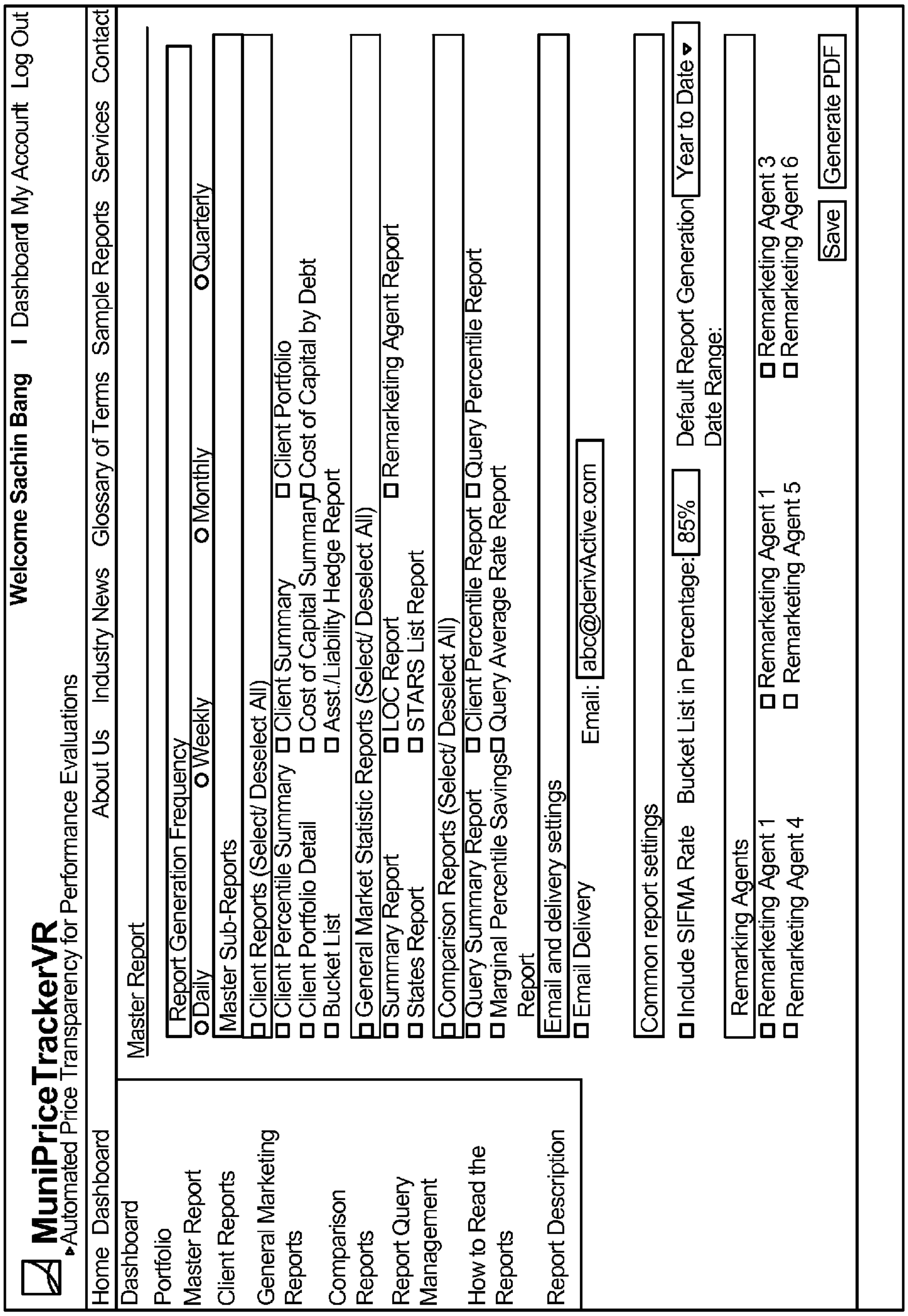
FIG. 39 is an exemplary screenshot of a Master Report Configuration Page generated by the software program of the present invention.

Referring to FIG. 35, the following information is typically required to enter a private debt into the system:

1) Description/Issue Name;

2) CUSIP/Debt ID (Leave blank if not CUSIP, system may generate);

3) Series;

4) Dated Date;

5) Initial Par;

6) Outstanding Par;

7) Rate Mode (Daily, Weekly, Other);

8) Final Maturity;

9) Tax Status;

10) Non-AMT/AMT;

11) Remarketing Agent ID;

12) State/Province ID;

13) Business Sector ID;

14) Credit Enhancement Type;

15) Credit Enhancement Provider ID (If type not self-liquid);

16) Credit Enhancement End Date (If type not self-liquid);

17) MinRate;

18) MaxRate; and

19) IssuerID (If different from client).

Private and Updated System values may create new entries in the Debt History table. The Name field in the AccountDebt table may be the same as the CUSIP in the Debt table, otherwise it may be a system generated value and the CUSIP field may be NULL.

CUSIP Basic Search

A control inline in the page may allow the User to search for Debt based on the Meta Data associated with all deals. At a minimum the following fields may be searched for:

1. CUSIP;
2. Organization Name:
   a. Returns matches on Issuer, Borrower, Remarketing Agent, CEP Provider;
3. Issue Type (Daily, Weekly, Other);
4. Issue Name;
5. State; and
6. Sector.

The results from the query may show the Current Debt History values for the debt and a checkbox by each. There User may be able to check each debt the User wants to add to the portfolio with a button that will trigger addition of the debts and then return the User to the create portfolio page.

Figure 31:
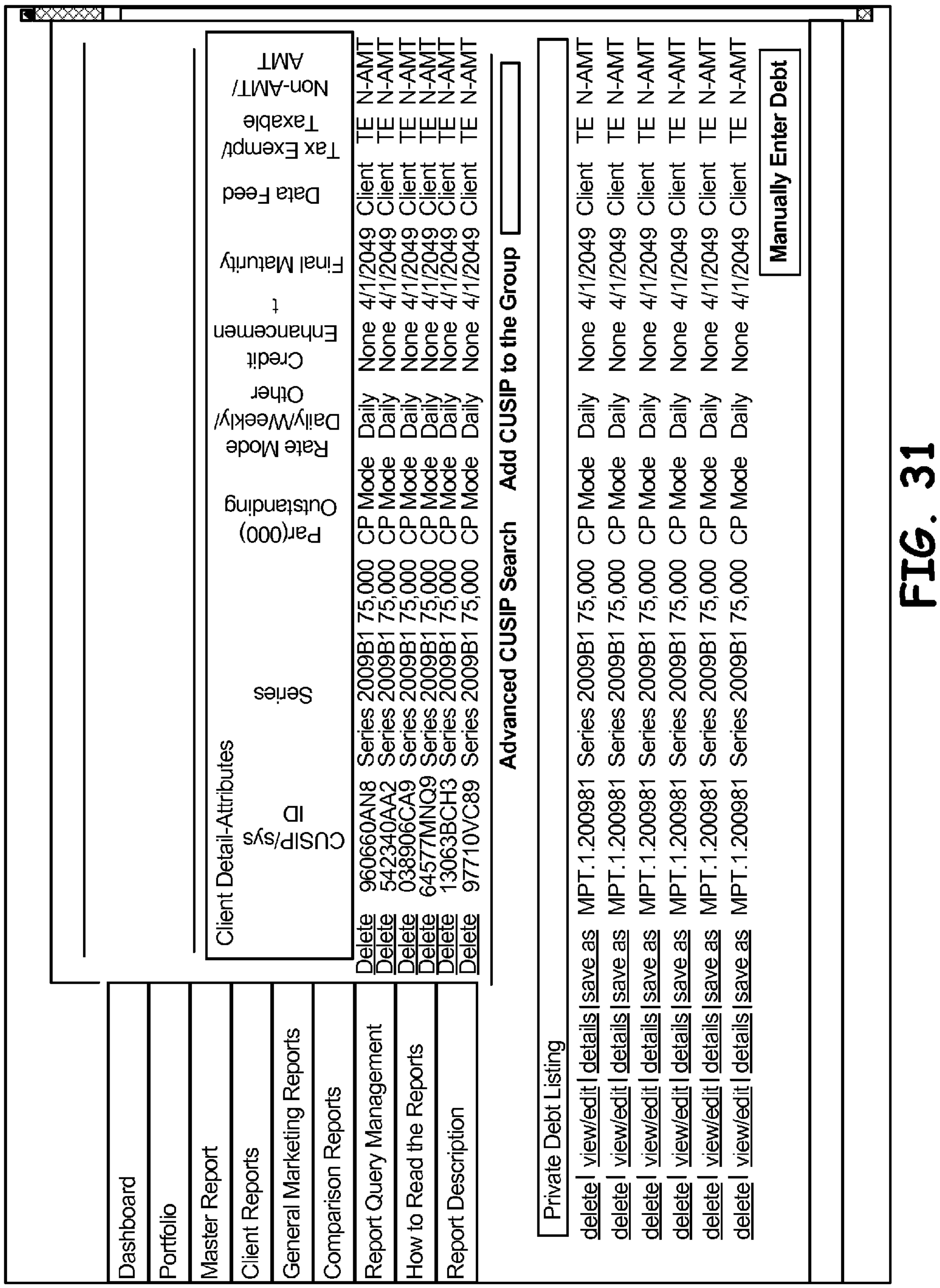
FIG. 31 is an exemplary screenshot of a Client Detail—Attributes Report of various debts generated by the computer program of the present invention.

CUSIPS may be added in the framework shown in FIG. 31. A User may enter entire a CUSIP to the system. The system will attempt to match the entire CUSIP to an existing CUSIP in the system. If no match is found, the system may populate the Search CUSIP Text Field with the first 6 characters of the CUSIP and perform a search. In the Search CUSIP Text Field, the User may enter any type of search parameter that a full-text search could use to locate a particular debt. This search will perform a FULL-Text type search against at least the following fields:

i. Debt.CUSIP;

ii. Debt.BondName;

iii. Debt.Description; and iv. AMS.Organization.OrganizationName.

Results of the search are shown in a Search Results Panel.

CUSIP Advanced Search

Figure 32:
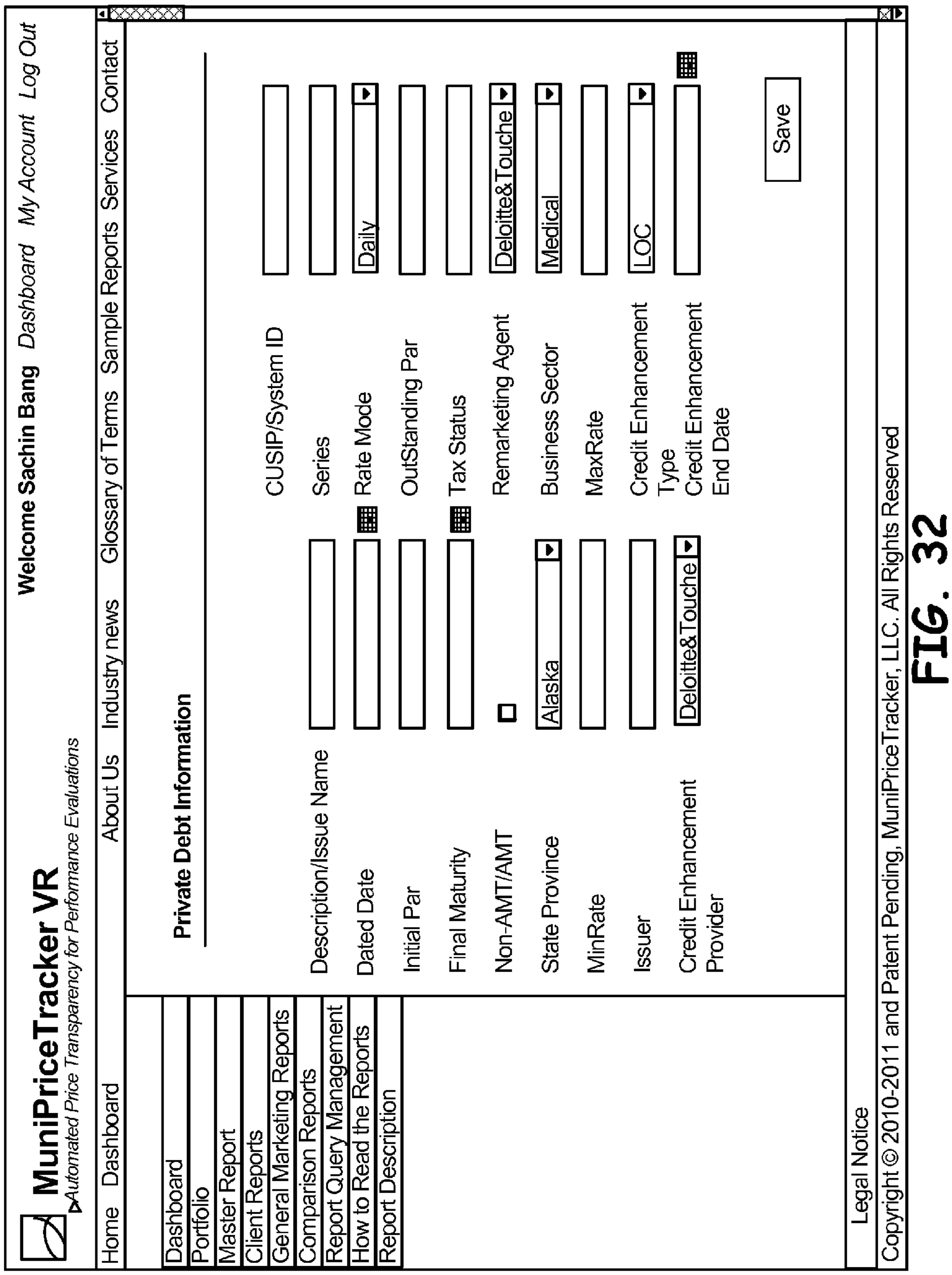
FIG. 32 is an exemplary screenshot of a Private Debt Information (data input) Page.

If the desired CUSIP is not found through the above mentioned process then the User may click an "Advance Search" button. Upon clicking the "Advance Search" button, the "Advance Search UI," shown in FIG. 32 will be displayed inline. As the User starts entering the initial CUSIP ID letters (after six letters), the "Search Results" section will display the matching CUSIPS through an intellisense functionality. However, if the User attempts to fill in other details, the intellisense functionality will stop populating the result and the User will need to click the Search button to find CUSIPS that match the additional search parameters.

Figure 33:
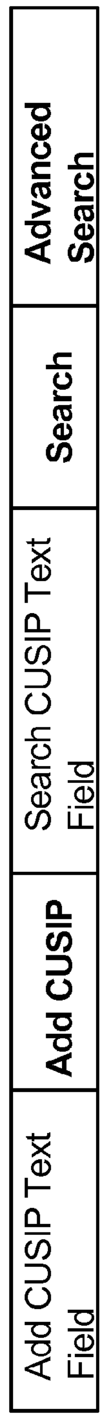
FIG. 33 is an exemplary table illustrating search query information.
Figure 34:
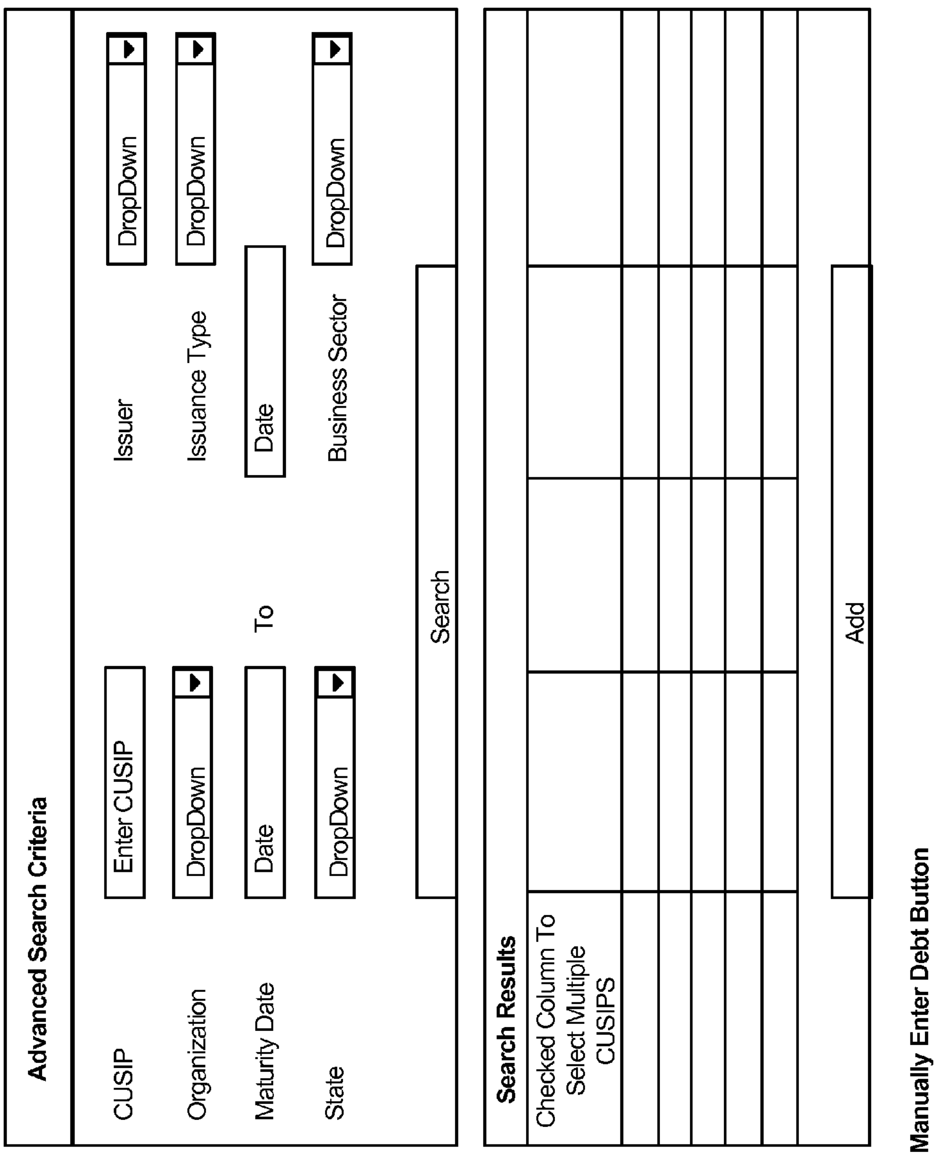
FIG. 34 is an exemplary screenshot of an Advanced Search Criteria Report page generated by the computer program of the present invention.

If some CUSIPS are found satisfying the "Search Criteria", those CUSIPS will be displayed in the "Search Results" section, where in the User can select the individual CUSIPS and, by clicking an "Add" button, add the located CUSIPs to CUSIPs list. The User can further refine the search by providing extra search filters as shown in the UI in FIG. 33.

Reports

A Report menu may contain FAQ style information about how to read reports and understand the significance and relevance of the data in the reports. This functionality may also be integrated with CMS. The menu will typically include a brief description of all the reports available from the system and may again be integrated with CMS.

Report Generation

Users may also be able to enter queries and create groups that may be used to generate Comparison Reports that include a summary line for each query/group and then create a matrix report that shows the percentile performance, comparing each of the queries/groups. (See Comparison Reports infra for additional specifications.) Based on the results of the Comparison Reports, Users can set up Threshold notifications that may alert them, typically by email, when an aspect of the percentile performance moves past a threshold. Thresholds can be set as greater than, less than, or within a range.

Users may have the ability to select the following report criteria, among many other options:

1. What Comparison Report queries may be included in the Master Report.
2. The pre-determined frequency for automated reports (weekly, monthly, quarterly, etc.).
3. Report generation date range or reporting period.
4. Settings specific to each report.

The Report may be generated based on settings selected by the User via the Master Report Configuration User Interface ("UI"). Users may also be able to enter information about their CEPs, including cost. This data may be combined with other clients' data and some outside data sources to allow querying against that data to see how a client's provider cost compares to other provider costs.

Users may view interactive charts. The charts may be interactive based on the period of the chart and based on the frequency of the points that need to be incorporated, i.e. daily, weekly, monthly or quarterly.

Prototype reports may be delivered in PDF format or Excel or be viewed online in HTML. Reports may be automatically/manually generated and sent to client via mail or email and may always be available online for download based on client conFigured settings. Users may have ability to interactively view and then export reports to PDF.

Queries

Description

1. Main Query:
   a. This is a filtering query to be applied to specified data sources.
2. Main Query Sources:
   a. The sources that the Main Query may be applied to include:
      i. All Debt;
      ii. Client Portfolio; and
      iii. Groups:
         1. Groups may be pre-created; and
         2. A Create Group option may be available on the query page which would direct Users to the create group page, then return them to the query page (Pop-up/Modal).
3. Sub Query:
   a. There can be zero to many sub queries which may perform additional filtering. This may be identical with step 1 with the exception all Step 1 filter options that have been exercised may be disabled. Each sub query may have a result line for each source identified in step 2. They may be labeled "<query name>-<source name>", with the exception that All Debt may just show the query name.
4. Show sources in results:
   a. Sources may be displayed in the results. For instance, the system could generate a label stating "Show sources in results?" and a check box for each source in step 2. The system may also default check each box.
   b. Sources that are checked may have a result line with their name and aggregate data.

Queries

Figure 40:
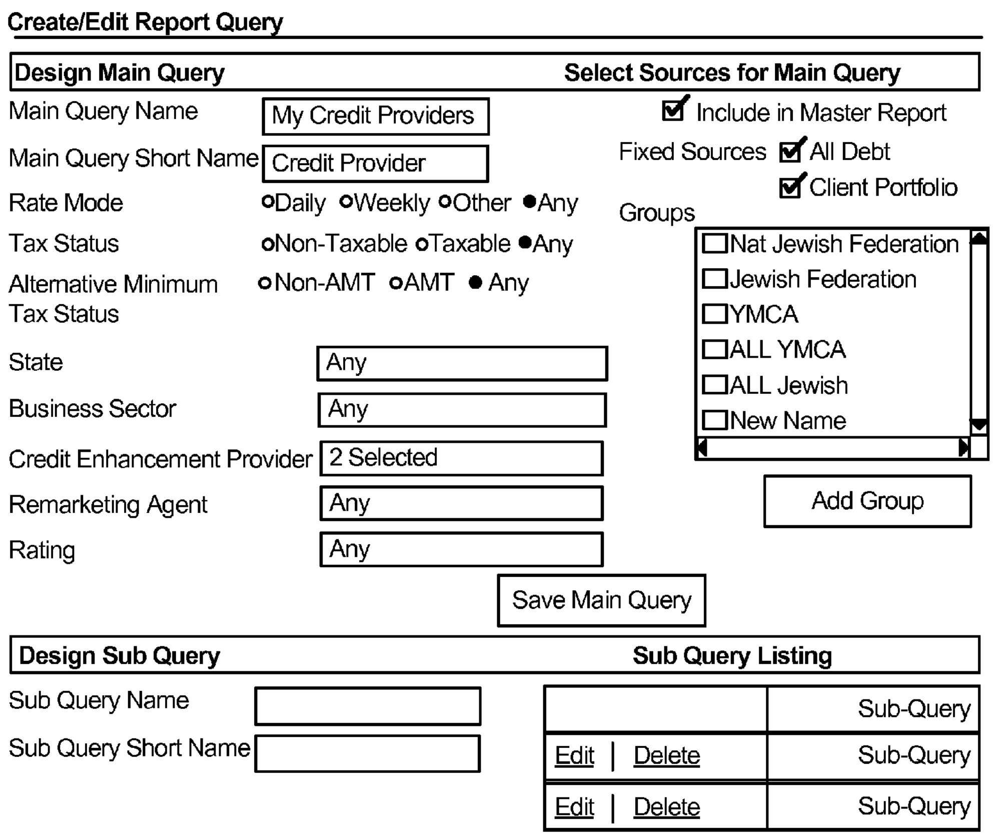
FIG. 40 is an exemplary Create/Edit Report Query screen page of the present invention.

Graphical User Interface (GUI) Detailed Description:

1. Referring to FIG. 40, in one embodiment, the Query management menu item in the left menu is programmed to load a query management UI, which may enable a User to Add, Edit, or Delete queries. However, if the list of queries is empty, the system may authorize the User to add auto generated queries. (See Auto Generated Queries below.)
2. Edit/Add new query link/button may enable the User to create new queries which may load a query creation page.
3. Query creation page: Through this GUI the User can design their "main query" and associated "sub-queries". The main query may run against a selected set of sources and the sub-queries may perform the additional filtration on the output of the main query.
4. The search parameters not selected in the main query may be disabled during the associated sub-query creation unless 'any' is selected which implies 'all' or 'no filter'.
5. As part of selection of filter criteria, Users can select ratings to filter against. Additionally, the system may include a provision to create customer defined ratings groups.

Ratings Groups Edit/Add:
   a. This may be a drop-down containing system defined ratings groups as well as customer defined ratings group.
   b. There may be a button to the right of the drop-down that may either say "Add Ratings Group" if a system defined group is selected or "Edit/Add Ratings Group" if a customer created group is selected.
   c. When the button is clicked it may bring up a popup that may allow the User to click on the individual ratings.
   d. The popup may contain the following components:
      i. List of customer created groups with edit buttons associated to each.
      ii. "Add Group" Button
      iii. Currently selected Group Name
      iv. Checkbox List of all Ratings
      v. "Save Group" Button
      vi. "Save and Exit Group" Button
      vii. "Cancel" Button
   e. The initial setup may be as follows:
      i. If customer group is selected:
         1. This may be treated as "Edit" mode and may populate the selected group's ratings into the list and Group Name textbox.
         2. The User can then edit that group.
      ii. If a system group is selected:
         1. This may be treated as "Add group" mode and may list unchecked ratings into the list and Empty string in the Group Name textbox.
         2. The User can check the ratings required, ensure a Group Name and save group.

6. The sources against which the query may be executed are as follows:
   a. All Debt;
   b. Client Portfolio; and
   c. Groups—(Each group may have User selected CUSIPS).

In the same GUI there may be a facility to invoke the Group Creation UI. A group is a collection of CUSIPS in which the User is interested. The User can create as many groups as he/she likes.

1. Upon creation of the groups, the group may be available for selection as a source against which main query may be fired.
2. The Sub-Queries Section may also show a list of sub-queries that are already being created and saved against the main query. The User has the option to edit or delete the sub queries.
3. For certain filter parameters like {Rate Mode, Tax Status, Amortization Status}, there is an option called "Any". Selecting the "Any" option in the Main Query Design may allow the remaining options associated with the (Rate Mode, Tax Status, Amortization Status) filters to remain enabled in the Sub Query Design. For example, if the User selects the "Daily" option for the "Rate Mode" filter, then in the Sub-Query Design, all other options (Daily, Weekly, other) may remain disabled with "Daily" as selected. On the other side, if the User selects the "Any" option, the User is free to select any option (Daily, Weekly, other) in the Sub-Query design.
4. FIG. 46 is a listing of fields that may appear in a "Query Management Screen":

Sample Query Building:

The following are specimen queries using the system of the present invention:

1. Main Query and Sources:
   a. Step 1: Main Query=TE (tax exempt), CA (California)
   b. Step 2: Sources:
      i. All Debt; and
      ii. Client Portfolio.
   c. Result Lines—Query 1, All Tax Exempt California Debt:
      i. All Debt; and
      ii. Client Portfolio.
2. Main Query and Sources:
   a. Step 1: Main Query=TE, CA, Hosp
   b. Step 2: Sources:
      i. All Debt;
      ii. Client Portfolio;
      iii. Group 1; and
      iv. Group 2.
   c. Result Lines—Query 2, All Tax Exempt, California, Hospitals Debt:
      i. All Debt;
      ii. Client Portfolio;
      iii. Group 1; and
      iv. Group 2.
3. Main Query, Sources, Sub Query, No Sources (identifiers) selected in step 4:
   a. Step 1: Main Query=TE, CA, Hosp
   b. Step 2: Sources:
      i. All Debt;
      ii. Client Portfolio;
      ii. Group 1; and
      iv. Group 2.
   c. Step 3: Sub Queries:
      i. JPM;
      ii. Citi; and
      iii. GS.
   d. Step 4: Show sources in results:
      i. NONE.
   e. Result Lines—Query 2, All Tax Exempt, California, Hospitals Debt:
      i. JPM;
      ii. JPM—Client Portfolio;
      iii. JPM—Group 1;
      iv. JPM—Group 2;
      v. Citi;
      vi. Citi—Client Portfolio;
      vii. Citi—Group 1;
      viii. Citi—Group 2;
      is. GS;
      x. GS—Client Portfolio;
      xi. GS—Group 1; and
      xii. GS—Group 2.
4. Main Query, Sources, Sub Query, Selected Sources:
   a. Step 1: Main Query=TE, CA, Hosp
   b. Step 2: Sources:
      i. All Debt;
      ii. Client Portfolio;
      iii. Group 1; and
      iv. Group 2.
   c. Step 3: Sub Queries:
      i. JPM;
      ii. Citi; and
      iii. GS.
   d. Step 4: Show sources in results?
      i. All Debt No
      ii. Client Portfolio Yes
      iii. Group 1 No
      iv. Group 2 Yes
   e. Result Lines—Query 2, All Tax Exempt, California, Hospitals Debt:
      i. Client Portfolio;
      ii. Group 2;
      iii. JPM;
      iv. JPM—Client Portfolio;
      v. JPM—Group 1;
      vi. JPM—Group 2;
      vii. Citi;
      viii. Citi—Client Portfolio;
      ix. Citi—Group 1;
      x. Citi—Group 2;
      xi. GS;
      xii. GS—Client Portfolio;
      xiii. GS—Group 1; and
      xiv. GS—Group 2.

Auto Generated Queries

For each client portfolio, system may auto generate some queries based upon the characteristics of their portfolio. These queries may provide the basic ways the User would want to compare themselves against all debt. To do this the system may analyze the client's portfolio for each Meta Tag and determine which ones best represent the client. The rule used to determine this may be:

1. For each Meta Tag, the system may determine which values have 70% or more coverage for the client. in one preferred embodiment, the metatags that may be confirmed in this query are IsTaxable, Is Amortized, State, Sector.
2. For remarketing agents, the system may take the top two regardless of percentage.

3. The system takes the combination of these values and generates queries.
4. Example:
   a. The client returns the following tags with greater than 70%:
      i. TE (tax exempt);
      ii. CA (California);
      iii. Hosp (Hospital);
      iv. AA (rating);
      v. CEP:
         1. Citi.
      vi. Remarketing Agent:
         1. GS; and
         2. JPM.
   b. Automated Queries:
      i. TE;
      ii. TE, CA;
      iii. TE, CA, Hosp;
      iv. TE, CA, Hosp, CEP—Citi;
      v. TE, CA, Hosp, Rmt Agt—GS;
      vi. TE, CA, Hosp, Rmt Agt—JPM;
      vii. TE, CA, Hosp, AA;
      viii. TE, CA, Hosp, AA, CEP—Citi;
      ix. TE, CA, Hosp, AA, Rmt Agt—GS;
      x. TE, CA, Hosp, AA, Rmt Agt—JPM;
      xi. TE, CEP—Citi;
      xii. TE, Rmt Agt—GS; and
      xiii. TE, Rmt Agt—JPM.

Whenever a User visits the "Query Generation Screen", if the query list is empty then on form load, in one preferred embodiment a confirmation box may appear saying "Do you want to generate queries automatically based on your portfolio?" On the User confirmation, the above logic may be executed and a list of auto generated queries with checkboxes may be listed to the User in the popup itself. User can then select the relevant queries and choose to save the queries Percentile Rank Percentile Rank may be calculated the same as the Excel function PERCENTRANK.EXC(array, x,[significance]). The array may be defined as the average rate for all debt over the period in question returned by the query. The x may be determined as average value of the subcategory (Group, Client, Sub Query) over the period.

Marginal Percentile Rate

This is the rate a client could save/lose by being in a different percentile rank. Marginal Percentile Rate may be determined in two steps.

1. Determine the reset rate for each percentile from 100% to 0%.
2. Subtract the client's average rate from each result.

The reset rate for each percentile may be determined using the same math as the Excel function PERCENTILE.INC (array, k). The array may be defined as the average rate for All Debt over the period in question returned by the query. The k may be percentage in question with the result being the value.

Master Report

The system is designed to generate a Master Report. A Master Report is a report that comprises all of the reports selected by the User authorized by the system settings and customer/client permissions. In one embodiment, the User can view this report in a PDF format. The PDF generation is achieved through a PDF generation service. This report may be delivered online, by Email or U.S. Mail at the User's option. The PDF is generated online and may be downloaded by User for viewing later.

The Master Report may be generated based on the frequency, email delivery true/false and email ids conFigured by the client in the Master Report Configuration UI. If email delivery is set as false, the reports may be sent to the system support staff email id as per a configuration file entry on the server.

Individual reports may be viewed online as html pages and may be exported to PDF or Excel. The online html reports do not need pagination and may be viewed as one webpage. Users with small screens may use the scroll bar to view the webpage, so Users with larger screens need not be limited to a small viewing area. Online reports may include configurable settings, e.g. reset mode, date range and bucket lists. These individual reports may be viewable/sent to clients based on their registration.

A typical Master Report would include at least the following:

1. Required Pages:
   a. Cover Page;
   b. Table of Contents;
   c. Disclaimers;
2. Optional Reports
   a. Client Summary;
   b. Client Percentile Summary;
   c. Client Portfolio;
   d. Client Portfolio Detail;
   e. Cost of Capital Summary;
   f. Cost of Capital by Issue Type (Daily, Weekly, Other);
   g. Stars List;
   h. General Market Statistics—General;
   i. General Market Statistics—States;
   j. General Market Statistics—CEP;
   k. General Market Statistics—Remarketing Agent;
   l. Bucket List Reports—One section for each Remarketing Agent in portfolio;
   m. Comparison Reports:
      i. Client Query Summary;
      ii. Query Percentile Scorecard;
      iii. Marginal Percentile Savings; and
      iv. Query Average Rate Report (Optional).
   n. Hedge Report.

Default report properties may be set in the Master Report Configuration UI. These properties are read before the Master Report generation. The UI includes a drop down list of all prior years and YTD. Once set, this may be the default reporting period for that client. The start year for the drop down list mentioned above may be picked from a configuration file.

For interactive reports only, the User may be given an option to set custom reporting periods, e.g. selecting custom dates as reporting period.

On the Master Report Configuration UI, the User has the ability to select different configurations to generate the final Master Report in PDF format, including:

1. Frequency at which the Master Report may be generated automatically:
   a. A set of radio buttons may have the values Daily, Weekly, Monthly and Quarterly. This configuration may define the frequency at which the system may generate the report.
2. Reporting period—i.e. Report generation default years (which may be a listing):
   a. This configuration defines the period of the data that is used for analysis. This is a listing of years starting from a year that may be picked from a server side configuration file to the previous year. At the beginning of every calendar year the listing may include the previous year.
   b. Listing may also include YTD.

3. Common settings across reports. i.e. the same setting may be applied across all the reports wherever applicable:
   a. Include SIFMA rate in chart;
   b. Remarketing Agent Bucket List—Percent Matching; and
   c. The system may provide a check box list of remarketing agents which clients may like to review. The selected remarketing agents may be added to the list in case they don't appear in top 20. The selected remarketing agents may always appear in different color in the chart and the text may be bold or may be in different color in the report. Advertising fees might be charged by the system to the remarketing agents for such listings.
4. Email delivery—true/false:
   a. If the email delivery=true, this value defaults to email of the User that created this account. This field is editable, in which the User can add more ';' separated values.
5. Email id—the email addresses to which the reports may be emailed.
6. Setting of which reports need to be included in the Master Report:
   a. This configuration may be shown in the form of a checkbox list having the report names in front of them. The selected report may only be included in the Master Report.

Report Levels of Detail

For each report on the Master Report, the following levels of detail have been taken into account, wherever appropriate:

Summary

This report section may provide the aggregate analysis showing the overall averages of each category along with some charts showing the overall trend. It may contain the Quarterly and YTD details Daily Average This report would include a relevant graph showing the Daily Average over time and then the details.

Weekly Average

This report section would include a relevant graph showing the Weekly Average over time and then the details.

Monthly Average

This report section would include a relevant graph showing the Monthly Average over time and then the details.

Quarterly Average

This report section would include a relevant graph showing the Quarterly Average over time and then the details. This section may always appear with the monthly section.

Annual Average

This report section would include a relevant graph showing the Annual Average over time and then the details. This section may always appear with the monthly section.

Client Reports

All of the client reports provide basic information about the client's portfolio.

Client Summary

This report may provide the client with a snapshot summary of their portfolio. This report may show various aggregates of the client's portfolio that may have value. Some examples are:

1. Average Rates per Issue Type;
2. Average Rates per sector;
3. Total debt;
4. Number of deals; and
5. Average par.

The following data is required for the Client Summary Report:

| Name | Description |
|---|---|
| Client Portfolio | List of all the debt associated with the client. All current meta-data for the portfolio may be available from which to create queries. |
| All Debt | All the debt and its meta-data are needed for all analysis compares. |
| Client Queries | List of all the queries that analysis needs to be provided on. |

Client Percentile Summary

This report may provide the client with a quick snapshot of how their portfolio has performed against the Comparison Report queries over the last week, month, quarter, year, and year to date. It may show the current performance of all Comparison Report Queries that are marked Show on Master Report. Additional auto queries might be used as well, such as the client's state, LOC Providers, Remarketing Agents, business sector, etc. These would all come from their portfolio and would show how their related portfolio performs against All Debt of the same type. (These could also be pre-created queries).

Client Portfolio

This report details the client portfolio. The report is divided into sections based on Reset Mode: Daily, Weekly and Other. The Other category can be further divided into further subsets as defined by the client. Each line represents a CUSIP or a unique Debt ID and a subset of characteristics. Each security's rate statistics are presented, including Minimum Rate, Maximum Rate, Average Rate, Versus Avg. SIFMA, and Versus Avg. Client. The period of calculations is YTD. The following data is required for this report:

| Name | Description |
|---|---|
| Client Portfolio | List of all the debt the client has associated. All current meta-data for the portfolio may be available. |
| SIFMA Rates | SIFMA rates for the last year. |

Client Portfolio Detail

This report details the client portfolio. The report is divided into sections based on Reset Mode: Daily, Weekly and Other. Each line represents a CUSIP or a unique Debt ID and all its individual characteristics (Meta-Tags). The report identifies how each security is described in the database for purposes of comparison. The following data is required for this report:

| Name | Description |
|---|---|
| Client Portfolio | List of all the debt the client has associated. All current meta-data for the portfolio may be available. |

Cost of Capital Summary

The Cost of Capital—Summary Report presents composite statistics for each of the Reset Mode Categories, Daily Overall, Weekly Overall, and Other Overall. No individual security statistics are present on this page, unless a Reset Mode category consists of only one security. The Daily Overall, Weekly Overall, and Other Overall categories are also aggregated into All Categories Overall composite statistics. The above calculations are performed on a weekly, monthly, quarterly and YTD basis. The following data is required for this report:

| Name | Description |
|---|---|
| Client Portfolio | List of all the debt the client has associated. All current meta-data for the portfolio may be available. |

Cost of Capital by Debt Type(Reset Mode)

The Cost of Capital—(CUSIP Level) presents statistics for each individual security. Individual statistics and composite statistics for the Reset Mode category are presented on this page. The above calculations are performed on a weekly, monthly, quarterly and YTD basis. Similar reports named Cost of Capital—(Daily) and Cost of Capital—(Other) exist and serve the same function. The following data is required for this report:

| Name | Description |
|---|---|
| Client Portfolio | List of all the debt the client has associated. All current meta-data for the portfolio may be available. |

Bucket List Reports

This report identifies for the client which other securities in the database had the highest number of identical reset rates as a client security. It identifies with whom the Remarketing Agent has grouped or bucketed a client's security. The report outputs the Average Client Rate, Average Bucket Security Rate, and the number of data points that are exactly the same for the same dates in order of rank based on the number of data points from highest to lowest. Additionally, the characteristics of those comparable securities are identified such that the client can determine if the grouping/bucketing appears reasonable. The compare may be done on a per debt basis with only matching results greater than a configurable percentage showing in the list. In one preferred embodiment, the default percentage may be 85% and may be conFigured on a per account basis for the Master Report. The online version of the report may allow the percent configuration to be changed and then ask if it may update the Master Report setting. The list may be ordered from highest matching result to lowest. The following data is required for this report:

| Name | Description |
|---|---|
| Client Portfolio | List of all the debt the client has associated. All current meta-data for the portfolio may be available. |
| All Debt | All the debt and its meta-data are needed for all analysis compares. |

Asset/Liability Hedge Report

This report demonstrates the amount of notional/par of investment securities is necessary to hedge the variable cash flows of the debt portfolio, based on different indexes, including treasuries, agencies, and the LIBOR index. It may compare the User's portfolio to the User's imputed investments. There may be a report that shows the total investment vs. client's portfolio and one for each investment that has been associated with a subset of the client's portfolio. The reports may show the average rate, total par, % hedged, and a graphic showing how the values compare over time.

General Reports

These reports provide general market aggregation based on the overall market and some of the most common ways to look at the market. In addition to the standard date period drop down list, there may be a date range that may allow the Users to see specific dates of interest.

Stars List Report

This report identifies for the client which other securities (for instance, Top 25) in the database had best reset rates ranked from best to worst. The report outputs the Average Client Rate and Average Bucket Security Rate. Additionally, the characteristics of those comparable securities are identified such that the client can determine which characteristics garner the best rates. The following data is required for this report:

| Name | Description |
|---|---|
| All Debt | All the debt and its meta-data are needed for all analysis compares. |

General Market Statistics Report

This report outputs the results of static general market queries. The sections of the report include Tax-status, Underlying Long-Term Rating, Underlying Short-Term Rating, Credit Enhancement Long-Term Rating, Credit Enhancement Short-Term Rating, Credit Enhancement Form, Specialty States, and Sectors. Each line represents a query on the database and the statistics are presented, including Minimum Rate, Maximum Rate, Average Rate, Versus Avg. SIFMA, and Versus Avg. Client. The period of Calculations is YTD. This report may be presented either as a composite of all Reset Modes or individually by each Reset Mode. The following data is required for this report:

| Name | Description |
|---|---|
| All Debt | All the debt and its meta-data are needed for all analysis compares. |
| SIFMA Rates | SIFMA rates for the last year. |

General Market Statistics Report—CEP

This report outputs the result of a static general market query focused on the CEP characteristic. Daily, Weekly and Other Reset Mode sections exist, identifying which 20 banks deliver the lowest Average Rates. The 20 CEP banks are ranked from lowest average cost to highest average cost. Each line represents a query on the database and the statistics are presented, including Minimum Rate, Maximum Rate, Average Rate, Versus Avg. SIFMA, and Versus Avg. Client. The period of calculations is YTD. The following data is required for this report:

| Name | Description |
|---|---|
| All Debt | All the debt and its meta-data are needed for all analysis compares. |
| SIFMA Rates | SIFMA rates for the last year. |

General Market Statistics Report—Remarketing Agent

This report outputs the result of a static general market query focused on the Remarketing Agent characteristic. Daily, Weekly and Other Reset Mode sections exist, identifying which 20 remarketing agents deliver the lowest Average Rates. The 20 remarketing agents are ranked from lowest average cost to highest average cost. Each line represents a query on the database and the statistics are presented, including Minimum Rate, Maximum Rate, Average Rate, Versus Avg. SIFMA, and Versus Avg. Client. The period of calculations is YTD. The following data is required for this report:

| Name | Description |
|---|---|
| All Debt | All the debt and its meta-data are needed for all analysis compares. |
| SIFMA Rates | SIFMA rates for the last year. |

General Market Statistics Report—States

This report outputs the result of a static general market query focused on the State characteristic. Daily, Weekly and Other Reset Mode sections exist, identifying which states deliver the lowest Average Rates. The states are ranked from lowest average cost to highest average cost. Each line represents a query on the database and the statistics are presented, including Minimum Rate, Maximum Rate, Average Rate, Versus Avg. SIFMA, and Versus Avg. Client. The period of Calculations is YTD. The following data is required for this report:

| Name | Description |
|---|---|
| All Debt | All the debt and its meta-data are needed for all analysis compares. |
| SIFMA Rates | SIFMA rates for the last year. |

Comparison Reports

The comparison reports may allow the User to compare any collection of debt against other collections of debt for the purpose of analysis. They also may provide a comparison of the partial/entire client's portfolio against the market values. The collections of debts are:

1. Client's Portfolio;
2. Grouped Debt Lists;
3. All Debt (Entire system);
4. Main Query of Meta Tags against #1, #2, or #3; and
5. Sub Query of Meta Tags against #4.

A query may be comprised of a list of Meta Tag filters; it may also include the target data it may be compared against. For example, one query might compare all HealthCare with a AAA rating against All Debt and the Client's portfolio. This would return the aggregate data against All Debt and against the Client's Portfolio. Sub queries can be done applying results of the main query against All Debt and/or the Client Portfolio. If both are specified, it may show two separated queries with the client's result showing "—Client" after the query name. E.g., if the main query was CA Hospitals, and the sub query was JP Morgan remarketing agent, and a User specified the sub query against the All Debt sub results and Client Portfolio sub results the report would have the following lines:

| Main Query/Name | Sub Query | Against |
|---|---|---|
| CA, Hospitals | | All Debt |
| JP Morgan | JP Morgan | All Debt |
| JP Morgan - Client | JP Morgan | Client Portfolio |

Each query may be saved and optionally identified for inclusion in the Master Report. Queries included in the Master Report may also be on the Client Summary Report. The Client Summary Report may also show the current performance of all Comparison Report Queries that are selected in the 'Show on Master Report' checkboxes of the query management screen. The output from the queries may be the following reports:

Client Percentile Scorecard

For all the queries that only have a main query and have the Client's Portfolio and All Debt as sources, this report may show the percentile rankings of the query against the Client's Portfolio compared to the query against All Debt. The results may be grouped by Issue Type, then by date summaries (Weekly, Monthly, Quarterly), with a line for each query.

Client Percentile Summary

This report may show all queries that contain just a main query against All Debt and the Client's Portfolio. The report may show the percentile values comparing the Client's Portfolio against All Debt.

Client Query Summary

This report outputs client defined queries. Each line represents a query on the database and the statistics may be presented, including Minimum Rate, Maximum Rate, Average Rate, Versus Avg. SIFMA, and Versus Avg. Client. The period of calculations is YTD.

Query Percentile Scorecard

For each main query that has either groups or sub queries, a separate Query Percentile Report may be generated. It may be similar to the Client Percentile Report except it may compare the groups/sub queries to All Debt instead of just the Client's Portfolio. The Client's Portfolio may also be included in this report. This may show the percentile ranking of the sub query or group against the other sub query or group included in the main query. The results may have a line for each sub query or group.

Marginal Percentile Savings Report

This report may show how many basis points (reset rate) each percentile rank may garner a client on a per query basis. This report shows all the queries from the Client Percentile Scorecard and any Query Percentile Scorecard that includes the Client's Portfolio compared to All Debt. This report identifies the marginal change in interest rates for each percentile. It is a measure of the savings that could be garnered by improving the percentile ranking of the Client's Portfolio against All Debt on a per query basis. In addition to showing the Reset Value, this report may show the marginal par value of savings.

Query Average Rate Report (Optional)

This report is an optional report that may provide the User the average results per week over the given time period of any query. It may be a combination of the Query Summary Report and Percentile Report with the exception that it may display the averages instead of percentile.

Marginal Percentile Rate

This is the rate a client could save/lose by being in a different percentile rank. Marginal Percentile Rate will be determined in two steps.

1. Determine the reset rate for each percentile from 100% to 0%.
2. Subtract the client's average rate from each result.

Marginal Par Value of Savings

To calculate the par value of savings, multiply each Marginal Percentile Rate by the total outstanding par of the client's debts that are included in the query.

Cost of Credit Enhancement Provider

The system may gather information about the cost of credit enhancement providers. There are at least two ways the system may do this:

1. While creating a portfolio; and
2. Through a survey sent via email.

Both methods may use the same form and have some pre-completed values if known. The survey via email may be done by sending an email to all borrowers that have VRDO debt. The email may contain a link back to the site to a form that contains all the debt the system has associated with the borrower. For the client it may be filled with their portfolio. The form may be similar to the Create Portfolio page, allowing them to add debt in all the same manners. The exception may be that they also have to specify the Cost of Credit Enhancement Provider as one of the requirements.

Patterns

The present system allows a User to look for various patterns in securities data. For instance, the Bucketkey can be used to identify if a debt has a set of matching rates over a period which might suggest the debt is being combined with other Debts (debt grouping). Other examples include how a Debt or security rates within its sector, how a Debt compares to other Debts during periodic resets, efficiencies in CEPs, dealers and remarketing agents, etc.

For instance, to identify efficiencies in CEPs, a client portfolio is created and the portfolio contains more than one CEP used by the client in the past. The client is able to use the present system to determine if the client should use one previously used CEP over another, or locate a new CEP.

A first pattern that can be identified in this situation is to determine how the CEPs used in the past perform against each other, to see, for instance, which CEP is getting the better rates overall as well as in the client's portfolio. A query is created where the client selects the sources as ALL DEBT and CLIENT Portfolio and identifies the CEPs to be compared. (See FIG. 40.) A Query Summary Report would be produced as a result of the query. See FIG. 41. Based on the results in the example of FIG. 41, we can see that JPM outperformed Merrill by 0.018% on the average rate across all debts and that the Client's JPM trades outperformed the Merrill by 0.002% on the average rate.

Figures 41, 42:
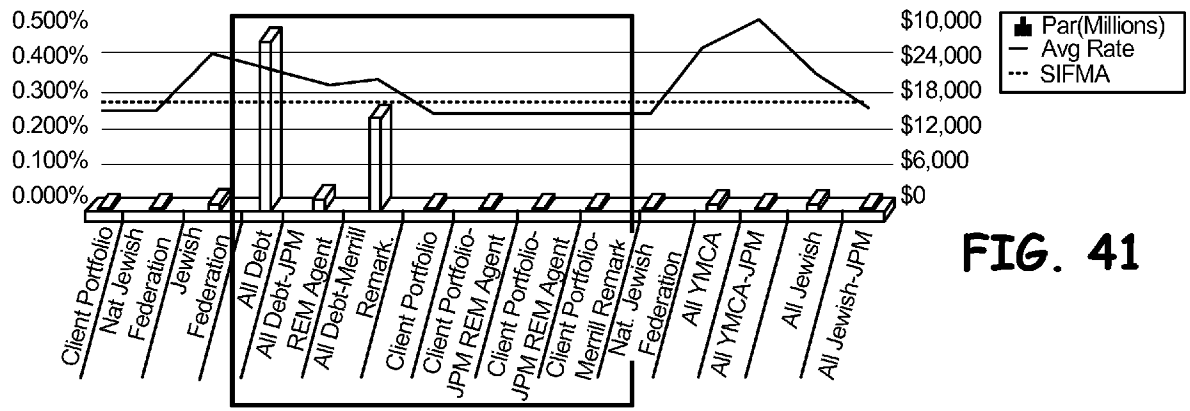
FIG. 41 is an exemplary CEP comparison summary report of the present invention.
FIG. 42 is an exemplary CEP Percentile report of the present invention.

An exemplary Query Percentile Report, as shown in FIG. 42, illustrates how each source/sub query performed against the entire query. Specifically, the client's Merrill debts performed in the 89.9 percentile for February, which means it is performing well compared to other CEPs. The client's own portfolio performed in the 75%, which also means the portfolio performed well when compared to others who have the same CEP.

An exemplary Marginal Percentile Savings Report shown in FIG. 43 discloses how the client's portfolio performed against the entire query for the given calendar year and if it performed better than others, what savings would have been realized. In this example, the client performed around the 83$^{rd}$ percentile. If the client was to obtain a 0.007% better rate (about the difference of Merrell to JPM on the whole), the client would save $804 over the year.

In this scenario, it is evident that the client portfolio has been performing well compared to others using the same CEPs.

The system can also provide information on how other CEPs are performing. FIG. 44 is an exemplary report of CEPs having at least 100 associated securities. JPM's average rate was 0.322% and Merill's average rate was 0.340% (FIG. 41). When compared to FIG. 44, it can be concluded that the client's CEPs performed in the range of moderately sized CEPs.

The system can be used to compare a client's portfolio to other comparable portfolios. FIG. 45 is a group of exemplary portfolios. The query summary shows that the Client portfolio has the lowest average rate, meaning it is performing better than its comparables.

FIG. 46 is percentile query summary that shows over smaller increments of time, the client's portfolio has performed better than the other portfolios scoring as high as the 93$^{rd}$ percentile in April.

FIG. 47 is an exemplary "Bucket List" query summary showing what group or "bucket" of securities the remarketing agent has associated with the client securities. A remarketing agent should find the rates that best match the client's combination of CEP and client characteristics. The Bucket List identifies all other securities that have the exact same rate as the client security over a set period of time and a set percent of matching points (ranging from 5% to 100%).

From a review of the bucket list, it is apparent that the Bucket List includes a variety of different CEPs which should all have different value in the market. Preferably, the Remarketing agent would have grouped the client portfolio by a common CEP. Further, the sectors are varied, including schools, medical companies and even a power company. Again, ideally, the client portfolio should have been grouped by a common sector.

Based on this information, it is apparent that JPM is remarketing the list of securities to a particular client of theirs where JPM provides the same rate for the entire group instead of remarketing each of the trades independently. Further, all of the securities qualify to trade at some specific spread to SIFMA and the client's security just happens to fall into that spread value.

Process Overview Disclosed by Figures

FIGS. 1-5 and 24-26 describe overall functionality of the system and how the system either collects data or generates data for reports. FIGS. 6-23 describe how data is collected from the various data feeds in order to assemble all of the information required to generate useful reports as described above. All Figures are representative of specimen embodiments and are not limiting. As a further explanation of the Figures of the present invention, the following information and/or definitions of terms disclosed in referenced Figures is offered.

Reference Blocks

1. Rate and General Debt Transaction Information Service—refers to the service that is used to get the resets (rates), the list of debts, and the general debt information.
2. Ratings Data Service—refers to the service that is used to get the credit ratings for each debt from multiple credit rating vendors.
3. Meta Data Service—refers to the service that gets the metadata for each debt that is not available from step 1 above. This metadata is the primary data used in queries to the database.
4. Benchmark Rates Service—refers to the benchmark rates that can be used to compare the rate pulled in step 1 above as a marked spread. The primary rate used, but not exclusive rate, is SIFMA.
5. Database Machine—refers to the machine or website server 20 which may contain multiple database servers and multiple databases in which the data from the feeds is stored and combined to create the reporting data.
   a. Rate and General Debt Data—refers to the data that is retrieved from step 1 above and stored into a database.
   b. Ratings Data—refers to the data that is retrieved from step 2 above and stored into a database.
   c. Meta Data—refers to the data that is retrieved from step 3 above and stored into a database.
   d. Benchmark Data—refers to the data that is retrieved from step 4 above and stored into a database.
   e. Reporting Database—refers to the data that is the result of combining data retrieved by data services in steps 1-4. The data may be combined by various means to include but not limited by the use of functions, sql queries, SSIS packages, executable programs, web services, and scripts.

6. Website Machine—refers to the machine that takes in the users input, performs logic to transform the reporting data into consumable reports that include but are not limited to HTML web pages, PDF files, and Excel files.
   a. Generate HTML Reports—refers to the process in which the website machine communicates with the User Machine via the internet to receive inputs that are used to generate HTML results from the data retrieved from the Database machine and is then served on the users Browser or any application that can consume HTML output.
   b. Generate PDF Reports—refers to the process in which the website machine communicates with the User Machine via the internet to receive inputs that are used to generate PDF Reports from the data retrieved from the Database machine and can then be saved to the User Machine as a PDF file.
   c. Generate Excel Reports—refers to the process in which the website machine communicates with the User Machine via the internet to receive inputs that are used to generate Excel Reports from the data retrieved from the Database machine and can then be saved to the User Machine as an Excel file.
7. Internet—refers the network of that allows communication between any set of machines to include but not limited by any User Machine and the Website Machine.
8. User Machine—refers to the machine by which a user can communicate with the internet to the Website Machine. The User Machine must be able to provide a means to input data by means that include but are not limited to a Browser that is capable of serving HTML requests.
   a. Browser—refers to any program that is capable of serving HTML requests.
   b. User Input—refers to the need of user input to create accounts, define portfolios, set report criteria, create dynamic query criteria, define master report configurations, and navigate HTML requests.
9. User—refers to any entity that has signed up for our service and is capable of inputting data that can be consumed by the internet to communicate with the Website Machine.

FIG. 1—Overview

FIG. 1 shows the general overview of the system of the present invention, including how securities data are gathered from database services over a network, such as the internet, converted into a common format and mathematically manipulated using algorithms into a searchable reporting database. The reporting database is connected to a website server. A User computer communicates with the website server via the network (here, the internet). Queries are submitted by the user computer to the website computer to generate searches and search reports.

Figure 3:
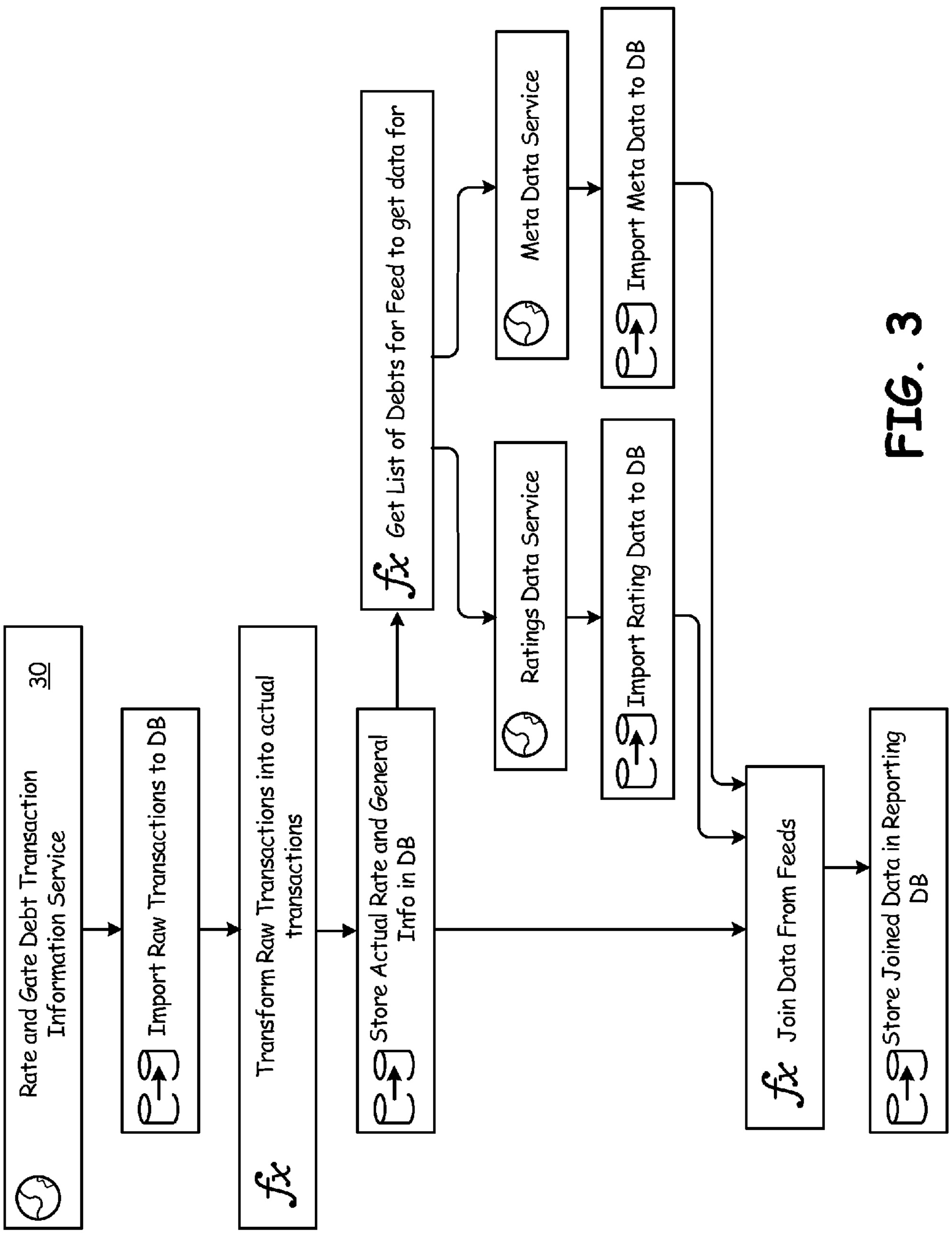
FIG. 3 is a flow diagram illustrating how data is obtained and combined from the Debt Transaction Information Service, Ratings Data Service, and Meta Data Service.

FIG. 3—General Data Flow from Data Sources (Data Feed Process)

FIG. 3 is a flow diagram illustrating how data is obtained from a Debt Transaction Information Service. Information is "pulled," "processed" and mathematically manipulated with meta data to create information useful to an ultimate User of the system. The database machine 30 monitors various networked databases. For example, one such data base for bonds is called EMMA and is available at http://emma.msrb.org/. EMMA provides raw data that is imported into a first database machine 30. This data is then transformed into identifiable transactions which is then stored in a General Information database. From this information the security identifier or CUSIP is obtained and used to obtain relevant trade information from other data services, such as Ratings Data and Meta Data services Such related or corollary information is then mathematically manipulated, combined and stored in a Reporting database.

Reference Blocks

1. Rate and General Debt Transaction Information Service—refers to the service that is used to get the resets (rates), the list of debts, and the general debt information.
2. Import Raw Transactions To DB—refers to process of retrieving data from the service in step 1. The service sends raw sequence numbers of all entries into the service's database. Each sequence is a relation to an actual Transaction that sets the reset (rate) for a CUSIP (debt). Each sequence can either Insert, Modify, or Cancel a Transaction. This step imports all the sequences.
3. Transform Raw Transactions into actual transactions—refers to process by which the resolution of all sequences is completed and the remaining transactions are updated based upon the sequence either inserting a new transaction, modifying or cancelling an existing transaction.
4. Store Actual Rate and General Info in DB—refers to the process that stores the data retrieved from the actual transactions in a database.
5. Get List of Debts for Feed to get data for—gets a list of all the debts that have been pulled from the service in step 1 so that the system can pull the additional metadata and ratings for these debts.
6. Ratings Data Service—refers to the service that is used to get the credit ratings for each debt from multiple credit rating vendors.
7. Meta Data Service—refers to the service that gets the metadata for each debt that is not available from step 1 above. This metadata is the primary data used in queries to the database.
8. Import Ratings Data to DB—refers to the process to take the feed data from step 6 and store them in a database.
9. Import Meta Data to DB—refers to process to take the feed data from step 7 and store them in a database.
10. Join Data From Feeds—refers to process that logically combines the data retrieved from all the feeds.
11. Store Joined Data in Reporting DB—refers to process that stores the combined data from the all the feeds.
12. Benchmark Rates Service—refers to the benchmark rates that can be used to compare the rate pulled in step 1 above as a marked spread. The primary rate used is SIFMA.

Figure 4:
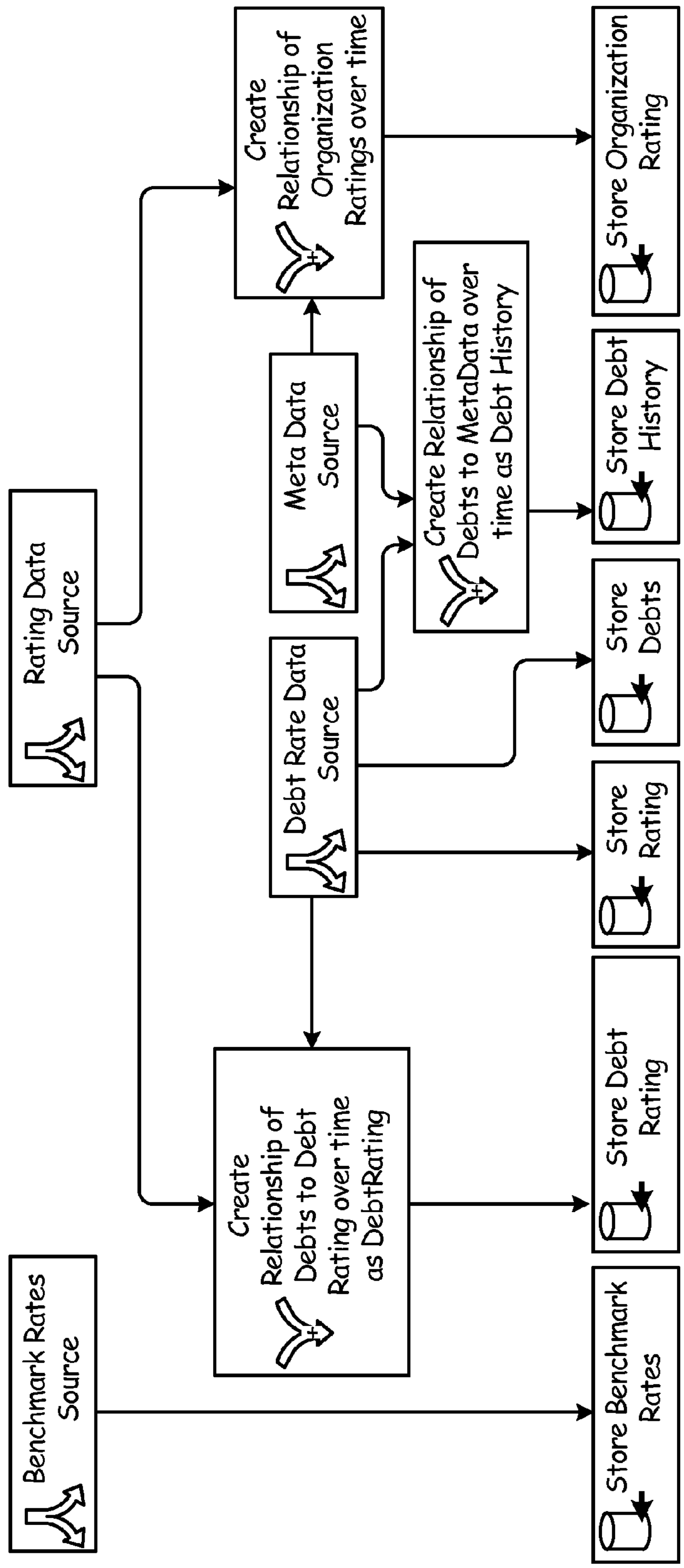
FIG. 4 is a flow diagram illustrating how data is combined and stored from the Data Services identified in FIG. 3.

FIG. 4—How Data Sources are joined in Reporting Data

The Benchmark Rate Source provides Benchmark rates that are stored in the system. The Debt Rating service, combined with the Debts to Debt Rating Data obtained from a rating data source can be combined with Debt Rate Data to create a relationship of Debts to Debt Ratings over time or can be combined with Meta Data to create a relationship of the Organization Ratings over time. This information may be stored in a Debt Rating or -Organization Rating database, respectively.

Debt Rate Data and Meta Data can be combined to create useful information, such as the relationship of debts to meta data over time as a DebtHistory, the entire history of the ratings for debt, such as a change in a CEP over time, or if self credited, the credit rating of the organization that owns the debt. Rating Data and Meta Data can be combined to create a relationship of an organization's ratings over time. This includes ratings of all organizations polled, such as issuers, borrowers, CEPs, marketing agents and others over time. Meta Data can also be combined with Debt Rate Data to create a Relationship of Debts to MetaData over time.

The Debt Database stores such information as the par amount, name of the debt, description of debt, etc. The Store Rates database contains such information the reset rates for each debt, which is one primary basis for comparison of debts, for instance, how does a client debt portfolio compare to other similar portfolios in the same state, sector, etc.

The six database stores or "data silos" shown in FIG. 4 illustrate the sources of data that come into the system and how the data can be combined to create searchable databases. The "data silos" can be further modified to create more refined databases that can be searched more easily.

Since many debts depend on benchmark rates, benchmark rate sources are contacted for benchmark rates over time, which information can also be stored in a database for data retrieval.

Reference Blocks

1. Benchmark Rates Source—refers to the benchmark rates that can be used to compare the rate pulled in the Debt Rate Data Source as a marked spread. The primary rate used is SIFMA.
2. Rating Data Source—refers to the service that is used to get the credit ratings for each debt from multiple credit rating vendors.
3. Create Relationship Of Debts to Debt Rating over time as DebtRating—creates one or many relationship of what the debt ratings are from multiple debt rating agencies over time. It combines the data from the Debt Rate Data Source and the Rating Data Source.
4. Debt Rate Data Source—refers to the service that is used to get the resets (rates), the list of debts, and the general debt information.
5. Meta Data Source—refers to the service that gets the metadata for each debt that is not available from the Debt Rate Data Source. This metadata is the primary data used in queries to the database.
6. Create Relationship of Organization Ratings over time—creates one or more relationships of what the organization ratings are from multiple debt rating agencies over time. It combines the organization data from the Meta Data Source and the Rating Data Source.
7. Create Relationship of Debts to MetaData over time as DebtHistory—creates the relationship of the general debt information in the Debt Rate Data Source for each day a debt has a reset to the metadata for each of those days from the Meta Data Source.
8. Store Benchmark Rates—refers to process of storing the benchmark rates that were retrieved directly from the Benchmark Rates Source.
9. Store Debt Rating—refers to process of storing the resulting data from step 3.
10. Store Rates—refers to process of storing the reset rates that were retrieved directly from the Debt Rate Data Source.
11. Store Debts—refers to process of storing the list of debts that were retrieved directly from the Debt Rate Data Source.
12. Store Debt History—refers to process of storing the resulting data from step 7.
13. Store Organization Rating—refers to process of storing the resulting data from step 6.

Figure 5:
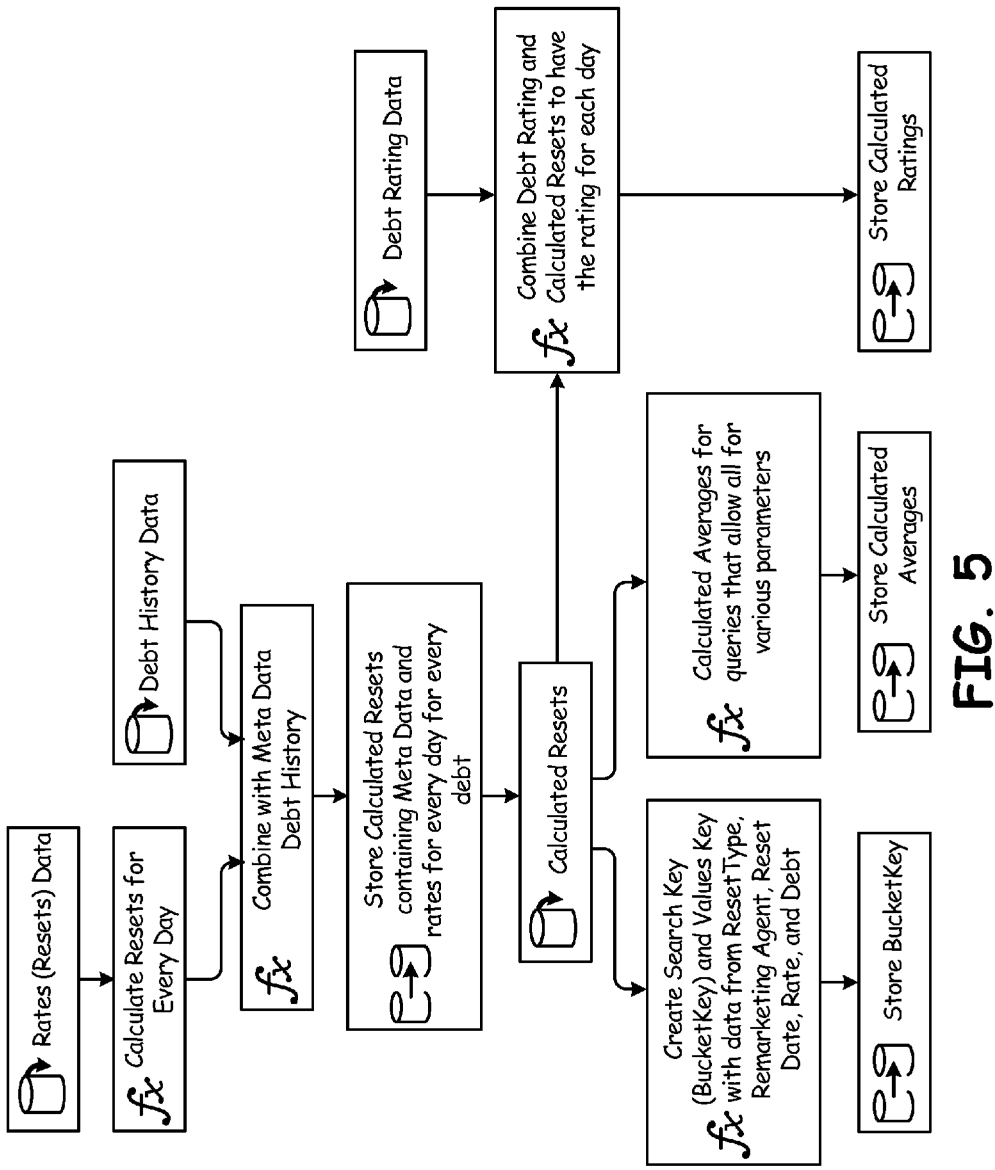
FIG. 5 is a flow diagram illustrating how the stored data in FIG. 4 is combined to create daily rates that have associated metadata including ratings and Bucketkeys.

FIG. 5—Data Flow of Generated Tables.

As described above, Debt rates are reset from time to time. FIG. 5 illustrates how rate resets are managed by the present system.

Rates or reset data is obtained from a rates data source. Commonly, the data source only provides resets for business dates. Therefore, the system generates reset values for the missing or non-business days where rate data is not available. (Missing information that can be extrapolated or supplied by the system includes, without limitation, debt resets, meta data values and rating data.) These are known as "calculated resets." This is necessary to determine the average rate over a period of time. This information is mathematically manipulated to calculate reset debt values for established periods of time, such as daily, weekly, monthly or annually.

For instance, if rates are reset weekly, the system would generate a daily rate to assist in determining daily averages. Similarly, the system may generate missing Debt Rating data. The Debt Rating data and Calculate Resets are then combined to create a rating for each day, which information is then stored in a Calculated Ratings Database for later use.

The Calculated Resets can be used to create a searchable key or "BucketKey" and Values key with data from Reset Type, Remarketing Agent, Reset Date, Rate and Debt. These keys are then stored and can be used to daily search a desired combination of remarketing agent and reset types to locate debts that match these queried criteria, which is one type of pattern that can be located by the system. (Other search criteria can be used to identify other comparables and "patterns" between securities.) This information will identify how a security or portfolio of securities is being treated by a remarketing agent by identifying comparably treated securities or portfolios. Thus, the search might disclose, for instance, that the security or portfolio in question is grouped with securities that are clearly distinguishable from the specified security, and therefore the specified security should be reclassified and receive a better rating.

Additionally, some queries which are believed to be in demand or commonplace can also be pre-programmed into the system so the information is always immediately available. For instance, the Calculated Resets can be used to generate a "Calculate Averages" search results for a number of queries based on various parameters, which information may be stored in a Calculated Averages database.

Reference Blocks

1. Rates (Resets) Data—refers to retrieving the list of resets and reset dates for each debt for each day the debt has a reset.
2. Calculate Resets For Every Day—refers to the process that fills in reset rates between two reset dates resulting in each debt having an appropriate reset every day.
3. Debt History Data—refers to list of metadata associated with each debt on any given day.
4. Combine with Meta Data Debt History—refers to the process of associating every calculated reset to a debt history for the purpose of determining the values of the metadata for that date. This allows for collecting aggregate data based off of resets and metadata.
5. Store Calculated Resets containing Meta Data and rates for every day for every debt—refers to the process of storing the connections of calculated daily reset values and the associated metadata for that date.
6. Calculated Resets—refers to retrieving the data collected and stored in step 5 above.
7. Debt Rating Data—refers to retrieving the data collected that contains the history of ratings for a debt over time.
8. Combine Debt Ratings and Calculated Resets to have the rating for each day-refers to process of associating the daily resets dates to the historical ratings and establishing what the ratings are for every day.

9. Create Search Key (BucketKey) and Values Key with data from ResetType, Remarketing Agent, Reset Date, Rate, and Debt—refers to the process of combining multiple columns of data into a single key that can be used to distinguish that a set of debts all had the same reset type, remarketing agent, and rate on a particular date. This data is aggregated in the Bucket List report to determine what percentage of the debts are greater than a set Matching Percentage to a particular debt.
10. Calculate Averages for queries that allow all for various parameters—refers to the process of pre-aggregating data on various sets of metadata. This metadata includes but is not limited to aggregating on Reset Type, tax status, amortization status, sector, and state.
11. Store BucketKey—refers to storing the bucket and value keys in a database that were created in step 9.
12. Store Calculated Averages—refers to storing the calculated averages from step 10.
13. Store Calculated Ratings—refers to storing the calculated ratings from step 8

Figure 6:
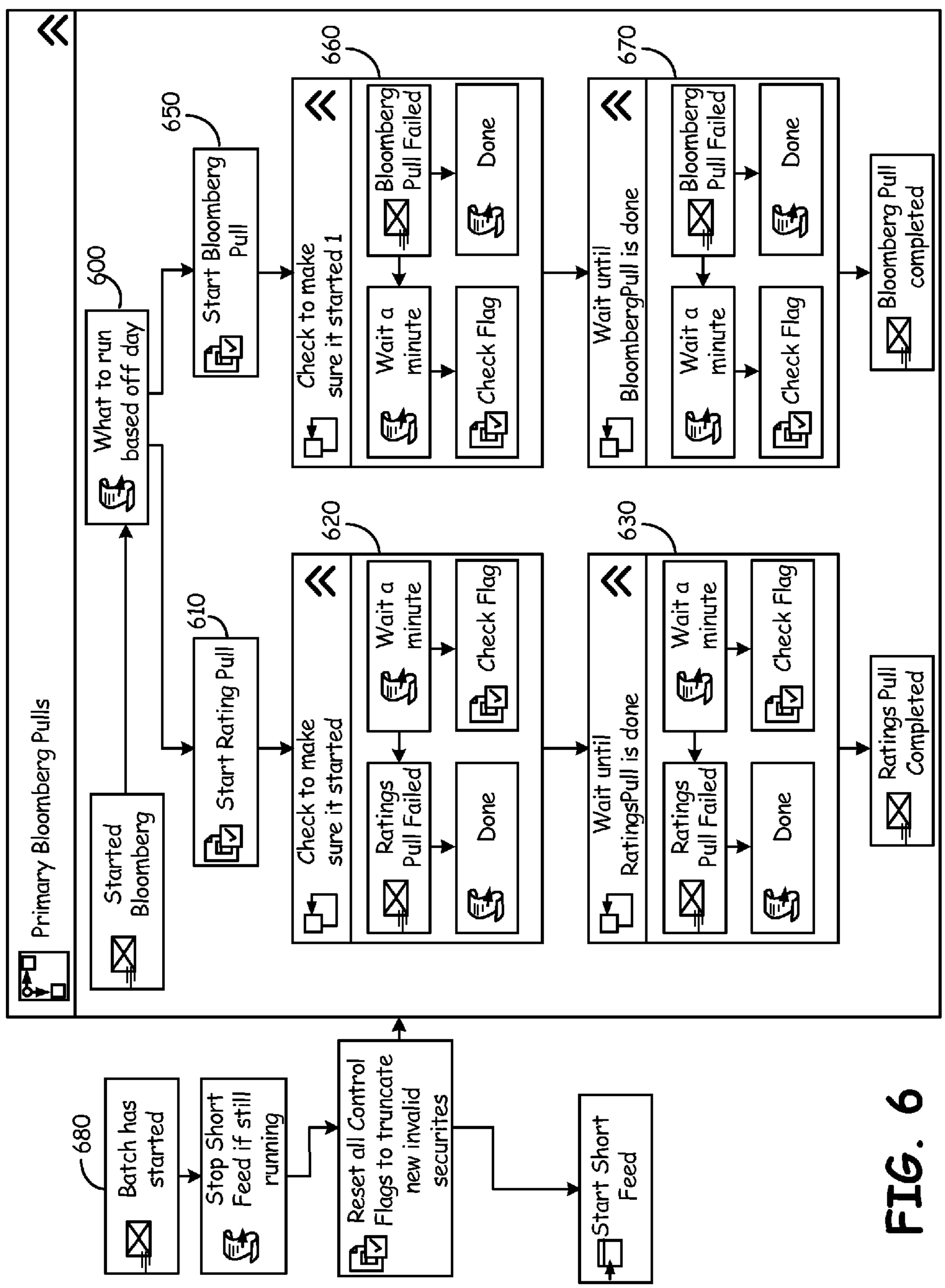
FIG. 6 is a flow diagram illustrating the process of retrieving data from data service providers.

FIG. 6 Get Transaction Files from Bloomberg; Step 1 BatchStartupandBloomberg FIG. 6 discloses an exemplary data feed from a web accessible Bloomberg database. Since the Bloomberg database contains both ratings data as well as meta data, the system can be set up to selectively or alternately obtain rating and meta data from the Bloomberg website. This is a matter of programming as shown at 600.

If rating information is to be obtained, rating information is commenced as shown as 610. The system includes a failsafe arrangement for confirming that the data transfer has started, as shown at 620, and that the data transfer continues until completion, as shown at 630. Similarly, the meta data system is commenced as shown at 650 and again a failsafe system, shown at 660 exists to confirm the data stream has started and continues to run, as shown at 670 to confirm that the meta data system continues until completion. This arrangement is restarted for every batch run, as shown at 680.

Reference Blocks

1. Start Short Feed—an application which calls the Emma short Feed Subscription Service.
2. What to run based on day—On an alternating daily basis, the system can either pull Ratings or Metadata for Securities by Cusip.
3. Check for Process Started—Wait a minute and check for process Started Flag. If Flag is not set in a timely fashion, send email about failure.
4. Wait until process is done—Waits until the Process Done flag has been set. If the process does not complete in a timely fashion, send email about failure.
5. Send Completed Email—Send Email on Process Completion.

Figure 7:
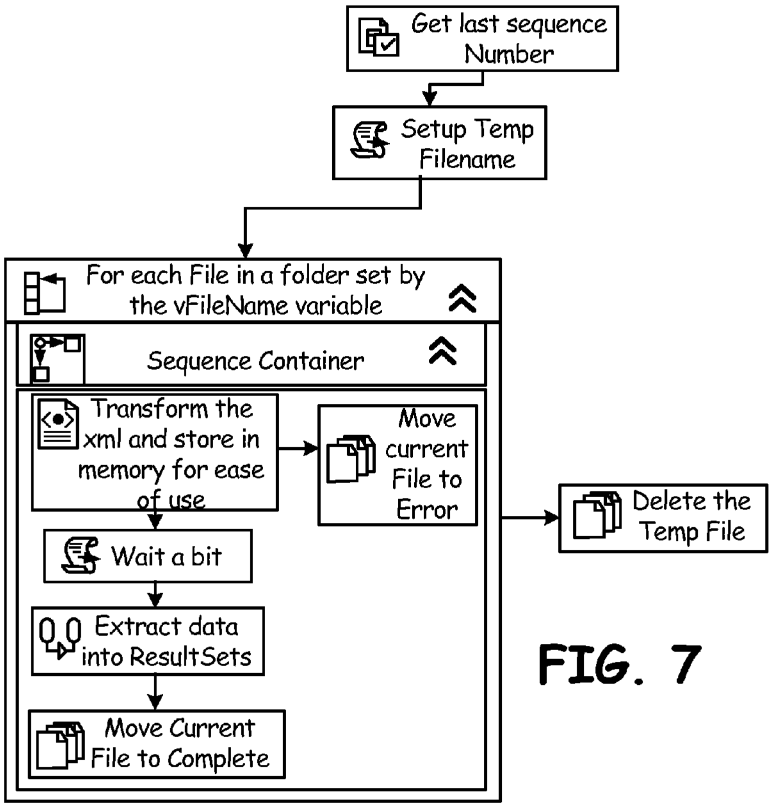
FIG. 7 is a flow diagram illustrating the method of pulling transactions into a Staging database.

FIG. 7 Pull Transactions into Staging Database Called SHORT.DATA: Step 2

Each time an edit or modification is made to a debt record, a record is maintained of the changes. Each such modification is given a sequence number. These and supplementations are identified so that the entire history of a particular trade or debt or other tracked element can be analyzed. FIG. 7 discloses how this information is pulled into a staging database.

The steps for pulling transactions into a staging database called short.data include obtaining the last Sequence Number processed from the Database, determining the name of the temporary file to process, processing all transaction files in the folder, transforming XML data into a useable format.

The last sequence number of a series of transactions having a common factor or element is used to set up a temporary file name for each file in a folder set. The data may be provided in an XML format and is transformed and stored in memory for ease of use. Data is extracted and placed into ResultSets and moved to a more permanent location in the system. The temporary file is then deleted.

The last sequence number processed from the database is obtained and used to determine the name of a temporary file to process. All transaction files in the folder are processed and the data is transformed into XML usable format.

Figure 8:
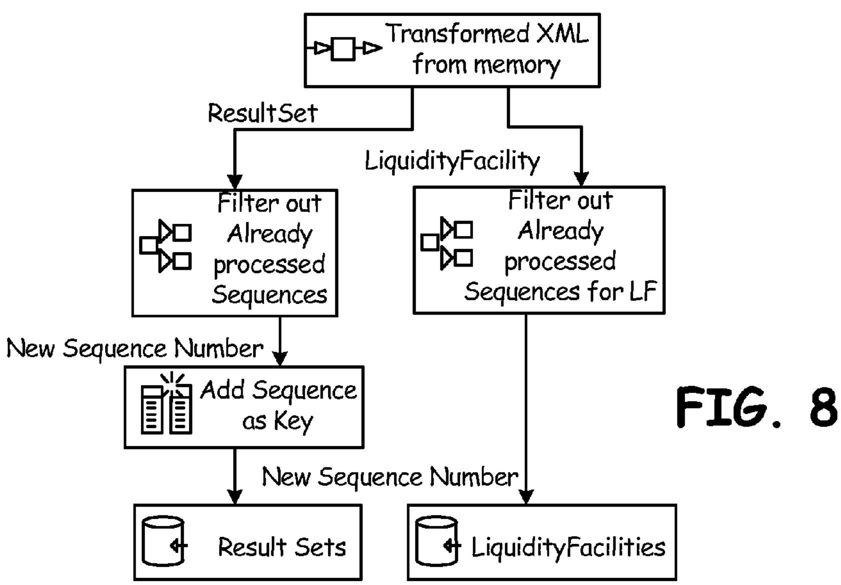
FIG. 8 is a flow diagram illustrating the method of pulling transactions into a Staging database to create a ResultSets and LiquidityFacilities table.

FIG. 8 Get Transaction Files from Bloomberg

Referring to FIG. 8, XML data is transformed from memory and is filtered to eliminate already processed sequences. A new sequence number is assigned to the filtered results and results are placed in a ResultSet database. Alternatively, the XML data can be filtered to eliminate already processed liquidity facilities, assigning a new sequence number to the processed liquidity and storing the data in a liquidity facilities database. The result is data split into two parallel streams, one for debt results and one for liquidity facilities. In other words, the data is extracted into ResultSets, the ResultSets data is split into two parallel streams, one for Debt Results, one for Liquidity Facilities, already processed Sequences are filtered out, and the results are stored in an appropriate Table. Finally, the file is moved to a Completed folder.

Figure 9:
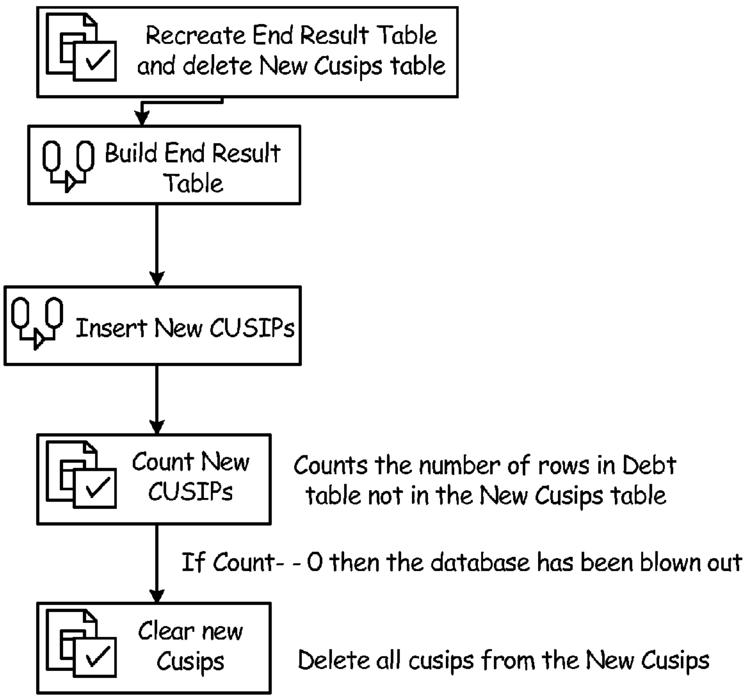
FIG. 9 is a flow diagram illustrating the method of obtaining new CUSIPS and new Ratings from a database, in this case, Bloomberg archives.

FIG. 9 Build Current State of End Results for all Historical Transactions: Step 3

FIG. 9 is a flow diagram for building an End Result Table. Each day, a batch is run to acquire relevant debt or security information. The process includes creating a copy of an End Result Table as it existed prior to the start of the daily batch and naming it End Result Table Old. An empty End Result Table is then created into which is inserted the new CUSIP Table data. A comparison can then be made with the count of the number of rows in the Debt Table to the new CUSIP Table. If the count is the same, the database has been updated. It is also possible to delete all CUSIPs from the new CUSIP Table when desired.

Figure 10:
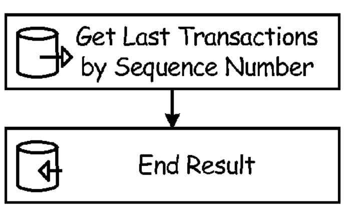
FIG. 10 is a flow diagram illustrating a method of building the current state of End Results given newly acquired transaction information.

FIG. 10 Build End Result Table

FIG. 10 illustrates a Build End Result Table. A query retrieves the Last Transactions by Sequence Number which are saved in a database called End Results.

FIG. 11

Figure 11:
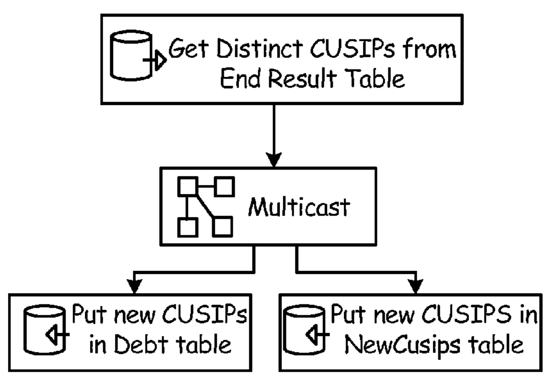
FIG. 11 is a flow diagram illustrating a method of storing new CUSIPS into the system.

FIG. 11 discloses obtaining a distinct list of CUSIPs which are new to the system from the End Result Table. This is accomplished by inserting new CUSIPs into both the Debt Table and the New CUSIP Table via Multi-task.

Figure 12:
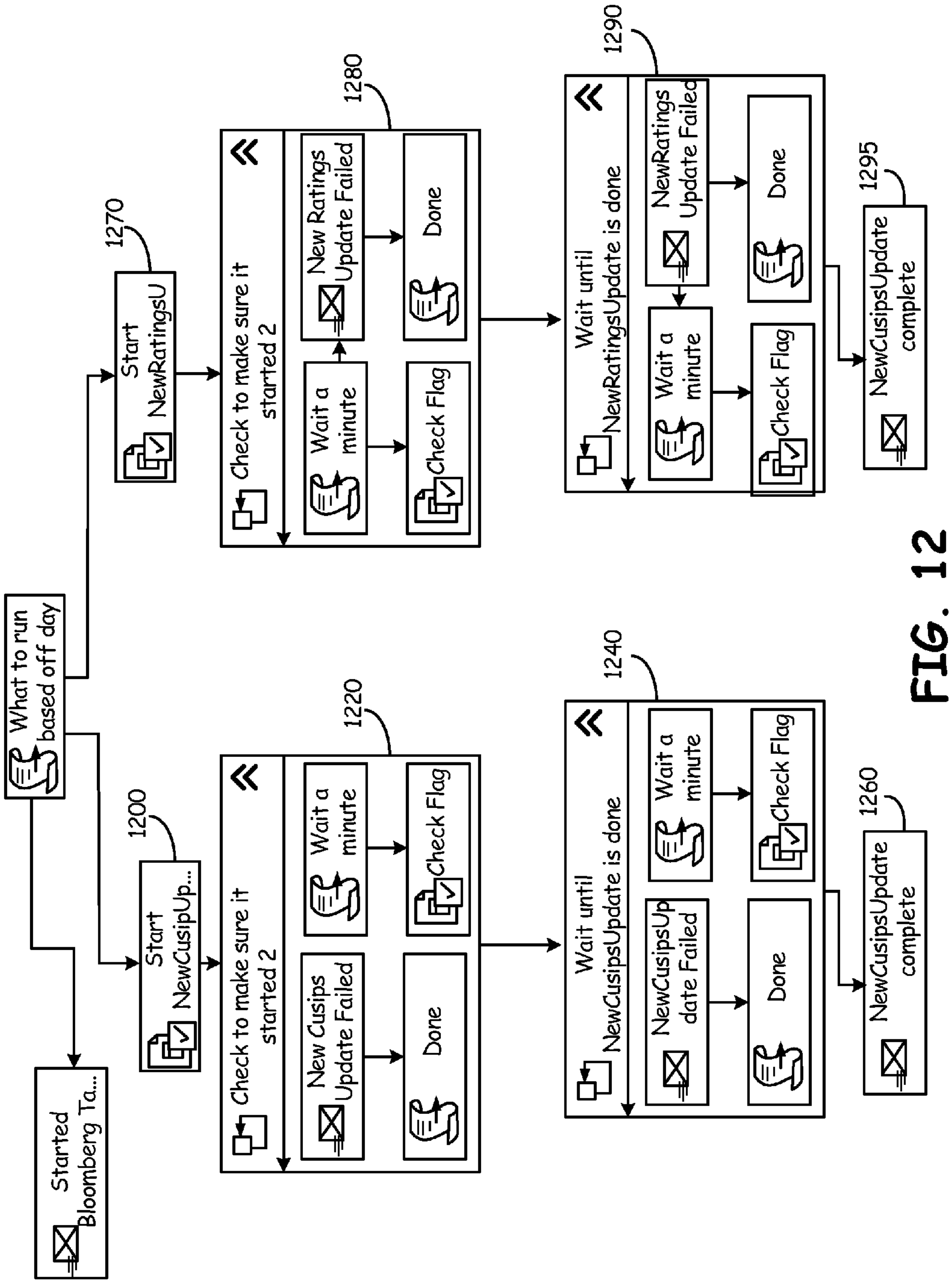
FIG. 12 is a flow diagram illustrating a method of retrieving Meta Data and Ratings for the new CUSIPS found in FIG. 11.

FIG. 12 Get New CUSIPS and New Ratings Pull From Bloomberg: Step 4

FIG. 12 illustrates the process for obtaining new CUSIPs and new ratings from the Bloomberg database, using Bloomberg as an example. Bloomberg provides both data sets and the system programming will dictate what and when each query will run. For instance, the system can be programmed to update new CUSIPs or new ratings on alternating days or throughout the day.

For meta data information, the new CUSIP inquiry is initiated at 1200. A self-monitoring system 1220 confirms that the data query has commenced, or if it has failed, the system re-initiates the start after a designated delay (one minute as shown in FIG. 12). The system also continues to monitor transfer of data as shown as 1240 which includes the same self-monitoring system, until the new CUSIP's update is completed as shown at 1260.

The new ratings batch run is conducted in a similar fashion. A query is initiated at 1270, the system confirms that the data feed has been initiated as shown at 1280 and continues to completion as shown at 1290 and 1295.

Initiation of both of these processes is typically signaled by an e-mail notification. Once each process has started, a process Started Flag should appear to confirm the process start. If the process is not timely started, an e-mail notification will be sent identifying the failure. In a similar fashion, if the process does not complete in a timely fashion, an e-mail notification is sent regarding the same. Upon completion of the process, a processed completion e-mail notification is sent to the system operator.

Reference Blocks

1. Send email notification at start of task
2. What to run based on day—On an alternating daily basis, the system either updates new CUSIPs or new Ratings.
3. Check for Process Started—Wait a minute and check for process Started Flag. If Flag is not set in a timely fashion, send email about failure.
4. Wait until process is done—Waits until the Process Done flag has been set. If the process does not complete in a timely fashion, send email about failure.
5. Send Completed Email—Send Email on Process Completion.

Figure 13:
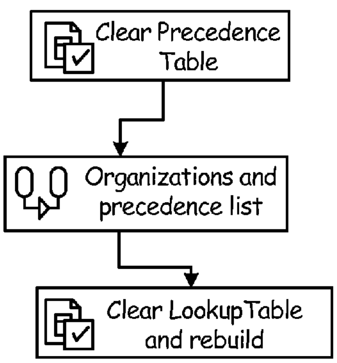
FIG. 13 is a flow diagram illustrating a method of determining precedence of credit providers when more than one provider is associated with a debt.

FIG. 13 Create the Full List of Liquidity Providers: Step 5

FIG. 13 discloses creation of a full list of Liquidity Providers. The sets include emptying the Precedence Table, creating a new organizations and a precedence list, clearing the lookup table and rebuilding the same.

Reference Blocks

Figure 14:
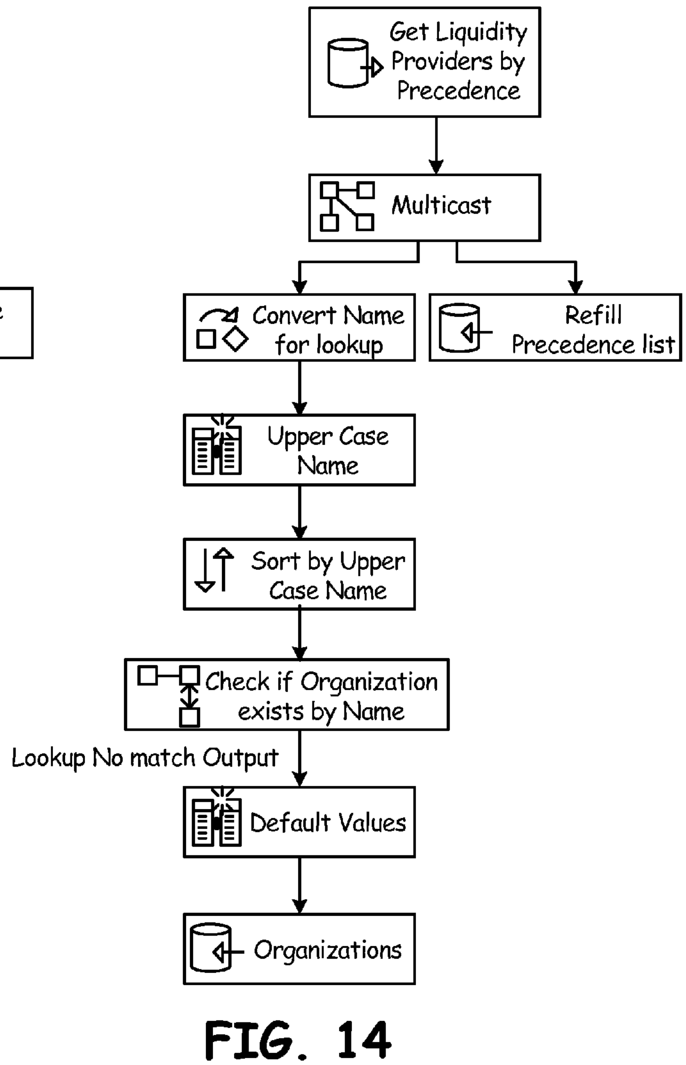
FIG. 14 is a flow diagram illustrating a method of updating organization information and updating the precedence list with any changes.

1. Empty the Precedence Table
2. Organizations and precedence list
   a. Referring to FIG. 14, gather a list of all Liquidity Providers ordered by Precedence using the sum total of all ParAmount values as the definition of Precedence.
   b. Duplicate the data stream
   c. Write the results directly into the Precedence list Table
   d. Do conversions necessary to lookup Liquidity Providers from the Organizations Table
   e. Lookup Organization Record by Liquidity Provider Name
   f. If no Match, fill in defaults for remaining values
   g. Insert new Liquidity Providers into the Organizations Table
3. Rebuild Liquidity Provider Lookup Table

FIG. 14

The system can create a list of all of Liquidity Providers in order by precedence using the sum total of ParAmount values as the definition of Precedence. This data is then duplicated and the results are written directly into a Precedence List Table. Necessary conversions are made to look up Liquidity Providers from an Organizations Table. Liquidity Providers can be searched by Liquidity Provider name. If there is no match, other system values will be populated by default information. If a Liquidity Provider is identified, the name of the Liquidity Provider is posted in the Organizations Table and the Liquidity Provider Lookup Table is rebuilt. The new organizations are inserted into the Organization Database and the debt information is updated from the Bloomberg archive.

Figure 15:
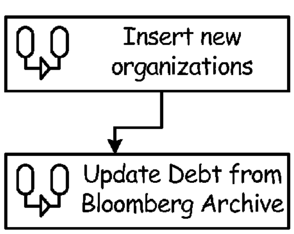
FIG. 15 is a flow diagram illustrating a method of updating organization information and updating debt information.

FIG. 15 Insert New Organizations and Update Debts: Step 6

FIG. 15 discloses inserting new organizations.

Figure 16:
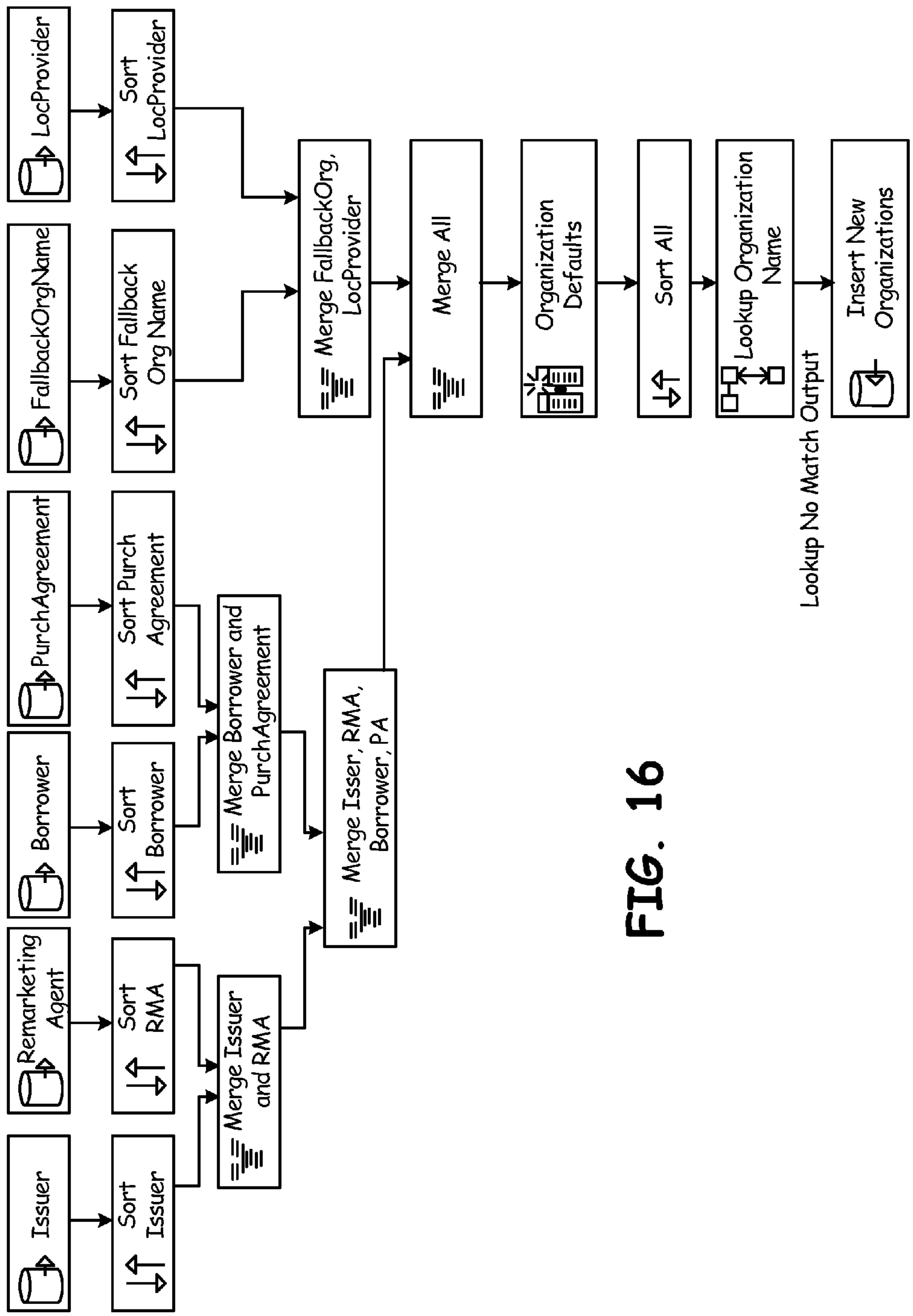
FIG. 16 is a flow diagram illustrating a method of adding new organizations to the system as the details of Insert new organizations in FIG. 15.
Figure 17:
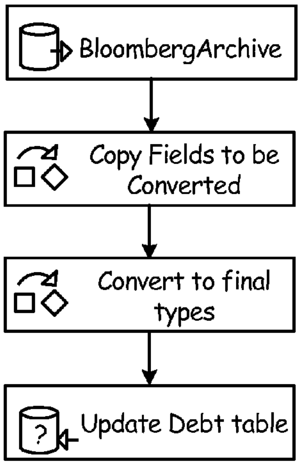
FIG. 17 is a flow diagram illustrating a method of updating the Debt table.

1. Referring to FIG. 16, merging multiple Data sources into one source, including:
   a. Issuer
   b. Remarketing agent
   c. Borrower
   d. Purchase Agreement
   e. fallback Organization
   f. LocProvider
   g. Sort all Data Sources
   h. Merge All Data Sources
   i. Add Organization record Defaults
   j. Sort all Merged records
   k. Lookup by Name form the Organization Table
   l. Insert newly found Organizations
2. Referring to FIG. 17, update Debt from Bloomberg Archive
   a. Retrieve the latest set of records from the Bloomberg Archive
   b. Copy and Convert Data Types to match the Debt table format
   c. Update matching records in the Debt table

FIG. 16

FIG. 16 is a flow diagram showing how various information required by the system is organized. In the top row of the flow diagram, various parties involved with a transaction are identified, including issuer, remarketing agent, borrower, purchase agreement identifier, fallback organization identifier and LOC provider. These multiple data sources are, through this process, merged into one data source.

The process flow is as follows: The data sources are first sorted, grouped and merged. Organization record defaults are then added and the data is resorted. The user is then able to look up an organization by name from the Organization Table created through the sort mechanism. Newly found organizations are inserted into the Table.

FIG. 17 Update Debt from Bloomberg Archive

FIG. 17 discloses the process by which debt information is updated from the Bloomberg archive. The latest set of records from the Bloomberg archive are retrieved, the records are copied and the data types are converted to match the Debt Table format and updated matching records are placed in the Debt Table.

Figure 18:
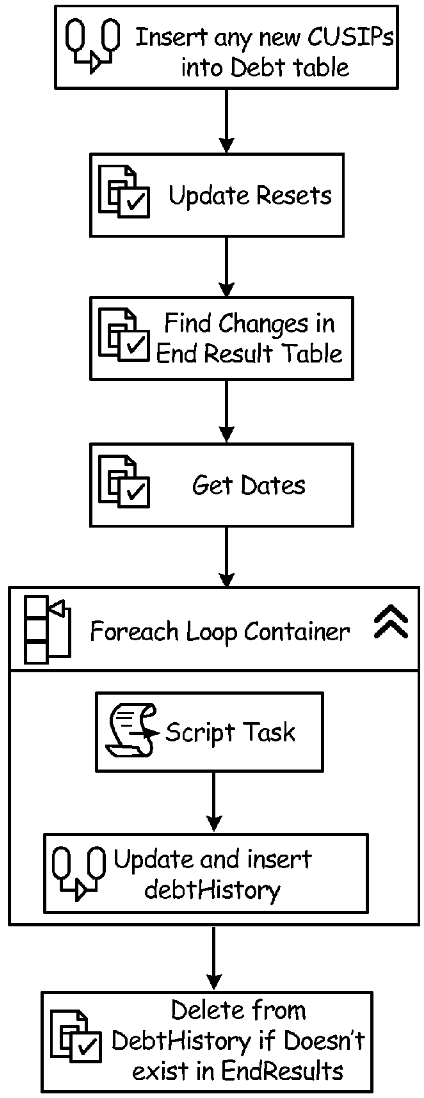
FIG. 18 is a flow diagram illustrating a method of adding the current days data into the Reset Table and Debt History Table.

FIG. 18 Build the DebtHistory Step 7

The debt history is constructed as shown in FIG. 18. New CUSIPs are inserted into the Debt Table. An Execute Update Resets program is initiated, which is a stored procedure for inserting new resets and updating existing resets as needed from recent data acquisitions. Differences from the previous set of End Results Table to the current set of data are determined and are stored as a change set in a Change Table. A query is then initiated for all unique dates found in the Change Table. These queries loop through the dates in the table one at a time by running a script to generate a query to find the necessary records needed to update or insert into the DebtHistory Table. The system then performs an update and inserts an insert on the DebtHistory Table as necessary to accommodate all possible change sets of recently acquired data. Records are then deleted from the DebtHistory where recent data acquisition results a rollback to a previous state of information. Records are deleted from the DebtHistory if the records do not exist in the End Results Table.

Reference Blocks

1. Insert new CUSIPs into Debt Table
2. Execute Update Resets—Stored Procedure to Insert new Resets and Update existing Resets as needed from recent data acquisition.
3. Find all differences from previous set of End Results Table to Current set and store as a Change set in the Change Table 4. Query for all unique Dates found in the Change Table
5. Loop through the Dates one at a time
   a. Run script to generate a query to find the necessary records needed to update or insert into the DebtHistory Table.
   b. Perform Update and Insert on DebtHistory Table as necessary to accommodate all possible change sets of recently acquired data.
6. Delete records from DebtHistory where recent Data Acquisition results in a roll back to a previous state.

Figure 19:
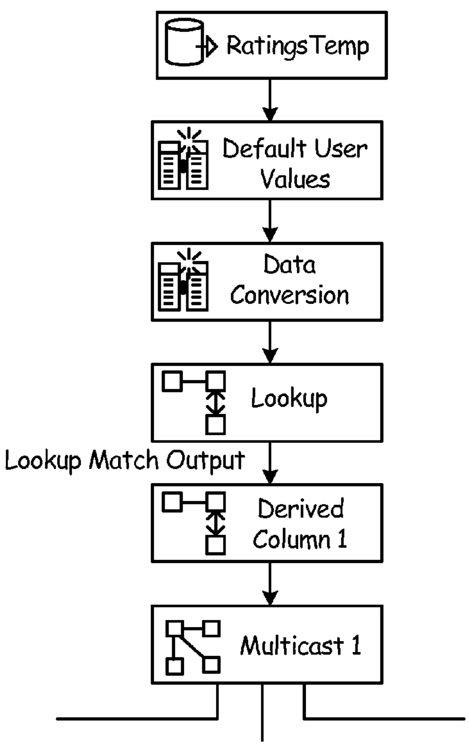
FIG. 19 is a flow diagram illustrating a method of building Debt Ratings.

FIG. 19 Build DebtRatings: Step 8

FIG. 19 discloses the process for building debt ratings. The system initiates a query for new ratings and adds default user values to the rating information. All of the data types are then converted as necessary to perform searches for debts involved in the new ratings. Empty values are replaced with default values. This information is then multicast into three streams, one per rating agency (Moody is shown, although Standard & Poors and Fitch can also be utilized).

Reference Blocks

1. Query for New Ratings
2. Add Default Values
3. Convert Data Types necessary to perform lookups
4. Lookup Debts involved in New Ratings
5. Replace Empty values with defaults.
6. Multicast Data into 3 streams, one per Rating Agency (Examples: Moody, Standard & Poors, and Fitch)

FIG. 20

Figure 20:
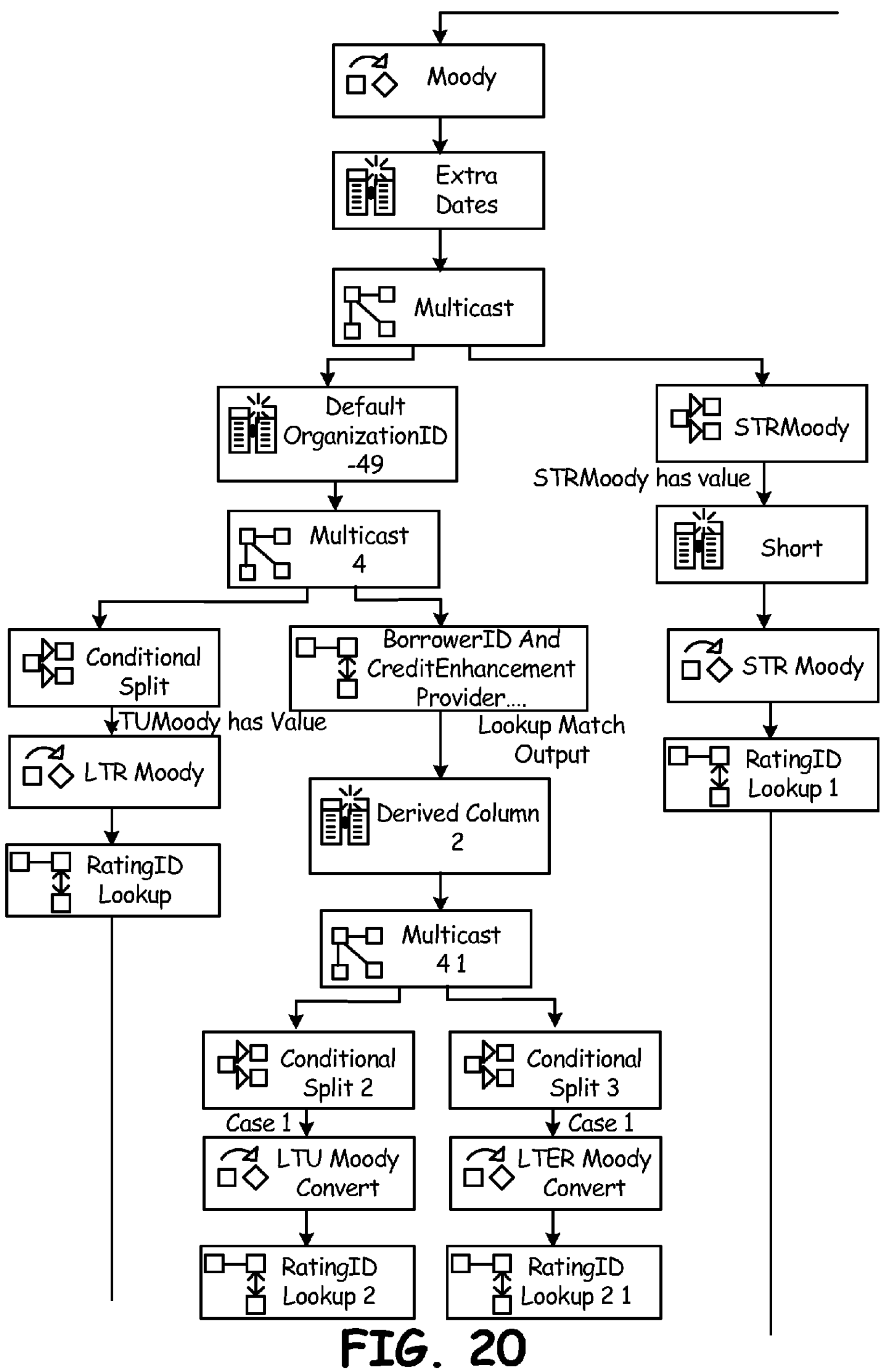
FIG. 20 is a flow diagram illustrating the continuation of building the Debt Ratings from FIG. 19.
Figure 21:
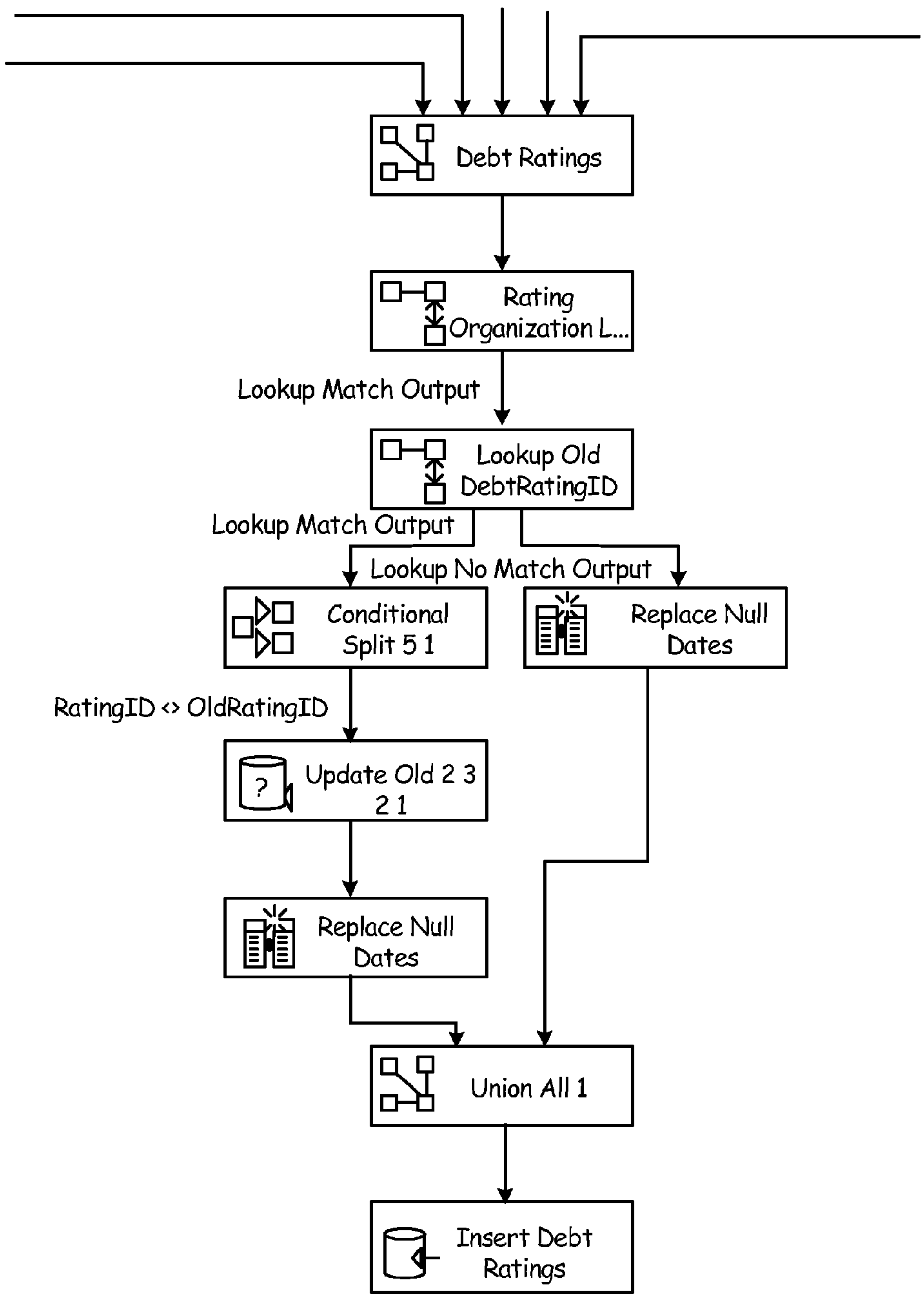
FIG. 21 is a flow diagram illustrating the continuation of building the Debt Ratings from FIG. 20 and inserting the final results.

FIG. 20 picks up where FIG. 19 left off and constitutes the Moody stream. The following actions are performed on the Moody stream, as well as the other two streams from the bottom of FIG. 19:

a. Find the date of rating for the appropriate rating agency;
b. Fill in default values for other system dates;
c. Multi-task the streams to handle LTR, STR, LTU and LTER as separate streams;
d. In each stream, assign default values to the organization represented by that rating agency/stream combination;
e. Check to make sure value exists for the data point represented by the individual streams. Processing is only allowed to continue when the appropriate data points exist;
f. Look up rating i.d. represented by the current rating stream.

FIG. 21

The following additional actions are performed:

a. All of the streams are merged into one stream;
b. The organization i.d. is identified from the Rating Table based on the rating i.d.;
c. Look up the RatingID of any previous rating for existing debts that are participating in new ratings;
   i. If no match is found, this is a new record and the information should be filled in defaults for a system date values.
d. If a new RatingID is different from an OldRatingID, update the existing record to reflect the appropriate end date on that Debt Rating Record.
e. Defaults are then filled in for system date values.
f. The Match values and No Match values from c. are united.
g. All results are then inserted into the Debt Ratings Report.

Figure 22:
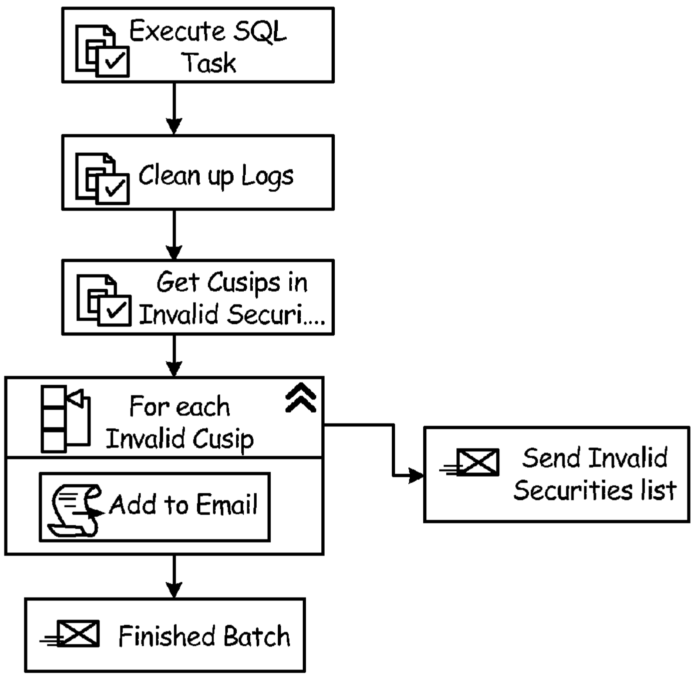
FIG. 22 is a flow diagram illustrating the alert process that sends an email when invalid debts have been found.

FIG. 22 Cleanup and Finish Bloomberg Batch: Step 9

FIG. 22 discloses cleanup and finishing the Bloomberg batch. An SQL task is executed to find cases where the newly created Debt History Record exactly matches the immediately preceding one for all meta data. The previous record is then deleted so that the new record becomes the current record of interest. Log records are then deleted such that there is always a roaming record of the last designated number of data pulls. Invalid securities are then located in proration of sending an alert e-mail that identifies the invalid security with appropriate identifying information. The invalid securities list e-mail may be forwarded as needed. When the batch is finished, an e-mail alert regarding the same is sent.

Reference Blocks

1. Execute SQL Task to find cases where the newly created DebtHistory record exactly matches the immediately preceding one for all MetaData and Delete the previous record so that the new record becomes the record of interest.
2. Delete Log records such that there is always a rolling record of the last 50 Data Pulls.
3. Find Invalid Securities in preparation of sending alert email.
4. For each Invalid Security add to a formatted email with the necessary information about the invalid security.
5. As Needed send Invalid Securities List email
6. Send Finished Batch email.

Figure 23:
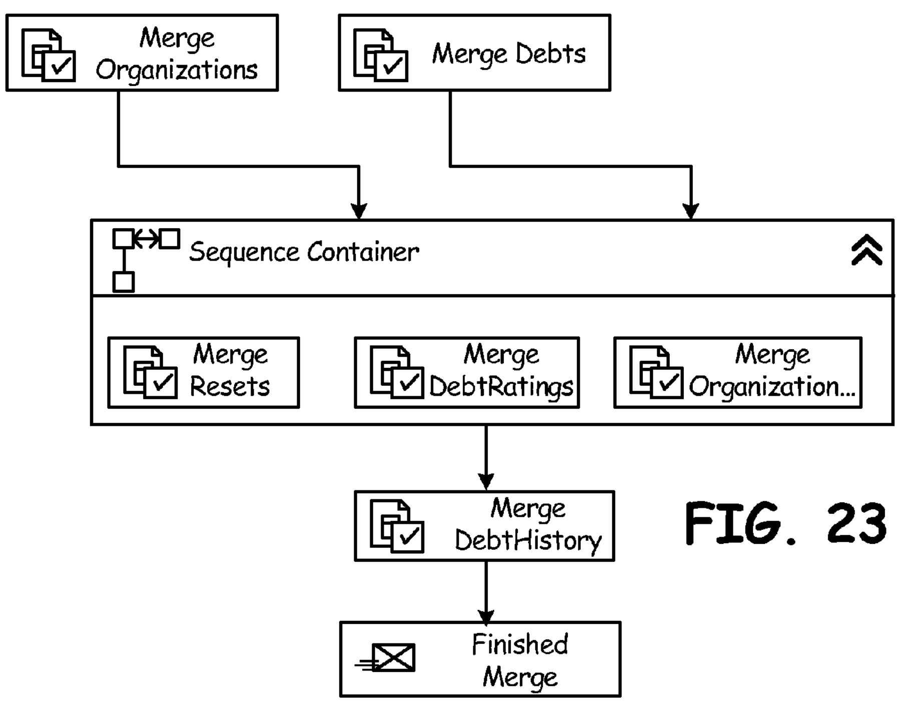
FIG. 23 is a flow diagram illustrating Bucketkey the process of merging the data from the staging database to the production database.

FIG. 23 Merge Staging to Production: Step 10

The steps involved include

1. Merging organizations into a Sequence Container
2. Merging Debts into a Sequence Container.
   a. Merge Resets;
   b. Merge DebtRatings;
   c. Merge OrganizationRatings;
   d. Merge DebtHistory;
   e. Send "Finished with Merge" e-mail.

Figure 24:
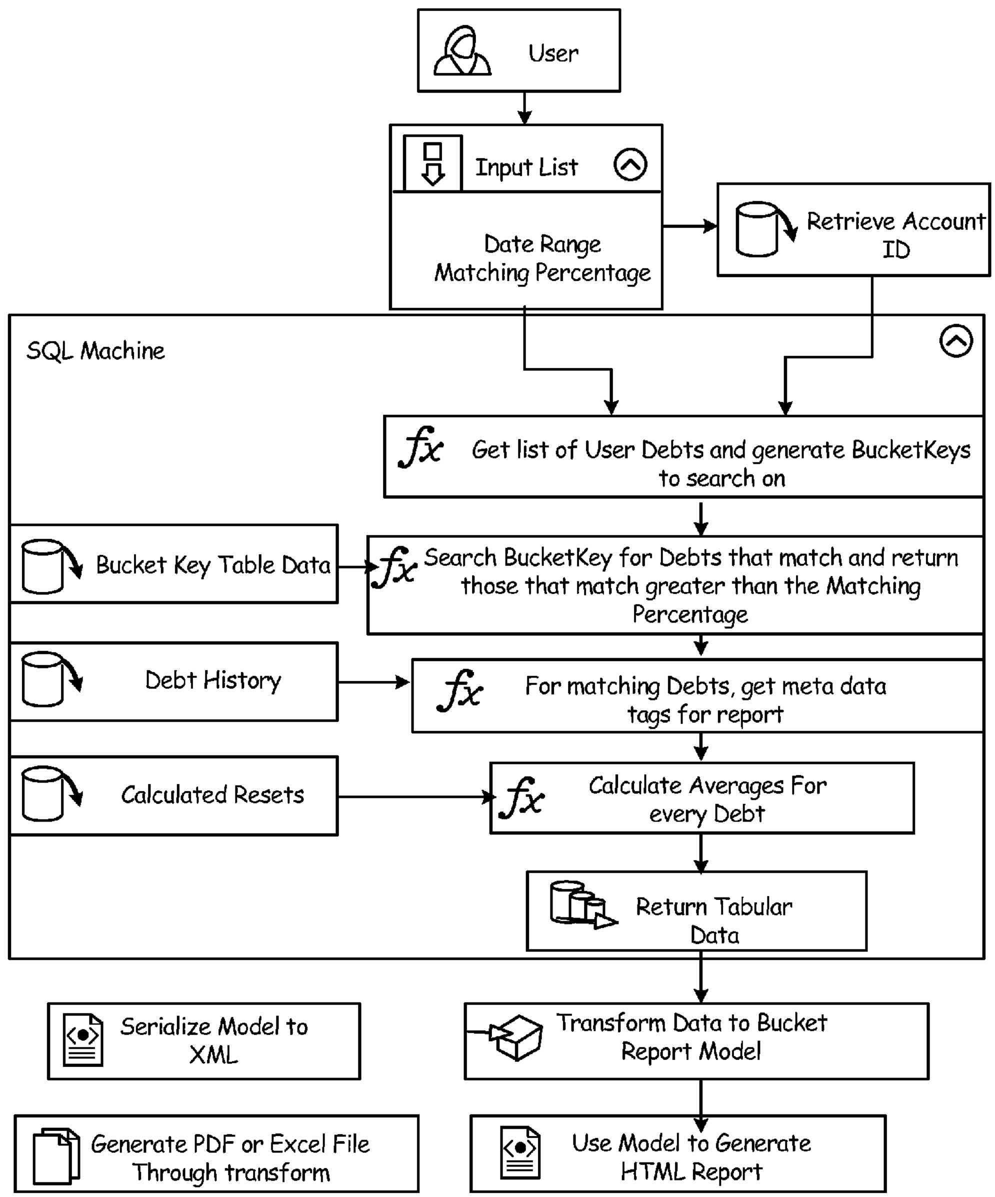
FIG. 24 is a flow diagram illustrating a method of generating reports in general.

FIG. 24 Bucket List Report Generation

FIG. 24 is the Bucketkey Report. The Bucketkey Report is designed to locate debt or securities that meet a particular queried criteria. A User logs into the system and is provided with a User input list of debts or securities. The User's AccountID is used to retrieve and generate a list of user debts and "BucketKeys" for search purposes. The BucketKey Data Table is used to find debts that match specified criteria for date ranges and matching percentages. For matching debts, meta data tags are obtained for creation of a report. A database of calculated resets may also be tapped to determine averages for every debt. Tabular data is provided which is transformed into a Bucket Report model that can be used to generate reports in HTML PDF or Excel file formats.

Reference Blocks

1. User—refers to any user on the system.
2. Input List—refers to the user input required to process the report. This includes the date range of the report and the Matching Percentage. The Matching Percentage refers to the minimum percentage of matching rates over the date range. For example if there are a 100 days in the period and the matching percentage was 80% then a debt would have to match on 80 or more of the 100 days.
3. Retrieve Account ID—refers to the process that retrieves the Account ID based on the users login credentials.
4. SQL Machine—refers to the machine that processes the user input and outputs tabular data results.
   a. Get list of User Debts and generate BucketKeys to search on—retrieves the list of debts associated to the Account ID that was passed in and the associated metadata to generate a search key.
   b. Bucketkey Table Data—refers to table containing the pre-calculated list of Bucketkeys that a search can be performed against.
   c. Search BucketKey for Debts that match and return those that match greater than the Matching Percentage—refers to the process that searches for all debts that match the account's debt's search key. It returns only those debts that match on a percentage greater than the matching percentage passed in.

d. Debt History—refers to table that contains the history of metadata for each debt.

e. For Matching Debts, get meta data tags for report—refers to process of retrieving the metadata for the debts that had greater than the matching percentage for that period of time.

f. Calculated Resets—refers to table that contains the reset values for every day.

g. Calculate Averages For every Debt—refers to the process that calculates the average rate for every matching debt over the date range h. Return Tabular Data—refers to the process that combines the outputs of a-g into a tabular data output.

5. Transform Data to Bucket Report Model—refers to the process of mapping table values to the Bucket List Report Model object. This stores the data in the memory of the website machine.

6. Serialize Model To XML—refers to the process where the Bucket List Report Model is serialized into a XML format which can be easily transferred.

7. Generate PDF or Excel File Through transform—refers to the processes that both receive the XML Serialized data and transform that data to either a PDF or Excel file.

8. Use Model to Generate HTML Report—refers to the process in which the Report Model is transformed into a HTML view.

Figure 25:
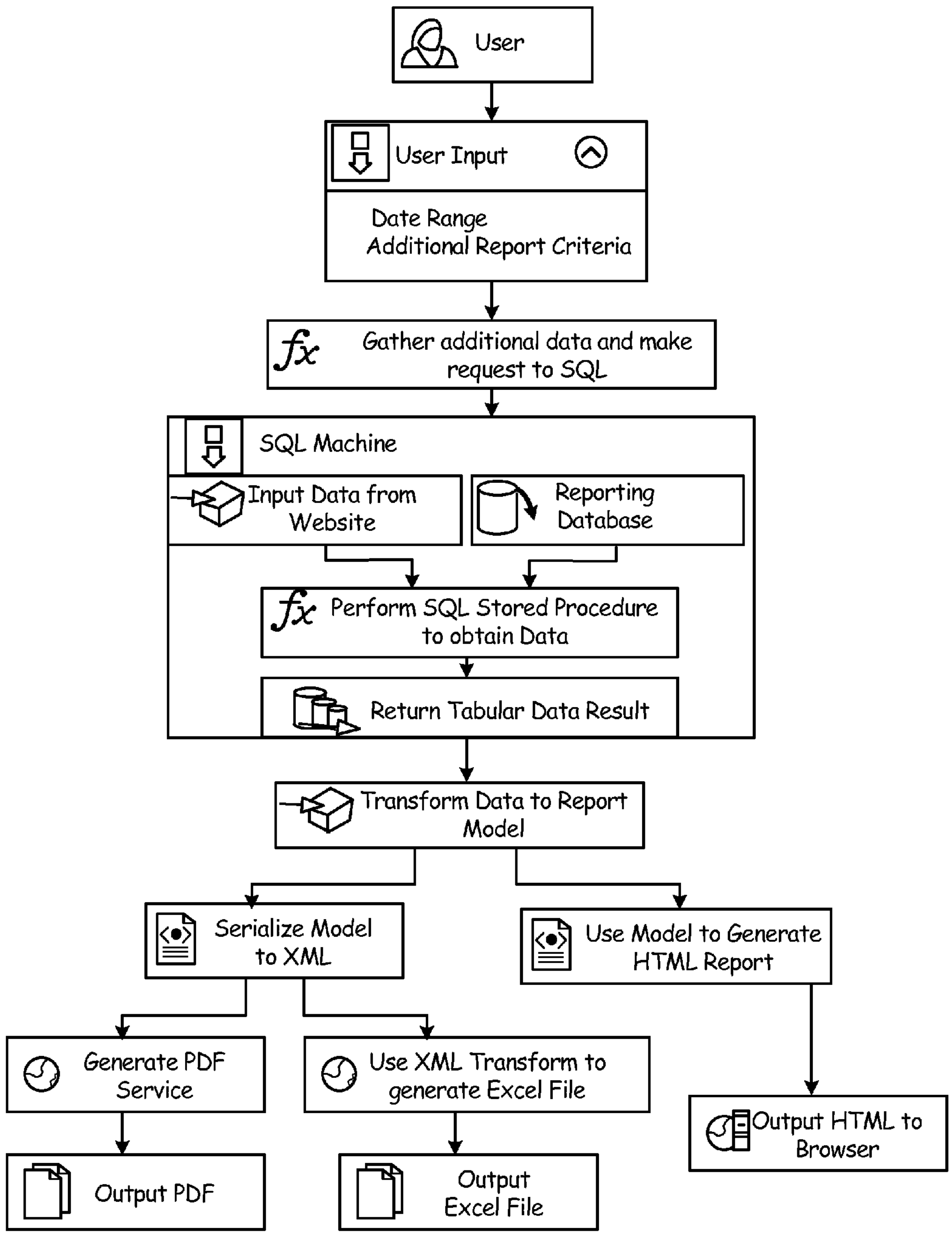
FIG. 25 is a flow diagram illustrating a method of generating reports.

FIG. 25 Report Generation

FIG. 25 identifies the general process used to create any report. A User logs into the system and specifies report criteria, such as a date range or other factors. The system gathers additional data as required to make a request to the SQL Database Machine. Data from the website and from a reporting database are processed in response to an SQL store procedure to obtain requested data which is returned in tabular form and transformed into a report model. Again, the Report can be published in HTML, Excel or PDF format.

Reference Blocks

1. User—refers to any user on the system.

2. Input List—refers to the user input required to process a report. This includes the date range of the report and any report criteria needed for the report.

3. Gather additional data and make request to SQL DB—refers to the process that retrieves additional data such as but not limited to the Account ID based on the users login credentials.

4. SQL Machine—refers to the machine that processes the user input and outputs tabular data results.

a. Input Data from Website—refers to the data that is sent into SQL Machine for each report query.

b. Reporting Database—refers database that contains all the tables and procedures necessary to generate any report.

c. Perform SQL Stored Procedure to obtain Data—refers to the process of executing a SQL stored procedure to generate the report data. Not all reports required a SQL stored procedure to generate the report.

d. Return Tabular Data—refers to the process that outputs the tabular data from a query or stored procedure.

5. Transform Data to Report Model—refers to the process of mapping table values to the Report Model object. This stores the data in the memory of the website machine.

6. Serialize Model To XML—refers to the process where the Report Model is serialized into a XML format which can be easily transferred.

7. Generate PDF Service—refers to the processes that receives the XML Serialized data and transform that data to a PDF file.

8. Output PDF—refers to the processes that transfers the completed PDF to the user's browser.

9. Use XML Transform to generate Excel file—refers to the processes that receives the XML Serialized data and used XML transformation to create a XML file.

10. Output Excel File—refers to the processes that transfers the completed Excel file to the user's browser.

11. Use Model to Generate HTML Report—refers to the process in which the Report Model is transformed into a HTML view.

12. Output HTML to Browser—refers to process that outputs the HTML view as a webpage to a Browser.

Figure 26:
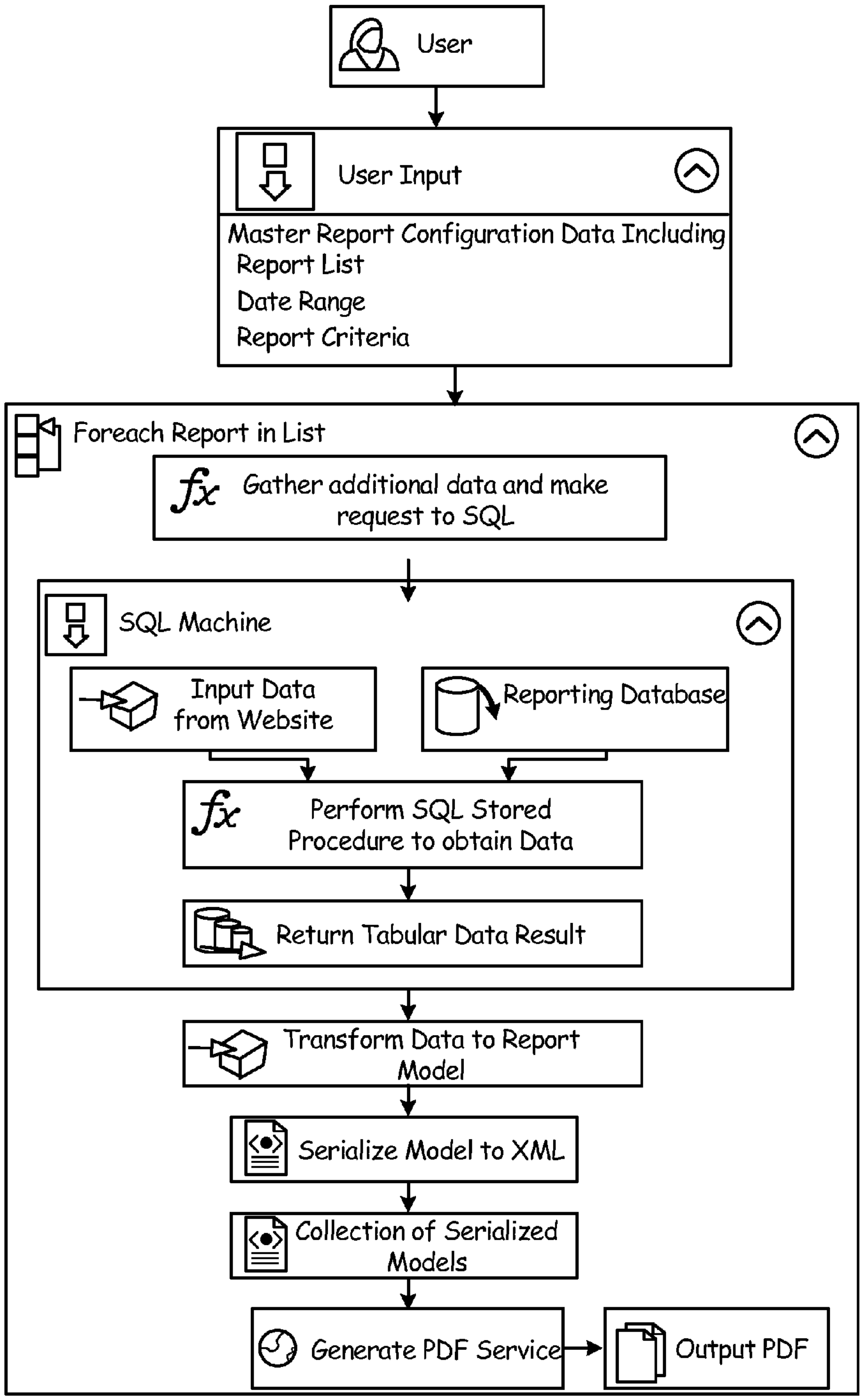
FIG. 26 is a flow diagram illustrating a method of generating a Master Report.

FIG. 26 Master Report Generation

FIG. 26 discloses the process of generating Master Report. A User logs into the system and specifies the Master Report Configuration that is used to define the report criteria for each report. For each report defined in the Mater Report Configuration: the system gathers additional data as required to make a request to the SQL Database Machine; data from the website and from a reporting database are processed in response to an SQL store procedure to obtain requested data which is returned in tabular form and transformed into a report model; and the report model is serialized and added to a collection of the serialized model for the Generate PDF Service. The Generate PDF Service takes the collection of serialized models and generates a single PDF report with a Title page, Disclosure page, Table of Contents, and each report.

Reference Blocks

1. User—refers to any user on the system.

2. User Input—refers to the user input required to process a master report. This includes the Master Report Configuration Data which specifies the report dates, report list, and various report criteria.

3. For each Report in List—refers the process that will loop through each report and process that report saving the serialized XML report result for each report.

a. Gather additional data and make request to SQL DB—refers to the process that retrieves additional data such as but not limited to the Account ID based on the users login credentials.

b. SQL Machine—refers to the machine that processes the user input and outputs tabular data results.

i. Input Data from Website—refers to the data that is sent into SQL Machine for each report query.

ii. Reporting Database—refers database that contains all the tables and procedures necessary to generate any report.

iii. Perform SQL Stored Procedure to obtain Data—refers to the process of executing a SQL stored procedure to generate the report data. Not all reports required a SQL stored procedure to generate the report.

iv. Return Tabular Data—refers to the process that outputs the tabular data from a query or stored procedure.

c. Transform Data to Report Model—refers to the process of mapping table values to the Report Model object. This stores the data in the memory of the website machine.

d. Serialize Model To XML—refers to the process where the Report Model is serialized into a XML format which can be easily transferred.

4. Collection of Serialized Models—refers to the output list of serialized models that were created during the for each report loop.

5. Generate PDF Service—refers to the processes that receives the XML Serialized data and transform that data to a PDF file. For the master report it will also generate a title page, a disclosure page, a Table of Contents, and dynamically set the X page of X based on the number of reports and how long each report is.

6. Output PDF—refers to the process that transfers the completed PDF to the user's browser.

In summary, the present invention can obtain and merge Meta Data and Rating data from various sources, organize the information into a searchable database and provide any securities participant with critical data regarding how a security, portfolio or market participant performs in the marketplace as compared to similarly situated securities, portfolios or market participants.

What is claimed is:

1. A method of identifying patterns in debt securities by debt security characteristics in response to search criteria, the method comprising the steps of:

a) providing at least one network accessible program server having a query engine, data storage and stored algorithms wherein in response to an initial input to the program server;

i) the program server initiates at least one query to locate select user selected debt security identifiers and rate data for at least two select debt securities from at least one networked security rate server;

ii) the program server initiates a query to at least one networked meta data servers to obtain meta data associated with the two select debt securities;

iii) the program server utilizes the stored algorithms to correlate the debt securities meta data with the debt securities identifiers and associated rates data to create a searchable database on the program server of debt securities characteristics that is searchable by debt securities characteristics;

iv) the program server queries the database of debt securities characteristics to search for at least one user selected debt security characteristic to identify debt securities having the at least one characteristics responsive to the query; and v) the program server generates at least one report identifying debt securities having similar patterns based on the at least one specified debt security characteristic.

2. The method of claim 1 wherein the user input is provided by a network accessible user computer in electronic communication with the program server.

3. The method of claim 1 wherein the meta data includes one or more of the following: security identifier; initial par value of security; security date; reset date; issuance type; reset type; maturity date; data feed; taxable status; remarketing agent; state province; business sector; debt sector; credit enhancement type; provider and end date; minimum and maximum rates, security issuer, borrower and security rating.

4. The method of claim 1 wherein the security identifiers and rate data includes one or more of the following: Sequence, Transaction Type, CUSIP, Instrument Type, Publish Date and Time, Dealer Name, Reset Date, Interest Rate Reset Date and Time, Interest Rate Period, Notification Period, Interest Rate Posting Date and Time, Interest Rate, Minimum Denomination, Rate Type, Par Amount, Minimum and Maximum Rate and Rate.

5. The method of claim 1 wherein entering security identifiers and rate data into a program server includes using the program server query engine to communicate over the internet with one or more security rate servers to obtain the identifiers and ratings for the at least two select securities and wherein the program server query engine communicates with one or more meta data servers over the internet.

6. The method of claim 1 wherein the initial input to the program server to locate select security identifiers and rate data further includes the step of converting security identifiers and rate data from various security rate servers and meta data from meta data servers into a common format.

7. The method of claim 1 further comprising the step of: generating one or more of the following reports: Client Summary; Client Percentile Summary; Client Portfolio; Client Portfolio Detail; Cost of Capital Summary; Cost of Capital by Issue Type (Daily, Weekly, Other); Stars List; General Market Statistics—General, States CEP and Remarketing Agent; Bucket List Reports; Comparison Reports including Client Query Summary, Query Percentile Scorecard, Marginal Percentile Savings and Query Average Rate Report; and a Hedge Report.

8. The method of claim 1 further comprising the step of creating and maintaining groupings of debt securities including or excluding specified characteristics.

9. The method of claim 1 further comprising the step of searching the debt securities characteristics database using filters based on security characteristics and rate data sources.

10. The method of claim 1 wherein querying the searchable database for at least one specified security characteristic includes selecting a custom generated query generated by the program server to search for pre-selected security characteristics.

11. The method of claim 1 wherein querying the searchable database for at least one specified security characteristic includes the program server automatically, periodically tracking designated debt securities portfolios.

12. The method of claim 1 wherein a user computer is networked with the program server, the program server has stored on it other debt securities portfolios, and querying the searchable database for at least one specified security characteristic(s) includes the program server automatically, periodically tracking designated debt securities portfolios, and further comprising the steps of:

f) the program server saving the search results in a custom report format;

g) the program server electronically notifying one or more networked user computes of the generation of the custom report; and h) the program server includes comparison means of comparing the custom generated report to other debt securities portfolios on the program server that are selected by the user computer for comparison.

13. The method of claim 1 wherein the search results are displayed in one or more of graphical, chart or tabular form.

14. The method of claim 1 wherein the search results may cover a single security, a portfolio of debt securities or a collection of security results.

15. The method of claim 1 the security rate server includes information about debt securities rates only for business days during a calendar year in which the security has a change in rate and the program server automatically generates daily debt securities rates for non-business days of the year.

16. The method of claim 1 wherein the program server identifies different sectors of debt securities for search purpose.

17. The method of claim 1 wherein searches of debt securities characteristics can be conducted on the basis of one or more of the following security characteristics: tax status, governmental level, geographic region, industry, type of security, Alternative Minimum Tax Status, Credit Enhancement Provider, Remarketing Agent or security rating.

18. The method of claim 1 wherein the debt securities that are available to be searched can be any combination of all debt security identified by the query, a select portfolio of debt securities, or one or more customized groups of debt securities.

19. The method of claim 1 wherein a customized group of debt securities is created and searched by the program server in response to input from a user.

20. The method of claim 1 wherein a custom group of debt securities is created and searched by the program server in response to input from a user, and includes generation by the program server of a user debt securities portfolio and a comparable competitive debt securities portfolio for comparison purposes.

* * * * *